US008830965B2

(12) United States Patent
Murakami et al.

(10) Patent No.: US 8,830,965 B2
(45) Date of Patent: Sep. 9, 2014

(54) RADIO COMMUNICATION METHOD, RADIO COMMUNICATION SYSTEM, RADIO BASE STATION, AND RADIO TERMINAL STATION

(75) Inventors: Tomoki Murakami, Yokosuka (JP); Takeo Ichikawa, Yokosuka (JP); Riichi Kudo, Yokosuka (JP); Yasushi Takatori, Atsugi (JP); Masato Mizoguchi, Yokosuka (JP); Takefumi Hiraguri, Yokosuka (JP); Kentaro Nishimori, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 100 days.

(21) Appl. No.: 13/375,065

(22) PCT Filed: Jul. 8, 2010

(86) PCT No.: PCT/JP2010/061641
§ 371 (c)(1),
(2), (4) Date: Nov. 29, 2011

(87) PCT Pub. No.: WO2011/004875
PCT Pub. Date: Jan. 13, 2011

(65) Prior Publication Data
US 2012/0099460 A1    Apr. 26, 2012

(30) Foreign Application Priority Data
Jul. 9, 2009    (JP) .................................. 2009-162727
Aug. 19, 2009   (JP) .................................. 2009-190230

(51) Int. Cl.
*H04W 4/00*    (2009.01)
(52) U.S. Cl.
USPC ........................................ 370/334; 455/443

(58) Field of Classification Search
None
See application file for complete search history.

(56) References Cited

U.S. PATENT DOCUMENTS

2005/0147023 A1 *  7/2005   Stephens et al. .............. 370/203
2009/0251726 A1   10/2009   Suzue

FOREIGN PATENT DOCUMENTS

CN       101064531 A      10/2007
EP       2 051 401 A2     4/2009
(Continued)

OTHER PUBLICATIONS

Qualcomm Europe, "Impact of Downlink CoMP on the Air Interface" [online], 3GPP TSG-RAN WG1 #55bis R1-090366, Ljubljana, Slovenia, Jan. 12-16, 2009, URL:http://www.3gpp.org/ftp/tsg_ran/WG1_RL1/TSGR1_55b/Docs/R1-090366.zip.

(Continued)

*Primary Examiner* — Anh-Vu Ly
*Assistant Examiner* — Hashim Bhatti
(74) *Attorney, Agent, or Firm* — Harness, Dickey & Pierce, P.L.C.

(57) ABSTRACT

This radio communication method is used to perform spatial multiplexing communication between cells in the overlap cell environment. In the MU-MIMO overlap cell environment, when a null is formed between a radio base station and a radio terminal station belonging to different cells, a first set of a "call signal" and a "response signal" is used to perform mutual detection with the radio base station and the radio terminal station belonging to different cells, and then a null is formed so as not to cause interference of radio waves between the radio base station and the radio terminal station belonging to different cells. At this time, the addresses of the radio base station and the radio terminal station are used to discriminate whether the radio base station and the radio terminal station belong to the same cell or different cells.

14 Claims, 41 Drawing Sheets

(56) References Cited

FOREIGN PATENT DOCUMENTS

| | | | |
|---|---|---|---|
| EP | 2051401 A2 * | 4/2009 | |
| GB | EP 2051401 * | 4/2009 | ............... H04B 7/04 |
| JP | 05-145460 A | 6/1993 | |
| JP | 07-38952 A | 2/1995 | |
| JP | 2000-31890 A | 1/2000 | |
| JP | 2000-308124 A | 11/2000 | |
| JP | 2003-218772 A | 7/2003 | |
| JP | 2003-332924 A | 11/2003 | |
| JP | 2005-65242 A | 3/2005 | |
| JP | 2005-341405 A | 12/2005 | |
| JP | 2008/098940 A | 4/2008 | |
| JP | 2008-211349 A | 9/2008 | |
| WO | 2007/072828 A1 | 6/2007 | |
| WO | 2007/088624 A1 | 8/2007 | |
| WO | 2008/058109 A2 | 5/2008 | |
| WO | 2008/069310 A1 | 6/2008 | |
| WO | 2008/093619 A1 | 8/2008 | |
| WO | 2009/002269 A1 | 12/2008 | |
| WO | 2010/019445 A2 | 2/2010 | |

OTHER PUBLICATIONS

Notice of Reasons for Rejection, Japanese Patent Application No. 2011-521965, Jan. 8, 2013.

IEEE P802.11n™/D7.0 Draft Standard for Information Technology—Telecommunications and information exchange between systems—Local and metropolitan area networks—Specific requirements Part 11: Wireless LAN Medium Access Control (MAC) and Physical Layer (PHY) specifications Amendment 5: Enhancements for Higher Throughput.

Lin X. Cai, Hangguan Shan, Weihua Zhuang, Suemin (Sherman) Shen, Jon W. Mark, and Zongxin Wang, "A Distributed Multi-User MIMO MAC Protocol for Wireless Local Area Networks", IEEE GLOBECOM 2008 proceedings.

International Search Report and Written Opinion of the ISA for PCT/JP2010/061641, ISA/JP, mailed Aug. 17, 2010.

Notice of Reasons for Rejection, Japanese Patent Application No. 2013-044259, Dec. 10, 2013.

Office Action, Chinese Patent Application No. 201080027444.4, Dec. 19, 2013.

* cited by examiner

FIG. 3

|  |  | FIRST FREQUENCY BAND | SECOND FREQUENCY BAND | THIRD FREQUENCY BAND |
|---|---|---|---|---|
| BASE STATION 110 | FIRST RECEPTION WEIGHT | −10[dB] | 20[dB] | 20[dB] |
|  | SECOND RECEPTION WEIGHT | 0[dB] | 0[dB] | 10[dB] |
|  | THIRD RECEPTION WEIGHT | 10[dB] | 10[dB] | 30[dB] |
|  | AVERAGE | 0[dB] | 10[dB] | 20[dB] |

FIG. 4

|  |  | FIRST FREQUENCY BAND | SECOND FREQUENCY BAND | THIRD FREQUENCY BAND |
|---|---|---|---|---|
| BASE STATION 110 | AVERAGE SIGNAL INTENSITY [dBm] | −86 | −50 | −86 |
|  | AVERAGE SIGNAL UTILIZATION FREQUENCY [%] | 80 | 40 | 60 |

FIG. 11

|  | FREQUENCY BAND | 1 | 2 |
|---|---|---|---|
| TERMINAL STATION 111 | SIGNAL INTENSITY [dBm] | −86 | −130 |
| | SIGNAL UTILIZATION FREQUENCY [%] | 80 | − |
| TERMINAL STATION 112 | SIGNAL INTENSITY [dBm] | −140 | −135 |
| | SIGNAL UTILIZATION FREQUENCY [%] | − | − |
| TERMINAL STATION 113 | SIGNAL INTENSITY [dBm] | −135 | −70 |
| | SIGNAL UTILIZATION FREQUENCY [%] | − | 40 |

FIG. 17

| RECEPTION SIGNAL TO NOISE RADIO[dB] | MODULATION METHOD | CODING RATE |
|---|---|---|
| 36 OR MORE | 256QAM | 7/8 |
| 29 | 64QAM | 3/4 |
| 24 | 16QAM | 3/4 |
| 17 | QPSK | 2/3 |
| 9 OR LESS | BPSK | 1/2 |

RADIO COMMUNICATION METHOD, RADIO COMMUNICATION SYSTEM, RADIO BASE STATION, AND RADIO TERMINAL STATION

TECHNICAL FIELD

The present invention relates to a radio communication method, a radio communication system, a radio base station, and a radio terminal station.

The present application claims priority on Japanese Patent Application No. 2009-162727 filed Jul. 9, 2009, and Japanese Patent Application No. 2009-190230 filed Aug. 19, 2009, the entire content of which is incorporated herein by reference.

BACKGROUND ART

Radio communication systems including a plurality of radio base stations forming their respective cells and radio terminal stations each belonging to any one of cells, in which each of radio terminal stations performs communication with a radio base station with its own cell, have been increasingly utilized.

In radio communication systems configured of cells, a plurality of cells using the same frequency band is adjoined to cause communication interference between cells.

As a method for solving this problem, it is effective to adopt a method for conducting communication using different frequency bands among radio base stations of adjacent cells causing interference therebetween (see Patent Document 1).

Using spatial multiplexing in communication between radio terminal stations in cells, IEEE802.11n (see Non-Patent Document 1) has been developing a wireless LAN system employing a MIMO (Multi Input Multi Output) technology which aims to provide high-speed radio communication in which each radio station (each radio base station or each radio terminal station) includes a plurality of antennas so as to receive/transmit data packets multiplexed using those antennas. Multiplexing transmission used in IEEE802.11n is performed via one-for-one correspondence between a radio base station (AP: Access Point) and a radio terminal station (STA: Station) such that transmitting data are distributed to a plurality of antennas and subjected to parallel transmission, i.e. spatial multiplexing transmission, thus improving a communication speed. To achieve this spatial multiplexing communication, radio base stations need to know the channel estimation result regarding channels between radio base stations and radio terminal stations in advance. Since the status of channels may fluctuate with respect to time, it is preferable to acknowledge the channel estimation result just before spatial multiplexing transmission.

IEEE802.11n has studied transmission beam forming as an option for improving a communication quality using the MIMO technology. FIG. 41 is a time chart illustrating a transmission operation of packet signals in transmission beam forming. The radio base station AP transmits a signal for requesting a channel estimation signal (or a sounding signal), so that the radio terminal station STA receiving it sends back the sounding signal. The radio base station AP receiving the sounding signal estimates a channel based on the sounding signal so as to perform transmission beam forming based on the estimation result, wherein data packets are transmitted using a plurality of antennas by way of a transmission beam which is directed in an appropriate direction.

Recently, an MU (Multi User)-MIMO technology, which can effectively utilize radio resources since a radio base station is allowed to perform one-for-multi communication with a plurality of radio terminal stations by spatially multiplexing the same radio channel in a radio system adopting the MIMO technology, has been developed (see Non-Patent Document 2). In the MU-MIMO technology, a radio base station performs communication by spatially multiplexing data packets destined to a plurality of radio terminal stations. FIG. 42 shows a time chart illustrating the operation of the MU-MIMO technology of Non-Patent Document 2 and a network configuration. Before transmitting packet signals, the radio base station AP carries out random-time carrier sense so as to transmit a call signal, including a destination address of packet signals, in an idle state preventing reception of radio signals. Radio terminal stations STA1, STA2, which are specified by the call signal, send back response signals. Upon receiving response signals, the radio base station AP estimates channels with the radio terminal stations STA1, STA2, so that the radio base station AP transmits packet signals to their destinations by use of a plurality of antennas installed therein while forming a plurality of beams in directions optimum for the radio terminal stations STA1, STA2 based on the estimation result.

In the illustration, the number of antennas installed in the radio base station AP is set to four while the number of antennas installed in the radio terminal station STA is set to two. Generally speaking, the maximum number of spatial multiplexes is equal to the number of antennas, so that the maximum number of spatial multiplexes of the radio base station AP is four while the maximum number of spatial multiplexes of the radio terminal station STA is two. The conventional MIMO technology carries out multiplexing transmission via the one-for-one correspondence between the radio base station AP and the radio terminal station STA, so that the maximum number of spatial multiplexes between the radio base station AP and the radio terminal station STA should be set to two due to a limitation imposed on the number of spatial multiplexes of STA; hence, the radio base station AP cannot demonstrate its full capability. In contrast, the MU-MIMO technology carries out multiplexing transmission via the one-for-multi correspondence between the radio base station AP and the radio terminal station STA, wherein the radio base station AP is able to carry out spatial transmission, using two spatial multiplexes, with each of two radio terminal stations STA so as to implement four spatial multiplexing transmissions in total, so that the radio base station AP is able to maximally demonstrate its capability.

PRIOR ART DOCUMENT

Patent Document

Patent Document 1: Japanese Patent Application Publication No. H05-145460

Non-Patent Document

Non-Patent Document 1: IEEE P802.11n/D7.0 Draft STANDARD for Information Technology-Telecommunications and information exchange between systems-Local and metropolitan area networks-Specific requirements Part 11: Wireless LAN Medium Access Control (MAC) and Physical Layer (PHY) specifications Amendment 5: Enhancements for Higher Throughput Non-Patent Document 2: Lin X. Cai, "A Distributed Multi-User MIMO MAC Protocol for Wireless Local Area Networks", IEEE GLOBECOM 2008 proceedings

SUMMARY OF THE INVENTION

Problem to be Solved by the Invention

In general, radio communication systems using cellular phones or wireless LANs determine a minimum unit of a wireless network corresponding to a cell configured of one radio base station and a plurality of radio terminal stations. A wireless network may provide a broadband by expanding the plane of a cell. Cellular phone systems are designed such that frequency channels and spreading codes are allocated to cells so as not to cause interference between cells. As disclosed in Patent Document 1, however, when a frequency band is selected using a radio signal transmitted from a radio terminal station, belonging to a certain radio base station, alone, it is difficult to select the frequency band in consideration of interference between the radio terminal station and another radio base station or another radio terminal station.

A generally applied case, employed particularly in cities and apartment houses, is that a plurality of cells shares the same frequency band because users may individually select their frequency bands within a narrow frequency band employed in wireless LANs. The conventional MU-MIMO technology does not consider the case in which a plurality of cells shares the same frequency channel, i.e. an overlap cell environment in spatial multiplexing communication; hence, no scheme for conducting communication via spatial multiplexing among a plurality of cells has been developed. In the example shown in FIG. 42, the radio base station AP holds transmission packets destined to two radio terminal stations so that the radio base station AP can effectively utilize radio resources by transmitting them with its maximum number of spatial multiplexes, whereas the number of spatial multiplexes is limited to two when the radio base station AP holds transmission packets destined to one radio terminal station alone, causing a problem in that effective utilization of radio resources becomes insufficient.

The present invention is made under the foregoing circumstances and designed to prevent or suppress interference between cells formed with a plurality of radio base stations and a plurality of radio terminal stations, wherein the object thereof is to provide a radio communication method, a radio communication system, a radio base station and a radio terminal station which are able to perform spatial multiplexing communication between cells by exchanging information, necessary for spatial multiplexing, between cells particularly in the overlap cell environment.

Means for Solving the Problem

The present invention refers to a radio communication method adapted to cells configured of radio networks, connecting radio base stations and radio terminal stations for receiving and transmitting packet signals, in which radio base stations each using a plurality of antennas are able to simultaneously receive and transmit packet signals with radio terminal stations via spatial multiplexing. Provided that a plurality of cells exists, the radio base station transmits a call signal to each of radio terminal stations, which in turn send back their response signals, against the call signal transmitted by the radio base station, to the radio base station serving as a transmission source of the call signal; and then the radio base station of each cell estimates channels with respect to radio terminal stations belonging to its own cell and its peripheral cell, which is another cell located in the periphery of its own cell, so that the radio base station performs spatial multiplexing transmission with the radio terminal station of its own cell while creating a null point, relative to the directivity of antennas, directing to the radio terminal station of the peripheral cell.

One embodiment of the present invention refers to a radio communication method adapted to cells configured of radio networks, connecting radio base stations and radio terminal stations for receiving and transmitting packet signals, in which radio base stations each using a plurality of antennas are able to simultaneously receive and transmit packet signals with radio terminal stations via spatial multiplexing. Provided that a plurality of cells exists, when the radio base station, belonging to a first cell, receives a packet signal transmitted from a radio base station of a second cell located in the periphery of the first cell or a radio terminal station of the second cell, the radio base station stores a transmission source address included in the packet signal; when the radio base station of the first cell transmits a packet signal, the radio base station of the first cell performs carrier sense at random time intervals with radio base stations, wherein the radio base station, involved in an idling state not receiving radio signals, transmits a call signal, including a destination address of the transmitted packet signal as well as an address of the radio base station of the second cell and an address of the radio terminal station of the second cell, as its control signal; the radio terminal station of the first cell, the radio base station of the second cell, and the radio terminal station of the second cell, which are specified by the call signal, send back their response signals; and then upon receiving response signals, the radio base station of the first cell estimates channels with respect to the radio terminal station of the first cell, the radio base station of the second cell, and the radio terminal station of the second cell, wherein based on the channel estimation result, the radio base station of the first cell performs spatial multiplexing transmission with the radio terminal station of the first cell, serving as the destination of the packet signal, while creating null points, relative to the directivity of antennas, directing to the radio base station of the second cell and the radio terminal station of the second cell.

One embodiment of the present invention refers to a radio communication method adapted to cells configured of radio networks, connecting radio base stations and radio terminal stations for receiving and transmitting packet signals, in which radio base stations each using a plurality of antennas are able to simultaneously receive and transmit packet signals with radio terminal stations via spatial multiplexing. Provided that the radio base station transmits packet signals to radio terminal stations in its own cell in conjunction with a plurality of cells, upon receiving a packet signal transmitted from a second cell located in the periphery of a first cell applied to the radio base station, the radio base station stores a transmission source address included in the packet signal; when the radio base station of the first cell transmits a packet signal, the radio base station of the first cell performs carrier sense at random time intervals with radio base stations, so that the radio base station, involved in an idling state not receiving radio signals, transmits a call signal, including a destination address of the transmitted packet signal and an address of the radio terminal station of the second cell, as its control signal; upon receiving the call signal transmitted from the radio base station of the first cell, the radio terminal station of the first cell and the radio terminal station of the second cell send back their response signals; upon receiving response signals, the radio base station of the first cell and the radio base station of the second cell estimate channels with respect to the radio terminal stations, wherein based on the channel estimation result, the radio base station of the first cell performs spatial multiplexing transmission with the radio terminal station of the first cell, serving as the destination of the transmitted packet signal, while creating a null point, relative to the directivity of the antennas, directing to the radio terminal station of the second cell; and then the radio base station of the second cell performs spatial multiplexing transmission with the radio terminal station of the second cell while creating a null point, relative to the directivity of antennas, directing to the radio terminal station of the first cell.

One embodiment of the present invention refers to a radio communication method adapted to cells configured of radio networks, connecting radio base stations and radio terminal stations for receiving and transmitting packet signals, in which radio base stations each using a plurality of antennas are able to simultaneously receive and transmit packet signals with radio terminal stations via spatial multiplexing. Provided that the radio base station transmits packet signals to radio terminal stations in its own cell in conjunction with a plurality of cells, the radio base station of a first cell, which is first to transmit a call signal, performs carrier sense at random time intervals with radio base stations, so that the radio base station, involved in an idling state not receiving radio signals, transmits the call signal, including a destination address of the packet signal transmitted to the radio terminal station of the first cell, as its control signal; upon receiving the call signal, a radio base station of a peripheral cell, different from the first cell, performs carrier sense at random time intervals during a first period counted from the reception timing of the call signal, so that the radio base station, involved in an idling state not receiving radio signals, transmits a call signal including a destination address of a packet signal to be transmitted to a radio terminal station of the peripheral cell; the radio terminal station, belonging to a specific cell, which is specified by the call signal of the radio base station of the specific cell sends back a response signal over a lapse of the first period; and then upon receiving response signals transmitted from radio terminal stations, belonging to the specific cell and its peripheral cell, the radio base station of the specific cell estimates channels with respect to the radio terminal stations belonging to the specific cell and its peripheral cell, wherein based on the channel estimation result, the radio base station of the specific cell transmits a packet signal via spatial multiplexing to the radio terminal station of the specific cell, which is the destination of the transmitted packet signal, while creating a null point, relative to the directivity of antennas, directing to the radio terminal station of the peripheral cell.

One embodiment of the present invention refers to a radio communication method adapted to cells configured of radio networks, connecting radio base stations and radio terminal stations for receiving and transmitting packet signals, in which radio base stations each using a plurality of antennas are able to simultaneously receive and transmit packet signals with radio terminal stations via spatial multiplexing. Provided that the radio base station transmits packet signals to radio terminal stations in its own cell in conjunction with a plurality of cells, when the radio base station of a first cell receives a packet signal transmitted from the radio base station of a second cell located in the periphery of the first cell, the radio base station of the first cell stores a transmission source address included in the packet signal; the radio base station of the first cell, which is about to transmit a first call signal, performs carrier sense at random time intervals with radio base stations, so that the radio base station, involved in an idling state not receiving radio signals, transmits the first call signal, including a destination address of the packet signal to be transmitted to the radio terminal station of the first cell and an address of the radio base station of the peripheral cell, as its control signal; upon receiving the first call signal, the radio base station belonging to a peripheral cell different from the first cell transmits its call signal, including a destination address of a packet signal to be transmitted to the radio terminal station of the peripheral cell, as its control signal over a lapse of a second period after reception of the first call signal; upon receiving the call signal transmitted from the radio base station of the peripheral cell, the radio base station of a secondary peripheral cell different from the first cell transmits a call signal, including a destination address of a packet signal to be transmitted to the radio terminal station of the secondary peripheral cell, as its control signal over a lapse of the second period after reception of the call signal; the radio terminal station belonging to a specific cell, which is specified by the call signal transmitted from the radio base station of the specific cell, transmits its response signal over a lapse of the second period; and then, when the radio base station of the specific cell receives response signals from the radio terminal stations of the specific cell and its peripheral cell, the radio base station estimates channels with respect to the radio terminal stations of the specific cell and its peripheral cell, wherein based on the channel estimation result, the radio base station of the specific cell transmits a packet signal via spatial multiplexing to the radio terminal station of the specific cell while creating a null point, relative to the directivity of antennas, to the radio terminal station of its peripheral cell.

One embodiment of the present invention refers to a radio communication method adapted to cells configured of radio networks, connecting radio base stations and radio terminal stations for receiving and transmitting packet signals, in which radio base stations each using a plurality of antennas are able to simultaneously receive and transmit packet signals with radio terminal stations via spatial multiplexing. Provided that the radio base station transmits packet signals to radio terminal stations in its own cell in conjunction with a plurality of cells, when the radio base station of a first cell receives a packet signal transmitted from the radio base station of a second cell located in the periphery of the first cell, the radio base station of the first cell stores a transmission source address included in the packet signal; the radio base station of the first cell, which is about to transmit a first call signal, performs carrier sense at random time intervals with radio base stations, so that the radio base station, involved in an idling state not receiving radio signals, transmits the first call signal, including a destination address of a packet signal to be transmitted to the radio terminal station of the first cell and an address of the radio base station of a peripheral cell, as its control signal; upon receiving the first call signal, the radio terminal station sends back a response signal over a lapse of a second period after reception of the first call signal; upon receiving the response signal transmitted from the radio terminal station, the radio base station of a specific cell estimates a channel with the radio terminal station; upon receiving the response signal, the radio base station of a peripheral cell different from the first cell transmits a call signal, including a destination address of a packet signal to be transmitted to the radio terminal station of the specific cell, as its control signal over a lapse of the second period after reception of the response signal; upon receiving the call signal, the radio terminal station of the peripheral cell different from the first cell sends back a response signal over a lapse of the second period after reception of the call signal; upon receiving the response signal transmitted from the radio terminal station, the radio base station of the specific cell estimates a channel with respect to the radio terminal station; upon receiving the response signal, the radio base station of a secondary peripheral cell different from the first cell transmits a call signal, including a destination address of a packet signal to be transmitted to the radio terminal station of the specific cell, as its control signal over a lapse of the second period after reception of the response signal; upon receiving the call signal, the radio terminal station of the secondary peripheral cell different from the first cell sends back a response signal over a lapse of the second period after reception of the call signal; upon receiving the response signal transmitted from the radio terminal station, the radio base station of the specific cell estimates a channel with the radio terminal station; and then, based on the channel estimation result pertaining to the radio terminal stations belonging to the specific cell and its peripheral cell, the radio base station of the specific cell transmits a packet signal via spatial multiplexing to the radio terminal station of the specific cell, serving as a destination of the transmitted packet signal, while creating a null point, relative to the directivity of antennas, directing to the radio terminal station of its peripheral cell.

The foregoing embodiment can be modified such that the radio base station sequentially transmits call signals in the order of addresses included in the first call signal.

The present invention refers to a radio communication system adapted to cells configured of radio networks, connecting radio base stations and radio terminal stations for receiving and transmitting packet signals, in which radio base stations each using a plurality of antennas are able to simultaneously receive and transmit packet signals with radio terminal stations via spatial multiplexing. Provided that a plurality of cells exists, the radio base station transmits a call signal to each of radio terminal stations, which in turn send back their response signals, against the call signal transmitted by the radio base station, to the radio base station serving as a transmission source of the call signal; and then the radio base station of each cell estimates channels with respect to radio terminal stations belonging to its own cell and its peripheral cell, which is another cell located in the periphery of its own cell, so that the radio base station performs spatial multiplexing transmission with the radio terminal station of its own cell while creating a null point, relative to the directivity of antennas, directing to the radio terminal station of the peripheral cell.

Another embodiment of the present invention refers to a radio communication system adapted to cells configured of radio networks, connecting radio base stations and radio terminal stations for receiving and transmitting packet signals, in which radio base stations each using a plurality of antennas are able to simultaneously receive and transmit packet signals with radio terminal stations via spatial multiplexing. Provided that a plurality of cells exists, when the radio base station, belonging to a first cell, receives a packet signal transmitted from a radio base station of a second cell located in the periphery of the first cell or a radio terminal station of the second cell, the radio base station stores a transmission source address included in the packet signal; when the radio base station of the first cell transmits a packet signal, the radio base station of the first cell performs carrier sense at random time intervals with radio base stations, wherein the radio base station, involved in an idling state not receiving radio signals, transmits a call signal, including a destination address of the transmitted packet signal as well as an address of the radio base station of the second cell and an address of the radio terminal station of the second cell, as its control signal; the radio terminal station of the first cell, the radio base station of the second cell, and the radio terminal station of the second cell, which are specified by the call signal, send back their response signals; and then, upon receiving response signals, the radio base station of the first cell estimates channels with respect to the radio terminal station of the first cell, the radio base station of the second cell, and the radio terminal station of the second cell, wherein based on the channel estimation result, the radio base station of the first cell performs spatial multiplexing transmission with the radio terminal station of the first cell, serving as the destination of the packet signal, while creating null points, relative to the directivity of antennas, directing to the radio base station of the second cell and the radio terminal station of the second cell.

Another embodiment of the present invention refers to a radio communication system adapted to cells configured of radio networks, connecting radio base stations and radio terminal stations for receiving and transmitting packet signals, in which radio base stations each using a plurality of antennas are able to simultaneously receive and transmit packet signals with radio terminal stations via spatial multiplexing. Provided that the radio base station transmits packet signals to radio terminal stations in its own cell in conjunction with a plurality of cells, upon receiving a packet signal transmitted from a second cell located in the periphery of a first cell applied to the radio base station, the radio base station stores a transmission source address included in the packet signal; when the radio base station of the first cell transmits a packet signal, the radio base station of the first cell performs carrier sense at random time intervals with radio base stations, so that the radio base station, involved in an idling state not receiving radio signals, transmits a call signal, including a destination address of the transmitted packet signal and an address of the radio terminal station of the second cell, as its control signal; upon receiving the call signal transmitted from the radio base station of the first cell, the radio terminal station of the first cell and the radio terminal station of the second cell send back their response signals; upon receiving response signals, the radio base station of the first cell and the radio base station of the second cell estimate channels with respect to the radio terminal stations, wherein based on the channel estimation result, the radio base station of the first cell performs spatial multiplexing transmission with the radio terminal station of the first cell, serving as the destination of the transmitted packet signal, while creating a null point, relative to the directivity of the antennas, directing to the radio terminal station of the second cell; and then the radio base station of the second cell performs spatial multiplexing transmission with the radio terminal station of the second cell while creating a null point, relative to the directivity of antennas, directing to the radio terminal station of the first cell.

Another embodiment of the present invention refers to a radio communication system adapted to cells configured of radio networks, connecting radio base stations and radio terminal stations for receiving and transmitting packet signals, in which radio base stations each using a plurality of antennas are able to simultaneously receive and transmit packet signals with radio terminal stations via spatial multiplexing. Provided that the radio base station transmits packet signals to radio terminal stations in its own cell in conjunction with a plurality of cells, the radio base station of a first cell, which is first to transmit a call signal, performs carrier sense at random time intervals with radio base stations, so that the radio base station, involved in an idling state not receiving radio signals, transmits the call signal, including a destination address of the packet signal transmitted to the radio terminal station of the first cell, as its control signal; upon receiving the call signal, a radio base station of a peripheral cell, different from the first cell, performs carrier sense at random time intervals during a first period counted from the reception timing of the call signal, so that the radio base station, involved in an idling state not receiving radio signals, transmits a call signal including a destination address of a packet signal to be transmitted to a radio terminal station of the peripheral cell; the radio terminal station, belonging to a specific cell, which is specified by the call signal of the radio base station of the specific cell sends back a response signal over a lapse of the first period; and then, upon receiving response signals transmitted from radio terminal stations, belonging to the specific cell and its peripheral cell, the radio base station of the specific cell estimates channels with respect to the radio terminal stations belonging to the specific cell and its peripheral cell, wherein based on the channel estimation result, the radio base station of the specific cell transmits a packet signal via spatial multiplexing to the radio terminal station of the specific cell, which is the destination of the transmitted packet signal, while creating a null point, relative to the directivity of antennas, directing to the radio terminal station of the peripheral cell.

Another embodiment of the present invention refers to a radio communication system adapted to cells configured of radio networks, connecting radio base stations and radio terminal stations for receiving and transmitting packet signals, in which radio base stations each using a plurality of antennas are able to simultaneously receive and transmit packet signals with radio terminal stations via spatial multiplexing. Provided that the radio base station transmits packet signals to radio terminal stations in its own cell in conjunction with a plurality of cells, when the radio base station of a first cell receives a packet signal transmitted from the radio base station of a second cell located in the periphery of the first cell, the radio base station of the first cell stores a transmission source address included in the packet signal; the radio base station of the first cell, which is about to transmit a first call signal, performs carrier sense at random time intervals with radio base stations, so that the radio base station, involved in an idling state not receiving radio signals, transmits the first call signal, including a destination address of the packet signal to be transmitted to the radio terminal station of the first cell and an address of the radio base station of the peripheral cell, as its control signal; upon receiving the first call signal, the radio base station belonging to a peripheral cell different from the first cell transmits its call signal, including a destination address of a packet signal to be transmitted to the radio terminal station of the peripheral cell, as its control signal over a lapse of a second period after reception of the first call signal; upon receiving the call signal transmitted from the radio base station of the peripheral cell, the radio base station of a secondary peripheral cell different from the first cell transmits a call signal, including a destination address of a packet signal to be transmitted to the radio terminal station of the secondary peripheral cell, as its control signal over a lapse of the second period after reception of the call signal; the radio terminal station belonging to a specific cell, which is specified by the call signal transmitted from the radio base station of the specific cell, transmits its response signal over a lapse of the second period; and then, when the radio base station of the specific cell receives response signals from the radio terminal stations of the specific cell and its peripheral cell, the radio base station estimates channels with respect to the radio terminal stations of the specific cell and its peripheral cell, wherein based on the channel estimation result, the radio base station of the specific cell transmits a packet signal via spatial multiplexing to the radio terminal station of the specific cell while creating a null point, relative to the directivity of antennas, to the radio terminal station of its peripheral cell.

Another embodiment of the present invention refers to a radio communication system adapted to cells configured of radio networks, connecting radio base stations and radio terminal stations for receiving and transmitting packet signals, in which radio base stations each using a plurality of antennas are able to simultaneously receive and transmit packet signals with radio terminal stations via spatial multiplexing. Provided that the radio base station transmits packet signals to radio terminal stations in its own cell in conjunction with a plurality of cells, when the radio base station of a first cell receives a packet signal transmitted from the radio base station of a second cell located in the periphery of the first cell, the radio base station of the first cell stores a transmission source address included in the packet signal; the radio base station of the first cell, which is about to transmit a first call signal, performs carrier sense at random time intervals with radio base stations, so that the radio base station, involved in an idling state not receiving radio signals, transmits the first call signal, including a destination address of a packet signal to be transmitted to the radio terminal station of the first cell and an address of the radio base station of a peripheral cell, as its control signal; upon receiving the first call signal, the radio terminal station sends back a response signal over a lapse of a second period after reception of the first call signal; upon receiving the response signal transmitted from the radio terminal station, the radio base station of a specific cell estimates a channel with the radio terminal station; upon receiving the response signal, the radio base station of a peripheral cell different from the first cell transmits a call signal, including a destination address of a packet signal to be transmitted to the radio terminal station of the specific cell, as its control signal over a lapse of the second period after reception of the response signal; upon receiving the call signal, the radio terminal station of the peripheral cell different from the first cell sends back a response signal over a lapse of the second period after reception of the call signal; upon receiving the response signal transmitted from the radio terminal station, the radio base station of the specific cell estimates a channel with respect to the radio terminal station; upon receiving the response signal, the radio base station of a secondary peripheral cell different from the first cell transmits a call signal, including a destination address of a packet signal to be transmitted to the radio terminal station of the specific cell, as its control signal over a lapse of the second period after reception of the response signal; upon receiving the call signal, the radio terminal station of the secondary peripheral cell different from the first cell sends back a response signal over a lapse of the second period after reception of the call signal; upon receiving the response signal transmitted from the radio terminal station, the radio base station of the specific cell estimates a channel with the radio terminal station; and then, based on the channel estimation result pertaining to the radio terminal stations belonging to the specific cell and its peripheral cell, the radio base station of the specific cell transmits a packet signal via spatial multiplexing to the radio terminal station of the specific cell, serving as a destination of the transmitted packet signal, while creating a null point, relative to the directivity of antennas, directing to the radio terminal station of its peripheral cell.

The foregoing embodiment of the present invention can be modified such that the radio base station sequentially transmits call signals in the order of addresses included in the first call signal.

The foregoing embodiment of the present invention can be modified such that the call signal includes the redundant count of spatial multiplexing by the radio base station.

The foregoing embodiment of the present invention can be modified such that the call signal includes the number of antennas installed in the destination radio terminal station.

The foregoing embodiment of the present invention can be modified such that the call signal includes a third period for inhibiting transmission by radio stations except for the destination radio terminal station and the radio base station of the second cell.

The foregoing embodiment of the present invention can be modified such that the call signal includes the length of a packet signal.

The foregoing embodiment of the present invention can be modified such that the call signal includes a time for transmitting an acknowledge signal against the packet signal with the radio terminal station serving as a destination.

The foregoing embodiment of the present invention can be modified such that the radio terminal station measures the frequency offset upon receiving the call signal.

The foregoing embodiment of the present invention can be modified such that the response signal includes the channel estimation result made by the radio terminal station upon receiving the call signal.

The foregoing embodiment of the present invention can be modified such that the radio base station selects a radio terminal station with its correlation value less than the predetermined value based on the channel estimation result involving radio terminal stations.

The foregoing embodiment of the present invention can be modified such that the radio base station does not select a radio terminal station sending its response signal with reception power less then the threshold value.

The foregoing embodiment of the present invention can be modified such that the radio base station accumulates packet signals subjected to transmission, wherein, when the amount of data exceeds the threshold value, the radio base station transmits a first call signal.

The foregoing embodiment of the present invention can be modified such that the radio base station transmits an approval signal including the destination address of transmission packets and the spatial multiplexing redundant count determined based on the channel estimation result, thereafter, the radio base station transmits packet signals destined to its counterpart radio terminal station via spatial multiplexing while creating a null point, relative to the directivity of antennas, directing to the radio terminal station in the second cell.

The foregoing embodiment of the present invention can be modified such that the approval signal includes a fourth period for inhibiting transmission by radio stations except for the destination radio terminal station and the peripheral radio base station.

The foregoing embodiment of the present invention can be modified such that the call signal includes the length of a packet signal.

The foregoing embodiment of the present invention can be modified such that the approval signal includes a time at which the destination radio terminal station transmits an acknowledge signal against the packet signal.

Another embodiment of the present invention refers to a radio communication method adapted to a radio communication system, including a plurality of radio base stations forming their cells and radio terminal stations, each of which belongs to each of the cells so as to communicate with the radio base station forming the cell therefor by radio. The radio communication method, applied to the radio base station, includes a measurement step for measuring signal intensities of radio signals, received and transmitted with radio terminal stations, with respect to a plurality of predetermined frequency bands and a plurality of reception weights which are determined to detect radio signals received and transmitted with radio terminal stations; and a frequency band determination step for determining frequency bands with signal intensities below a predetermined level among the plurality of frequency bands based on the measurement result of the measurement step; and a communication step for receiving and transmitting radio signals by use of frequency bands determined by the frequency band determination step.

The foregoing embodiment of the present invention can be modified such that the reception weights are determined in connection with blocks, each divided with a predetermined angle, thus performing reception of radio signals incoming from the directions of blocks.

The foregoing embodiment of the present invention can be modified such that the measurement step measures signal utilization frequencies and signal intensities of radio signals received and transmitted with radio terminal stations, wherein when no frequency band with its signal intensity below the predetermined level exists among the plurality of frequency bands, the frequency band determination step determines a frequency band with a relatively low signal utilization frequency.

The foregoing embodiment of the present invention can be modified to further include a modulation coding method determination step for determining a modulation method and a coding rate yielding a maximum throughput among predetermined modulation methods and coding rates based on the measurement result of the measurement step, wherein the communication step performs reception and transmission of radio signals in accordance with the modulation method and the coding rate which are determined by the modulation coding method determination step.

Another embodiment of the present invention refers to a radio communication method adapted to a radio communication system, including a plurality of radio base stations forming their cells and radio terminal stations, each of which belongs to each of the cells so as to communicate with the radio base station forming the cell therefor by radio. The radio communication method, applied to the radio terminal station, includes a measurement step for measuring signal intensities of radio signals, received and transmitted with radio base stations, with respect to a plurality of predetermined frequency bands and a plurality of reception weights which are determined to detect radio signals received and transmitted with radio base stations; and a communication step for receiving and transmitting radio signals by use of frequency bands with signal intensities below a predetermined level, which are determined by the radio base station based on the measurement result of the measurement step.

The foregoing embodiment of the present invention can be modified such that the reception weights are determined in connection with blocks, each divided with a predetermined angle, thus performing reception of radio signals incoming from the directions of blocks.

The foregoing embodiment of the present invention can be modified such that the measurement step measures signal utilization frequencies and signal intensities of radio signals received and transmitted with radio base stations, and wherein the communication step performs reception and transmission of radio signals by use of a frequency band with a relatively low signal utilization frequency, which is determined by the radio base station when no frequency band with its signal intensity below the predetermined level exists among the plurality of frequency bands.

Another embodiment of the present invention refers to a radio base station adapted to a radio communication system, including a plurality of radio base stations forming their cells and radio terminal stations, each of which belongs to each of the cells so as to communicate with the radio base station forming the cell therefor by radio. The radio base station includes a measurement unit for measuring signal intensities of radio signals, received and transmitted with radio terminal stations, with respect to a plurality of predetermined frequency bands and a plurality of reception weights which are determined to detect radio signals received and transmitted with radio terminal stations; a frequency band determination unit for determining frequency bands with signal intensities below a predetermined level among the plurality of frequency bands based on the measurement result of the measurement unit; and a communication unit for receiving and transmitting radio signals by use of frequency bands determined by the frequency band determination unit.

The foregoing embodiment of the present invention can be modified such that the reception weights are determined in connection with blocks, each divided with a predetermined angle, thus performing reception of radio signals incoming from the directions of blocks.

The foregoing embodiment of the present invention can be modified such that the measurement unit measures signal utilization frequencies and signal intensities of radio signals received and transmitted with radio terminal stations, wherein when no frequency band with its signal intensity below the predetermined level exists among the plurality of frequency bands, the frequency band determination unit determines a frequency band with a relatively low signal utilization frequency.

The foregoing embodiment can be modified to further include a modulation coding method determination unit for determining a modulation method and a coding rate yielding a maximum throughput among predetermined modulation methods and coding rates based on the measurement result of the measurement unit, wherein the communication unit performs reception and transmission of radio signals in accordance with the modulation method and the coding rate which are determined by the modulation coding method determination unit.

Another embodiment of the present invention relates to a radio terminal station adapted to a radio communication system, including a plurality of radio base stations forming their cells and radio terminal stations, each of which belongs to each of the cells so as to communicate with the radio base station forming the cell therefor by radio. The radio terminal station includes a measurement unit for measuring signal intensities of radio signals, received and transmitted with radio base stations, with respect to a plurality of predetermined frequency bands and a plurality of reception weights which are determined to detect radio signals received and transmitted with radio base stations; and a communication unit for receiving and transmitting radio signals by use of frequency bands with signal intensities below a predetermined level, which are determined by the radio base station based on the measurement result of the measurement unit.

The foregoing embodiment of the present invention can be modified such that the reception weights are determined in connection with blocks, each divided with a predetermined angle, thus performing reception of radio signals incoming from the directions of blocks.

The foregoing embodiment of the present invention can be modified such that the measurement unit measures signal utilization frequencies and signal intensities of radio signals with respect to the plurality of reception weights which are determined to detect radio signal transmitted from radio terminal stations belonging to cells of other radio base stations, wherein the communication unit performs reception and transmission of radio signals by use of a frequency band with a relatively low signal utilization frequency, which is determined by the radio base station when no frequency band with its signal intensity below the predetermined level exists among the plurality of frequency bands.

Effect of the Invention

According to the present invention, it is possible to prevent or suppress interference of communication between adjacent cells. In the overlap cell environment, in particular, it is possible to perform spatial multiplexing communication between cells by exchanging information necessary for spatial multiplexing between cells. This provides an effect to achieve effective utilization of radio resources.

BRIEF DESCRIPTION OF THE DRAWINGS

FIG. 3 A figure representative of data obtained according to the first embodiment of the present invention.

FIG. 4 A figure representative of data obtained according to the first embodiment of the present invention.

FIG. 11 A figure representative of data obtained according to the fourth embodiment of the present invention.

FIG. 17 A figure representative of data described in a table stored in a base station according to an eighth embodiment of the present invention.

MODE FOR CARRYING OUT THE INVENTION

Figure 1:
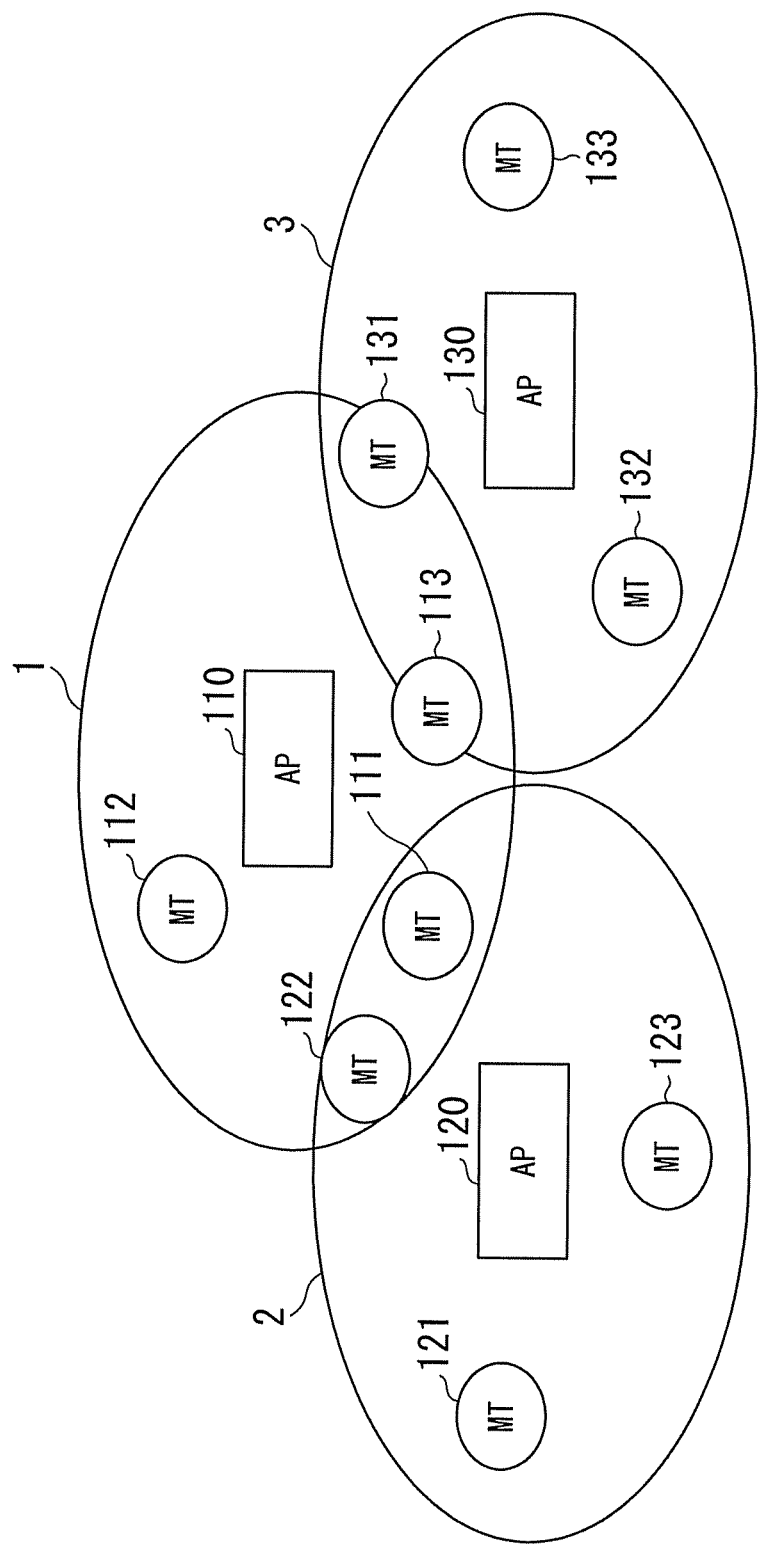
FIG. 1 An illustration of a constitution of a radio communication system according to one embodiment of the present invention.

Problems involved in first to eighth embodiments of the present invention and a technological concept for solving these problems will be described below.

Recently, radio communication systems including a plurality of radio base stations forming their cells and radio terminal stations, each of which belongs to any one of radio base stations so as to communicate with its counterpart radio base station forming its own cell by radio have been increasing. When a plurality of cells approaches each other, interference of radio communication occurs between cells. As a technology for preventing this interference, it is effective to employ a method for allocating different frequency bands to cells. For instance, Patent Document 1 discloses a technology in which a radio base station measures signal intensities of signals, transmitted from another radio base station and radio terminal stations belonging to a peripheral cell thereof, per each frequency band so as to allocate a frequency band with a signal intensity below a threshold value thereto in an autonomous distributed manner.

Even when frequency bands are selected using radio signals transmitted from radio terminal stations belonging to each radio base station alone, however, it is difficult for each radio base station to select frequency bands in consideration of interference signals from other radio base stations relative to radio terminal stations belonging to each radio base station. When each radio base station detects low signal intensity in a certain frequency band in its periphery, it is not always possible to maximize throughput of radio communication by use of the frequency band. Suppose an example in which signal intensities are measured in an environment sharing a first available frequency band and a second available frequency band, resulting in the signal intensity of the first available frequency band being 50 dB while the signal intensity of the second available frequency band being 80 dB. Using this result, the conventional method may determine a vacant frequency band such that the second available frequency band with low signal intensity is selected. In this case, when both the available frequency bands have the same utilization frequency, the resultant frequency band which is determined using signal intensity may achieve maximum throughput. When they differ from each other in terms of the utilization frequency, for example, when the first available frequency band undergoes a utilization frequency of 20% while the second available frequency band undergoes a utilization frequency of 60%, it is possible to increase throughput by selecting the second available frequency band with a low utilization frequency. This implies the situation in which interference may increase in a certain frequency band with small signal intensity but a high utilization frequency, wherein the foregoing method for determining an available frequency band by use of its signal intensity alone cannot always produce maximum throughput.

The first to eighth embodiments of the present invention are made under these circumstances, thus providing a radio communication method, a radio base station, and a radio terminal station for improving throughput by determining a communication method considering and preventing interference of radio communication among a plurality of cells formed with a plurality of radio base stations and a plurality of radio terminal stations. The present invention relates to a technology for improving throughput by determining a communication method considering and preventing interference of radio communication among a plurality of cells formed with a plurality of radio base stations and a plurality of radio terminal stations. The embodiments relating to the radio communication method, radio base station, and radio terminal station will be described below.

Hereinafter, one embodiment of the present invention will be described with reference to the drawings.

First, the outline of the radio communication method of the present embodiment will be described. In a radio communication system including a plurality of radio base stations forming their cells and radio terminal stations, each of which communicates with any one of radio base stations by radio, the present embodiment measures signal intensities and utilization frequencies of radio signals received/transmitted between radio base stations and radio terminal stations. Each radio base station determines frequency bands, which may maximize throughputs with radio terminal stations belonging to its own cell, based on measured signal intensities and utilization frequencies, thus communicating with radio terminal stations by use of determined frequency bands. Since frequency bands are determined based on time-series information which is produced by acquiring utilization frequencies of frequency bands, it is possible to utilize frequency bands with higher throughputs than foregoing throughputs produced using frequency bands which are determined based on signal intensities alone. This is because it is expected to improve throughput of radio communication by use of frequency bands with high signal intensities but low utilization frequencies.

The present embodiment may change reception weights of radio base stations to change directivities of cells, thus measuring signal intensities with respect to various reception weights. Compared with the technique for measuring signal intensity in a predetermined cell alone, it is possible to acquire a broad range of information, and it is possible to precisely determine frequency bands with higher throughputs. In order to change reception weights, radio base stations may form cells with directivities in predetermined incoming directions prior to measuring signal intensities. This may reduce the number of times for changing reception weights in acquiring information. Compared with the conventional technology in which radio base stations measure signal intensities, the present embodiment can be redesigned such that radio terminal stations measure signal intensities. Thus, it is possible to obtain a broad range of information larger than information which is obtained by measuring signal intensity in the periphery of each radio base station alone.

The present embodiment refers to a radio communication system including radio base stations and radio terminal stations but does not involve further description of each radio base station and each radio terminal station in the radio communication system. Herein, radio base stations are not necessarily limited to fixed-installation types of radio base stations, which are fixedly installed in station buildings or indoor/outdoor facilities, but encompass mobile types of radio base stations.

First Embodiment

First, the first embodiment of the present invention will be described. In the present embodiment, radio base stations measure signal intensities and utilization frequencies in connection with reception weights, thus determining frequency bands based on measurement information. FIG. 1 is a constitutional illustration relating to an example of a radio communication system according to the first embodiment of the present invention. In FIG. 1, radio terminal stations 111 to 113 belong to a cell 1 which is a cell of a radio base station 110. Radio terminal stations 121 to 123 belong to a cell 2 which is a cell of a radio base station 120. Radio terminal stations 131 to 133 belong to a cell 3 which is a cell of a radio base station 130.

Figure 2:
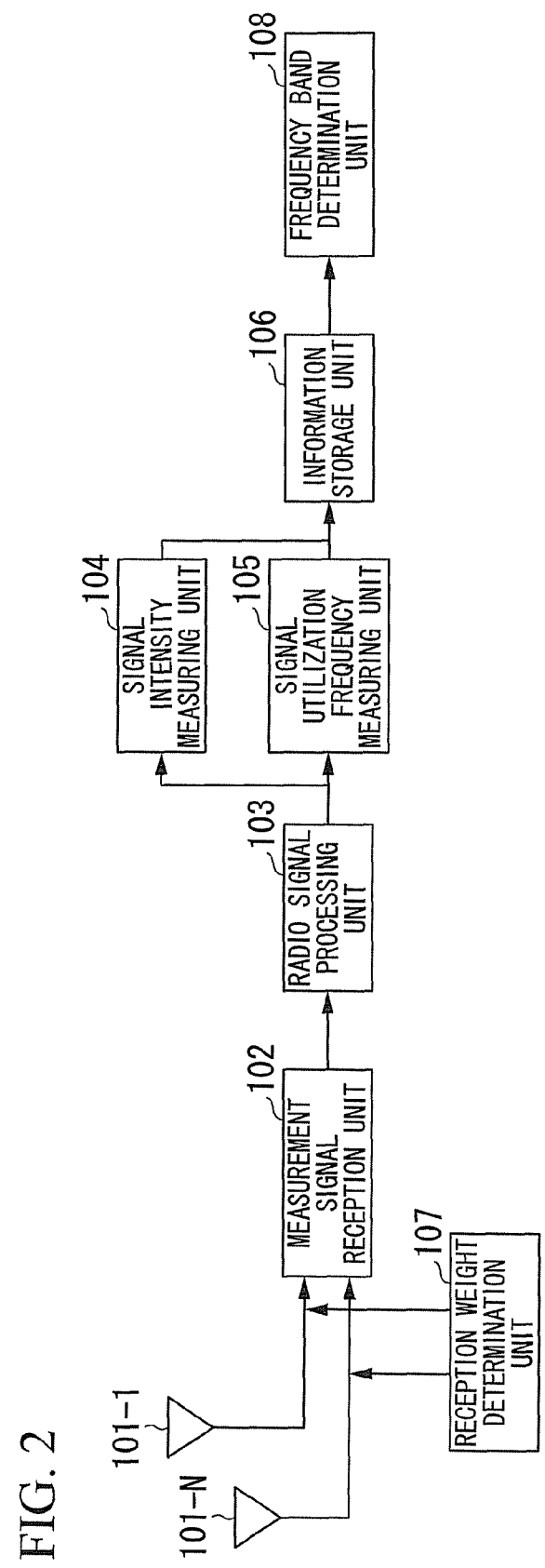
FIG. 2 A block diagram of a constitution of a radio base station according to first, second, and third embodiments of the present invention.

FIG. 2 is a block diagram showing an example of the constitution of a radio base station of the first embodiment. Each of the radio base stations 110, 120, 130 shown in FIG. 1 is furnished with the constitution shown in FIG. 2. The radio base station includes at least one antenna 101-1 (to 101-N), a measurement signal reception unit 102, a radio signal processing unit 103, a signal intensity measuring unit 104, a signal utilization frequency measuring unit 105, an information storage unit 106, a reception weight determination unit 107, and a frequency band determination unit 108.

The measurement signal reception unit 102 receives radio signals from other cells in the periphery of the radio base station.

The radio signal processing unit 103 converts radio signals received by the measurement signal reception unit 102 into both analog signals and digital signals.

The signal intensity measuring unit 104 measures signal intensities of radio base stations or radio terminal stations of other cells existing in the periphery of the radio base station with respect to a part of or a full range of a utilized frequency band.

The signal utilization frequency measuring unit 105 measures radio signals from radio base stations or radio terminal stations of other cells existing in the periphery of the radio base station with respect to a part of or full range of a utilized frequency band in a predetermined time interval, thus measuring utilization frequencies. The utilization frequency is a value indicating whether or not signal intensity above a certain signal intensity can be utilized during the total measurement time in performing measurement per every predetermined time interval.

The information storage unit 106 stores pieces of information measured by the signal intensity measuring unit 104 and the signal utilization frequency measuring unit 105. FIG. 3 shows examples of data regarding average values and signal intensities, which are measured per each reception weight and each frequency band and stored in the information storage unit 106. FIG. 4 shows examples of data regarding average signal intensities and average signal utilization frequencies, which are measured per each frequency band and stored in the information storage unit 106. This description refers to an example in which signal intensities measured per each reception weight and each frequency band, and average signal intensities and average signal utilization frequencies measured per each frequency band are stored in different tables, whereas average signal intensities and average signal utilization frequencies can be detected per each reception weight and each frequency band so that their information is stored.

Figure 5:
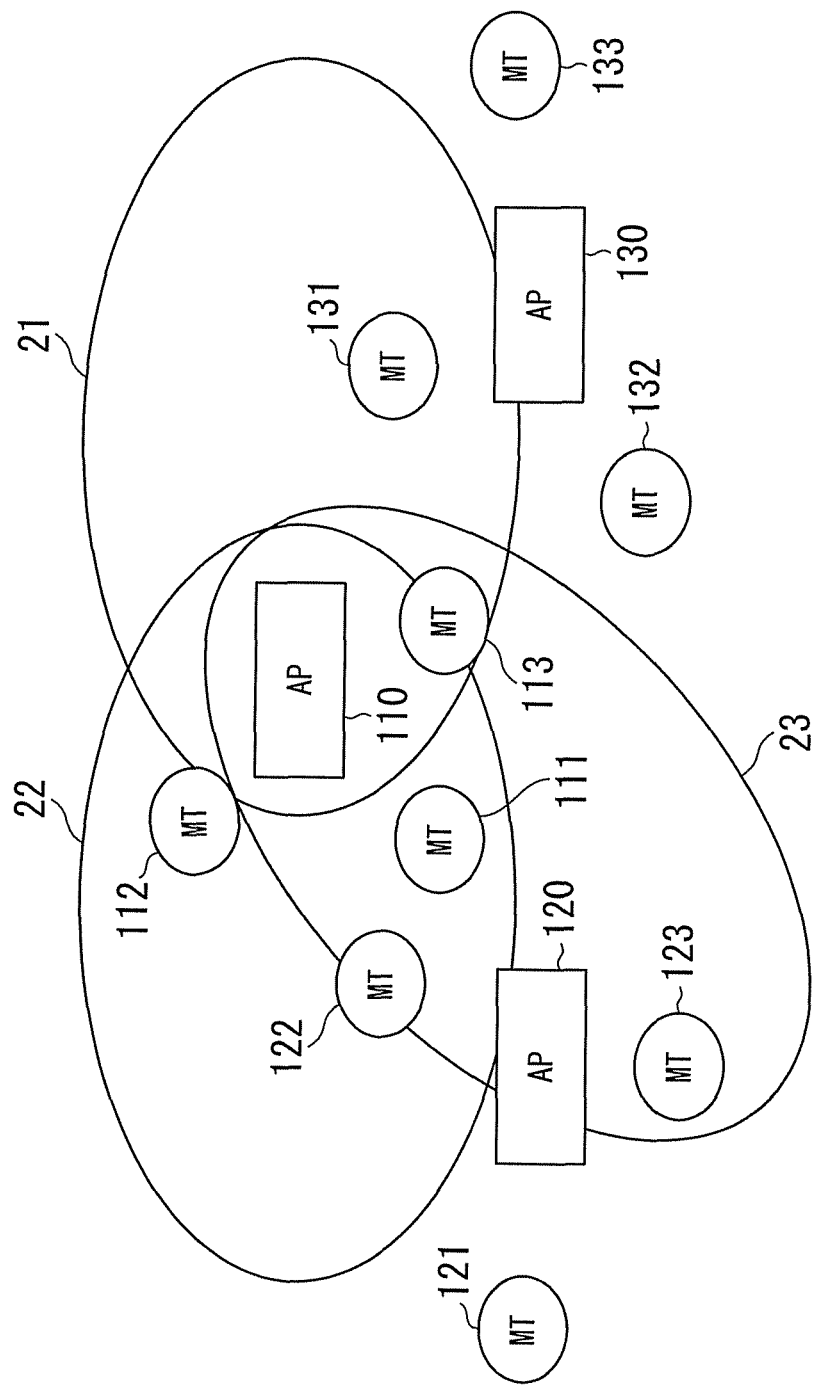
FIG. 5 An illustration of cell areas changed according to the first embodiment of the present invention.

The reception weight determination unit 107 determines reception weights adapted to the antennas 101-1 to 101-N, controls directivities of antennas by applying reception weights, and changes cell areas. FIG. 5 shows an example of cell areas encompassed by the radio base station 110 adopting various reception weights. Reference numeral 21 denotes a cell area encompassed by the radio base station 110 adopting a first reception weight. Reference numeral 22 denotes a cell area encompassed by the radio base station 110 adopting a second reception weight. Reference numeral 23 denotes a cell area encompassed by the radio base station 110 adopting a third reception weight. By changing a cell area adopting a reception weight, each radio base station is able to receive radio signals from radio terminal stations located in an area different from the original area not adopting a reception weight.

The frequency band determination unit 108 determines frequency bands used for communication based on information stored in the information storage unit 106. In order to determine a frequency band based on examples of data shown in FIG. 3, for example, it determines a first frequency band with the lowest reception signal intensity for use in communication. Alternatively, in order to determine a frequency band based on examples of data shown in FIG. 4, it determines a second frequency band with the lowest average signal utilization frequency for use in communication.

In this radio communication system, different frequency bands are allocated to cells in order to reduce interference between cells formed with a plurality of radio base stations. For instance, the cell 1 of the radio base station 110 overlaps with the cell 2 of the radio base station 120. Radio terminal stations (e.g. the radio terminal stations 111, 122, 113, 131) located in overlapped areas between cells may receive interference signals corresponding to radio waves transmitted from radio base stations with cells different from cells of their counterpart radio base stations, which may interfere with communication with their counterpart radio base stations. To prevent interference of communication, different frequency bands are allocated to cells so as to prevent interference with radio signals.

In contrast, the cell 2 of the radio base station 120 does not overlap with the cell 3 of the radio base station 130, wherein no interference occur with radio waves from another radio base station even when the same frequency band is shared between these cells. For this reason, the same frequency band is allocated to the radio base stations 120 and 130, by which each radio base station belonging to each cell conducts data communication with radio terminal stations belonging to each cell. That is, the radio base station 110 belonging to the cell 1 conducts data communication with the radio terminal stations 111 to 113 belonging to the cell 1 by use of a first frequency band; the radio base station 120 belonging to the cell 2 conducts data communication with the radio terminal stations 121 to 123 by use of a second frequency band; and the radio base station 130 belonging to the cell 3 conducts data communication with the radio terminal stations 131 to 133 belonging to the cell 3 by use of the second frequency band. When K denotes a certain cell (where K is an arbitrary positive integer), and $N_k$ denotes the number of radio base stations belonging to the cell K, a radio base station 1K0 belonging to the cell K conducts data communication with radio terminal stations 1K1, 1K2, ..., 1KL, ..., 1KN$_k$ (where $1 \leq L \leq N_k$).

Figure 6:
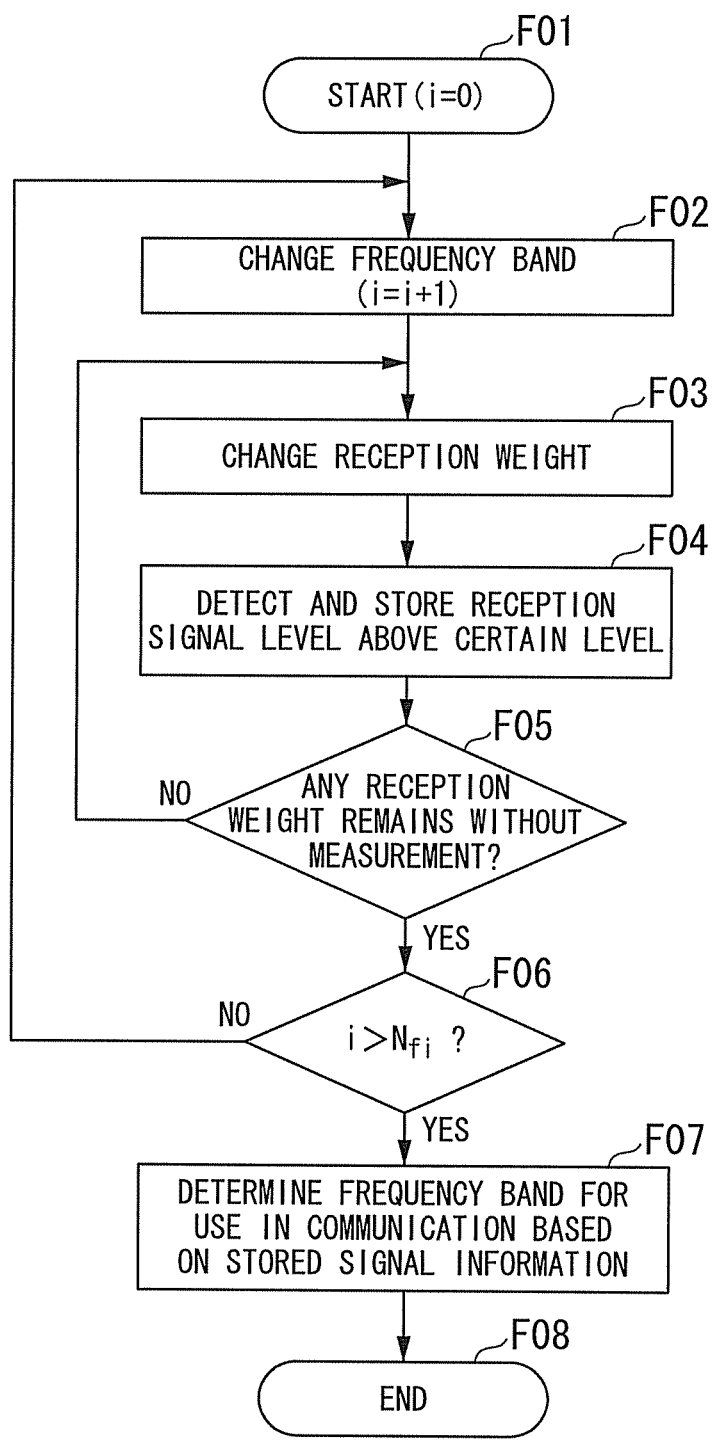
FIG. 6 A flowchart for explaining the operation of a radio communication system according to the first embodiment of the present invention.

Next, the operation of the radio communication system of the present embodiment will be described. FIG. 6 is a flowchart showing the operation of the present embodiment in which the radio base station 110 changes reception weights so as to measure radio signals from radio base stations or radio terminal stations belonging to other cells. When the radio base station 110 starts a measurement process (step F01), the measurement signal reception unit 102 determines a frequency band which is determined to perform measurement, thus start receiving radio signals in the determined frequency band (step F02). The reception weight determination unit 107 determines reception weights for use in measurement, and applies the determined reception weights to antennas.

The signal intensity measuring unit 104, applied with a certain reception weight, measures signal intensities of signals from radio base stations or radio terminal stations belonging to other cells located in the periphery of the current radio base station. The signal intensity measuring unit 104 detects measured signal intensities above a predetermined level and stores them in the information storage unit 106 (step F04). The signal utilization frequency measuring unit 105 measures signal utilization frequencies with respect to radio base stations or radio terminal stations belonging to other cells located in the periphery of the current radio base station, and stores them in the information storage unit 106.

The reception weight determination unit 107 makes a decision as to whether or not measurement has been completely performed with all the predetermined reception weights (step F05). When the reception weight determination unit 107 determines that measurement has not been completely performed with all the predetermined reception weights and that reception weights still remain without being used in measurement (step F05: NO), the flow returns to step F03 so that the reception weight is changed with a new one, whereby signal intensities and utilization frequencies are measured and stored by use of the new reception weight, so that a series of steps F03 to F05 is repeated.

When the reception weight determination unit 107 determines that measurement has been completely performed with all the predetermined reception weights and that no reception weight remains without being used in measurement in step F05 (step F05: YES), the frequency band determination unit 108 makes a decision as to whether or not measurement has been completely performed with respect to all the predetermined divisions of frequency bands. Herein, a variable i is initialized (i=0), for example, so that the variable i is incremented every time a frequency band is changed. In step F06, the variable i is compared to the number $N_{fi}$ of frequency bands. The frequency band determination unit 108 determines that measurement has been completely performed with respect to all the predetermined frequency bands when i exceeds $N_{fi}$, whilst it determines that measurement has not been completely performed with respect to all the predetermined frequency bands when i is equal to $N_{fi}$ or less (step F06).

When the frequency band determination unit 108 determines that measurement has not been completely performed with respect to all the frequency bands (step F06: NO), the flow returns to step F02 so that the measurement signal reception unit 102 changes the frequency band for receiving radio signals, wherein a series of steps F02 to F06 is repeatedly performed. When the frequency band determination unit 108 determines that measurement has been completely performed with respect to all the predetermined frequency bands in step F06 (step F06: YES), the frequency band determination unit 108 reads the information stored in the information storage unit 106 so as to determine a frequency band yielding the highest throughput based on the read information (step F07). The measurement signal reception unit 102 conducts communication using radio signals belonging to the predetermined frequency band. By appropriately determining frequency bands for use in cells, it is possible to increase throughputs with regard to radio base stations or radio terminal stations belonging to cells.

Second Embodiment

Next, the second embodiment of the present invention will be described. The second embodiment increases speed in detecting a frequency band yielding the maximum throughput by reducing the number of reception weights to be changed in the foregoing method of the reception weight determination unit 107 for selecting reception weights in the first embodiment. In this case, a reception weight achieving the maximum throughput in communication from each radio base station to each radio terminal station is used as a reception weight for detection, thus reducing the number of signal detection weights.

Third Embodiment

Next, the third embodiment of the present invention will be described. Similar to the second embodiment, the third embodiment reduces the number of reception weights to be changed in the foregoing method of the reception weight determination unit 107 for selecting reception weights. Herein, each radio base station divides incoming directions of radio waves into blocks by θ degrees, wherein a reception weight ascribed to each block is used as a signal detection weight, thus reducing the number of times in changing signal detection weights.

In this case, for example, the current radio base station stores both of signal intensity of a radio terminal station serving as a communicating correspondence thereof and signal intensity of an interference station different from the communicating correspondence in each of blocks, which are divisions of incoming directions of radio waves by θ degrees, with respect to each frequency channel. For instance, levels of desired signals, levels of interference signals, or signal utilization frequencies are stored in connection with six incoming-direction blocks divided with θ=60 degrees.

Fourth Embodiment

Next, the fourth embodiment of the present invention will be described. In the fourth embodiment, radio terminal stations periodically measure signal utilization frequencies and signal intensities of radio signals from radio base stations or radio terminal stations belonging to other cells so as to periodically notify their measurement information to radio base stations belonging to their cell. Upon receiving notification signals, radio base stations determine frequency bands by use of notification signals.

Figure 7:
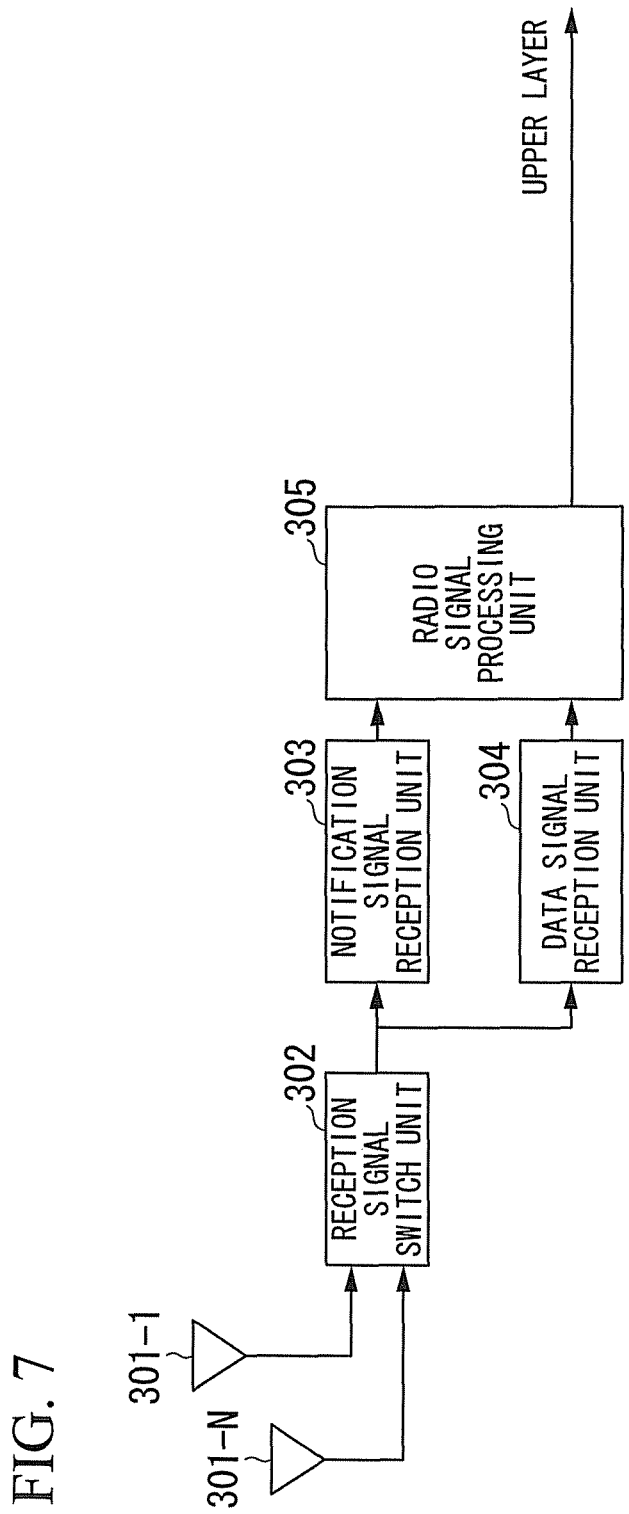
FIG. 7 A block diagram of a constitution of a radio base station according to a fourth embodiment of the present invention.

The constitution of the fourth embodiment is identical to the constitution of the first embodiment which is described with reference to FIG. 1, wherein it includes the radio base stations 110, 120, 130 and a plurality of radio terminal stations belonging to each of their cells. FIG. 7 is a block diagram showing the constitution of each radio base station according to the fourth embodiment. In the fourth embodiment, each of the radio base stations 110, 120, 130 has the constitution of FIG. 7. The radio base station of the fourth embodiment includes at least one antenna 301-1 (to 301-N), a reception signal switch unit 302, a notification signal reception unit 303, a data signal reception unit 304, and a radio signal processing unit 305.

The reception signal switch unit 302 switches between a data signal (except for a notification signal) of a radio terminal station and the notification signal of the radio terminal station (i.e. a radio signal, used for frequency determination, which is terminated between the radio base station and the radio terminal station) received by the antenna 301. When a reception signal received by the antenna 301 is a data signal, the reception signal switch unit 302 forwards the data signal to the data signal reception unit 304. Upon receiving a notification signal, the notification signal is forwarded to the notification signal reception unit 303.

The notification signal reception unit 303 receives a notification signal from a radio terminal station. The data signal reception unit 304 receives a data signal from a radio terminal station. The radio signal processing unit 305 performs bidirectional conversion between analog signals and digital signals on reception signals. The radio signal processing unit 305 converts reception signals into digital signals, which are transmitted to the upper layer.

Figure 8:
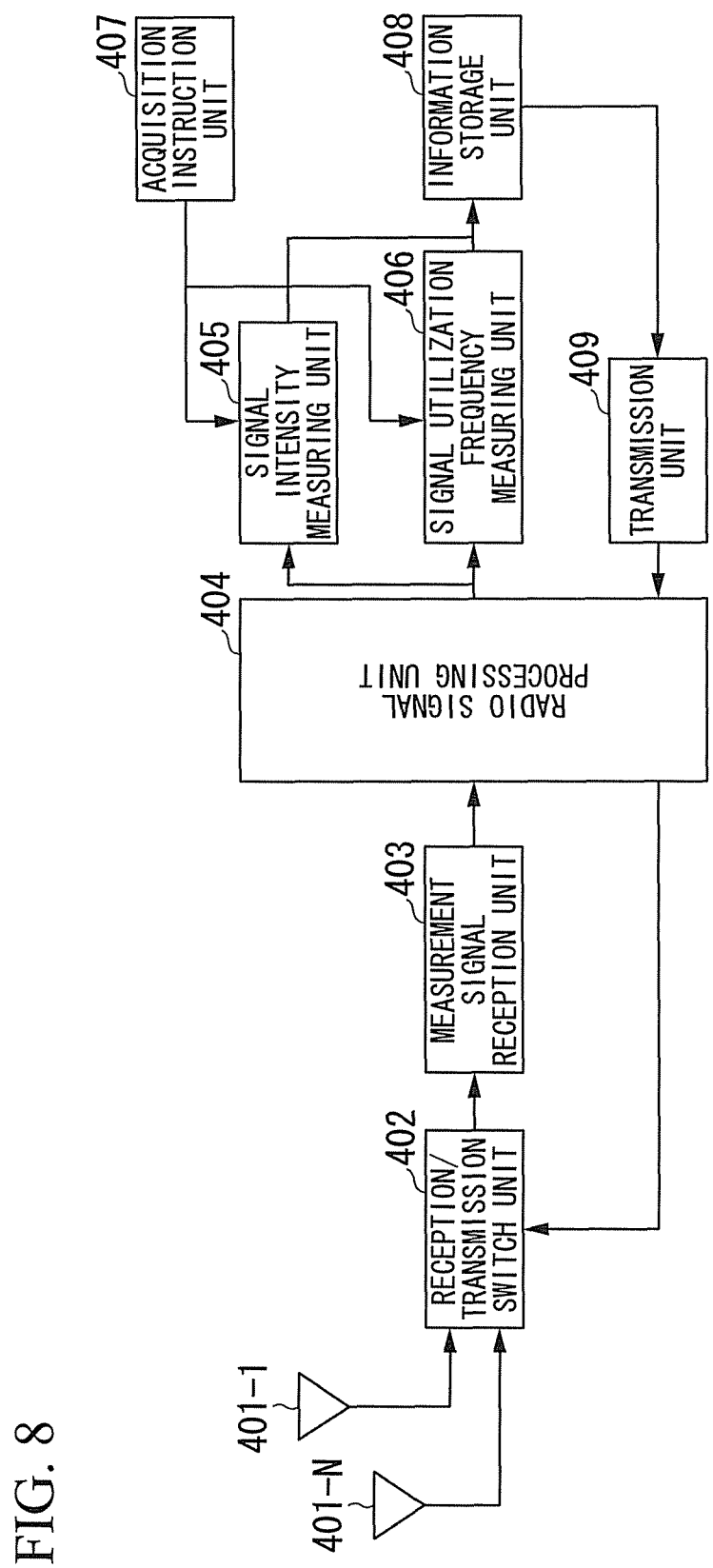
FIG. 8 A block diagram of a constitution of a radio terminal station according to the fourth embodiment of the present invention.

FIG. 8 is a block diagram showing the constitution of a radio terminal station of the fourth embodiment. In the fourth embodiment, all the radio terminal stations 111-113, 121-123, 131-133 belonging to their radio base stations have the constitution of FIG. 8. The radio terminal station includes at least one antenna 401-1 (to 401-N), a reception/transmission switch unit 402, a measurement signal reception unit 403, a radio signal processing unit 404, a signal intensity measuring unit 405, a signal utilization frequency measuring unit 406, an acquisition instruction unit 407, an information storage unit 408, and a transmission unit 409.

The reception/transmission switch unit 402 switches over reception and transmission. The measurement signal reception unit 403 receives radio signals from other cells located in the periphery of the current terminal station. The signal intensity measuring unit 405 measures signal intensities of radio base stations or radio terminal stations belonging to cells located in the periphery of the current radio terminal station with respect to a part of or the full range of the utilized frequency band. When the measurement result indicates that no radio wave comes from other cells, the signal intensity measuring unit 405 may provide a vacant frequency detection means for detecting a vacant frequency band.

The signal utilization frequency measuring unit 406 measures radio signals from radio base stations or radio terminal stations belonging to other cells located in the periphery of the current radio terminal station for a predetermined time, thus measuring utility frequencies. When the measurement result indicates that no radio wave comes from other cells, the signal utilization frequency measuring unit 406 may detect a vacant frequency band.

The acquisition instruction unit 407 periodically instructs the signal intensity measuring unit 405 and the signal utilization frequency measuring unit 406 to perform measurement. The information storage unit 408 stores the information measured by the signal intensity measuring unit 405 and the signal utilization frequency measuring unit 406. The transmission unit 409 periodically transmits and notifies the stored information of the information storage unit 408 to the radio base station belonging to the cell locating the current radio terminal station.

Figure 9:
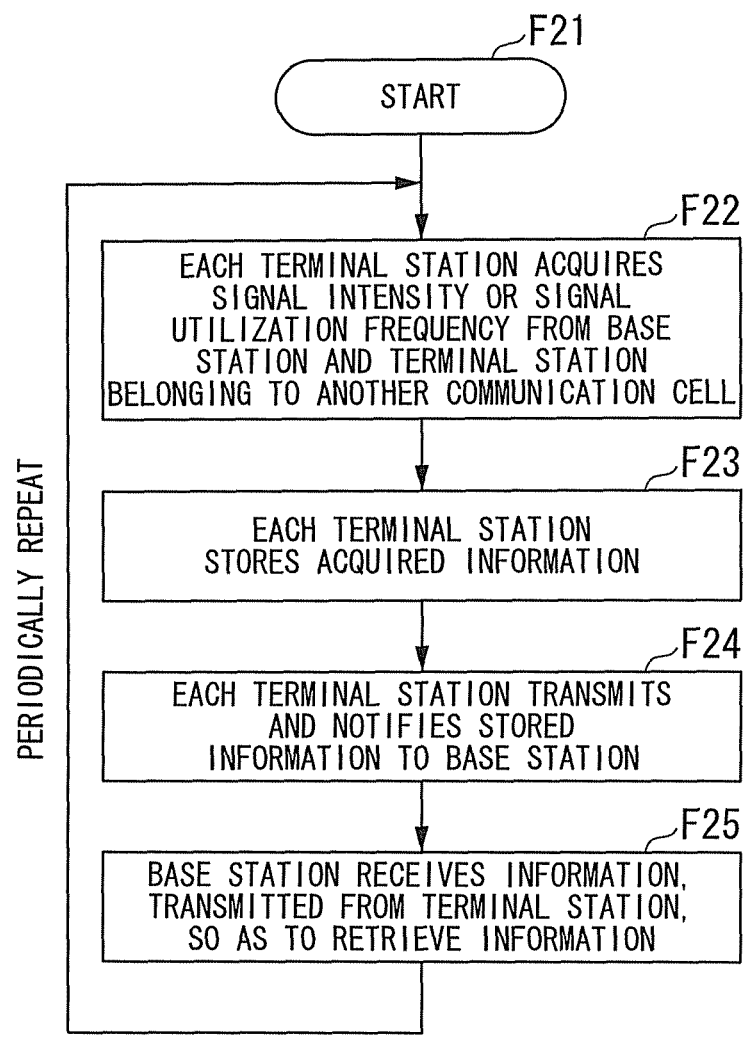
FIG. 9 A flowchart for explaining the operation of a radio communication system according to the fourth embodiment of the present invention.
Figure 10:
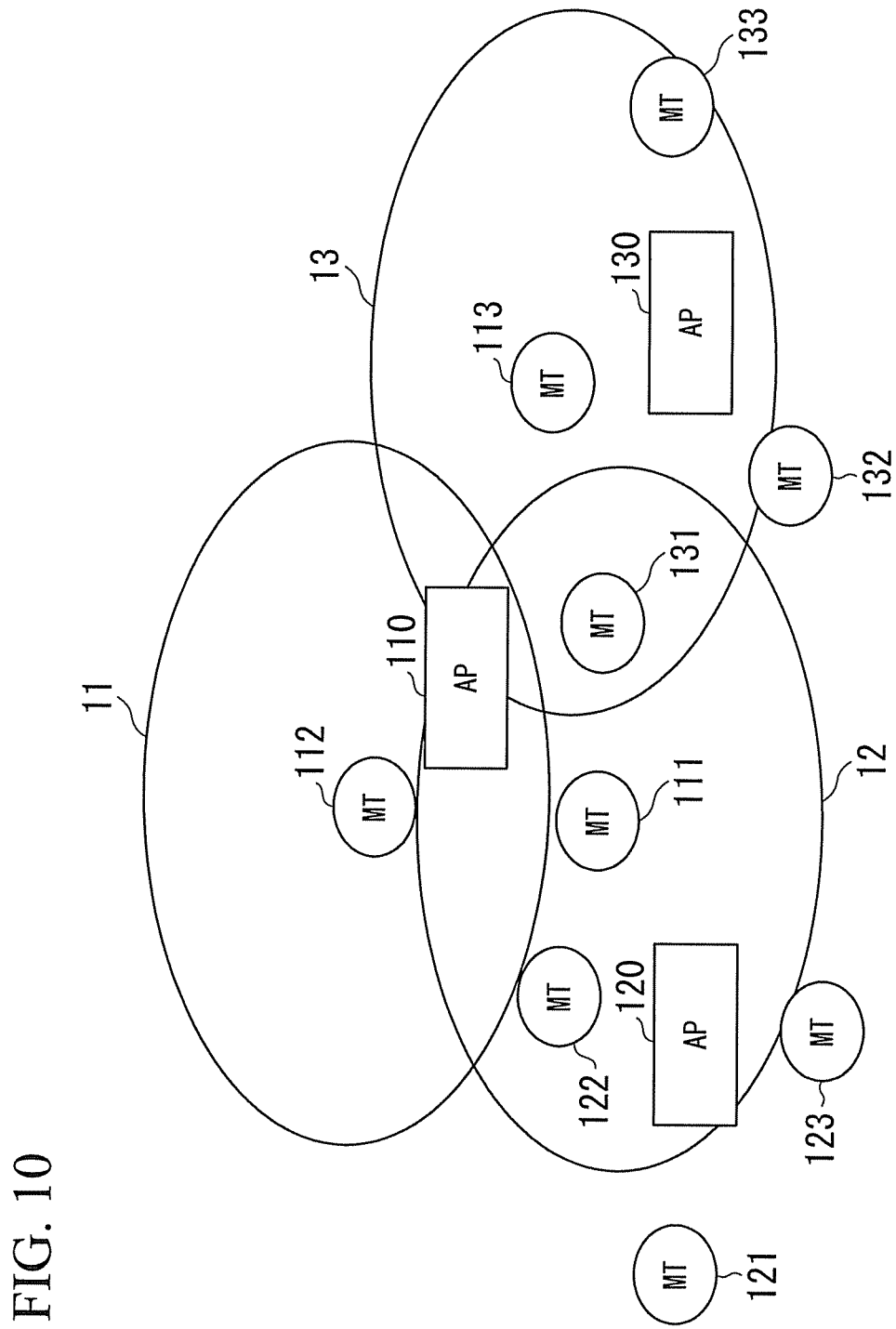
FIG. 10 An illustration of cells according to the fourth embodiment of the present invention.

FIG. 9 is a flowchart showing the operation of the fourth embodiment in which the radio terminal station acquires information and sends it to the radio base station. When the radio communication system starts processing (step F21), as shown in FIG. 4, the current radio terminal station changes its frequency band and its reception weight so as to measure signal intensities or signal utilization frequencies of radio signals from radio base stations or radio terminal stations belonging to other cells located in the periphery of the current radio terminal station (step F22). The following description will be made specifically with reference to the radio terminal stations belonging to the cell 1. FIG. 10 shows the situation in which radio terminal stations belonging to the cell 1 are dispersed in different cells.

The radio base station 120 and the radio terminal stations 122, 131 are regarded as radio base stations and radio terminal stations belonging to other cells located in the periphery of the radio terminal station 111. The radio base station 130 and the radio terminal stations 131, 133 are regarded as those stations with respect to the radio terminal station 113. No radio base station or radio terminal station belonging to other cells is located in the periphery of the radio terminal station 112. Each radio terminal station stores the measurement information in the information storage unit 408 (step F23). The transmission unit 409 transmits the information stored in the information storage unit 408 in step F23 to the radio base station belonging to its own cell as a notification signal, thus notifying information (step F24). The radio base station receives the notification signal to retrieve the information (step F25). By repeating a series of steps F22 to F25 per each time interval, the radio base station updates the information pertaining to interference to radio terminal stations belonging to its own cell from other cells. Owing to this operation, the radio base station is able to acquire the information pertaining to the periphery of radio terminal stations belonging to its own cell.

FIG. 11 shows an example of data included in the information acquired by the radio base station. This figure shows signal intensities and signal utilization frequencies of radio signals transmitted from radio base stations or radio terminal stations belonging to other cells located in the periphery of the radio terminal stations 111 to 113 with respect to a first frequency band and a second frequency band. Since it is difficult to judge utilization of radio signals with low signal intensities, the results of signal utilization frequencies are discarded with respect to signal intensities below a certain threshold value. This example discards the results of signal utilization frequencies with respect to signal intensities below 130 dBm. The frequency band determination unit 108 determines frequency bands by use of these data. Through comparison between the results of signal utilization frequencies with respect to signal intensities above the threshold value, for example, communication is performed using the second frequency band yielding the lowest signal utilization frequency. Thus, it is possible to improve throughputs by use of frequency bands with low signal utilization frequencies.

Fifth Embodiment

Next, the fifth embodiment of the present invention will be described. The fifth embodiment refers to the fourth embodiment, allowing each radio terminal station to perform measurement, and further describes that each radio terminal station does not periodically conduct notification to its radio base station but each radio station performs notification to its radio base station only when the radio base station sends a notification request to the radio terminal station. The constitution of the fifth embodiment is identical to the constitution of the first embodiment shown in FIG. 1.

Figure 12:
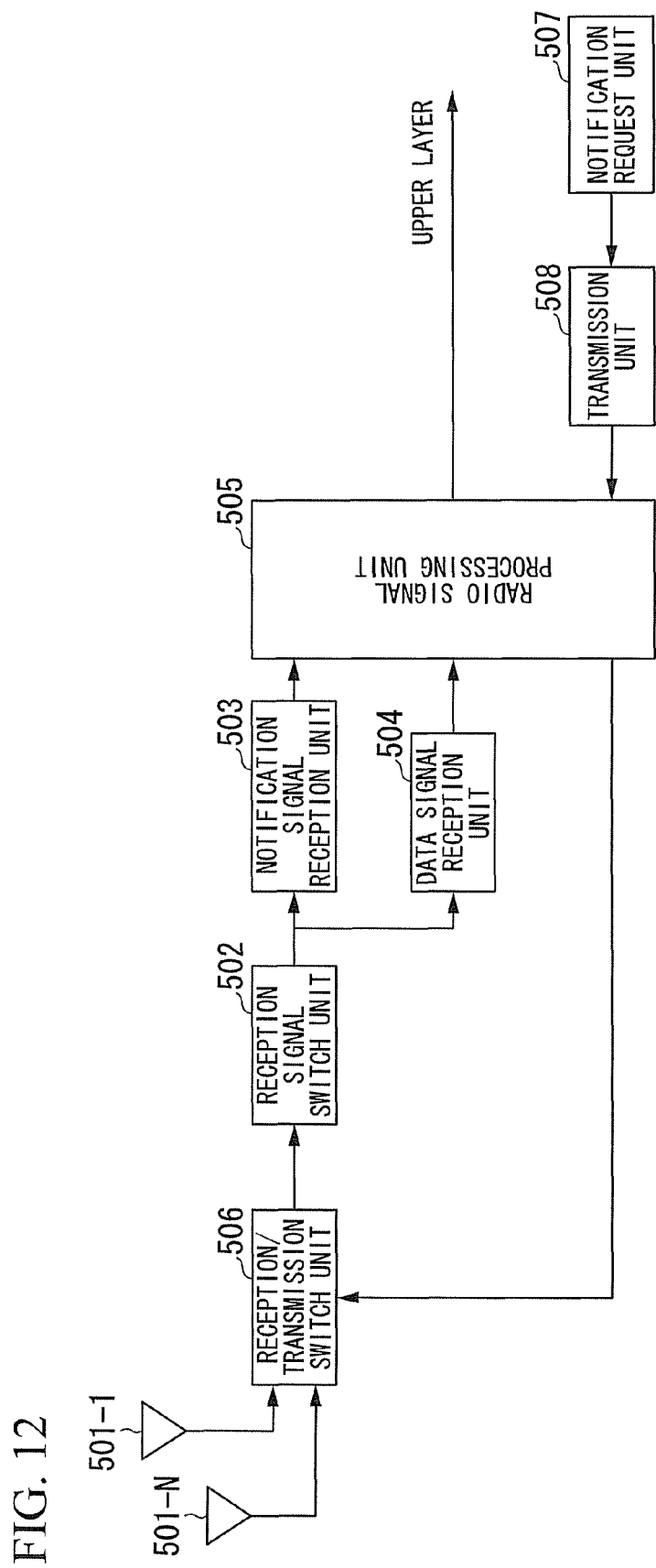
FIG. 12 A block diagram of a constitution of a radio base station according to a fifth embodiment of the present invention.

FIG. 12 is a block diagram showing the constitution of a radio base station according to the fifth embodiment. Each of the radio base stations 110, 120, 130 has the constitution shown in FIG. 12. The radio base station includes at least one antenna 501-1 (to 501-N), a reception signal switch unit 502, a notification signal reception unit 503, a data signal reception unit 504, a radio signal processing unit 505, a reception/transmission switch unit 506, a notification request unit 507, and a transmission unit 508. Herein, the constituent elements similar to the constitution elements of the radio base station of the fourth embodiment are not described.

The reception/transmission switch unit 506 switches to reception when receiving a notification signal or a data signal or switches to transmission when sending a notification request. The notification request unit 507 generates a request signal to each radio terminal station in order to collect information from radio terminal stations belonging to the cell of the radio base station. The transmission unit 508 transmits a request signal generated by the notification request unit 507.

Figure 13:
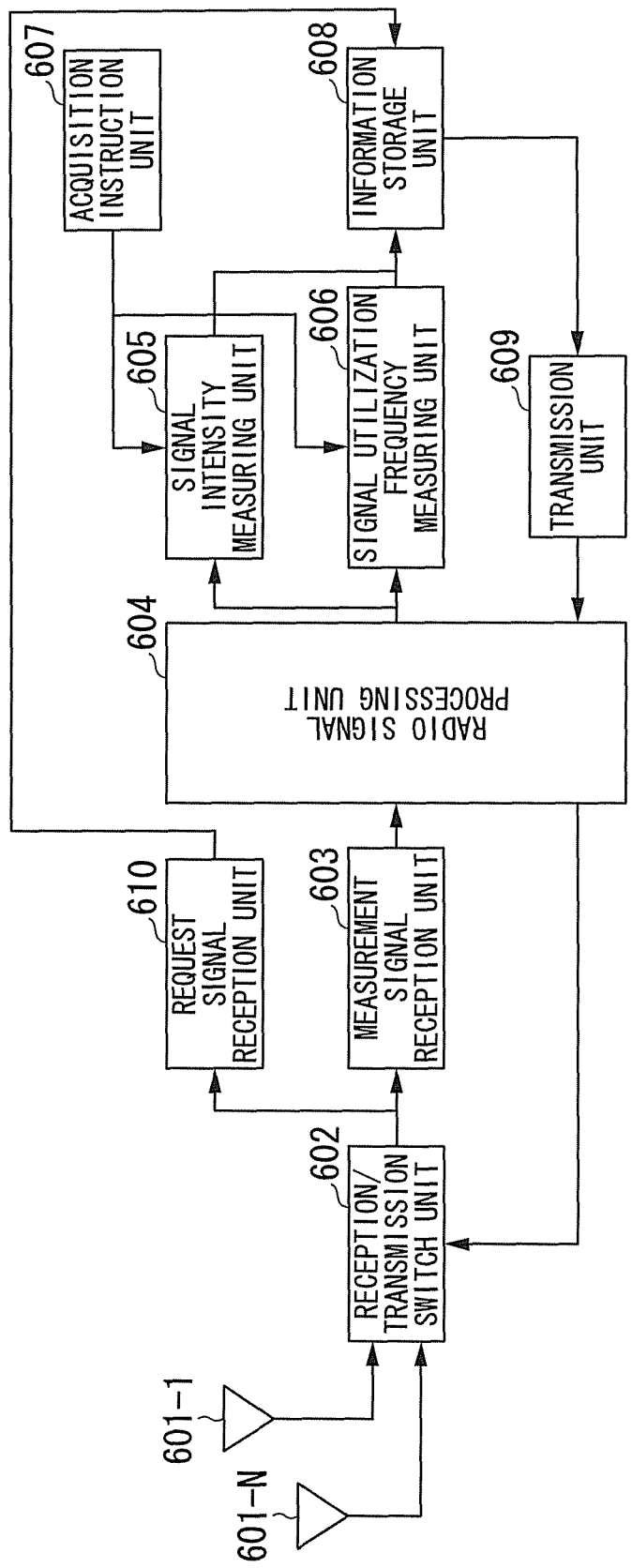
FIG. 13 A block diagram of a constitution of a radio terminal station according to the fifth embodiment of the present invention.

FIG. 13 is a block diagram showing the constitution of a radio terminal station according to the fifth embodiment. Each of the radio terminal stations 111-113, 121-123, 131-133 has the constitution of FIG. 13. As shown in FIG. 13, the radio terminal station includes at least one antenna 601-1 (to 601-N), a reception/transmission switch unit 602, a measurement signal reception unit 603, a radio signal processing unit 604, a signal intensity measuring unit 605, a signal utilization frequency measuring unit 606, an acquisition instruction unit 607, an information storage unit 608, a transmission unit 609, and a request signal reception unit 610. Herein, the constituent elements similar to the constituent elements of the radio terminal station of the fourth embodiment are not described. The request signal reception unit 610 receives a request signal transmitted from the radio base station. Upon receiving the request signal, the request signal reception unit 610 transmits the stored information of the information storage unit 608 to the radio base station via the transmission unit 609.

Figure 14:
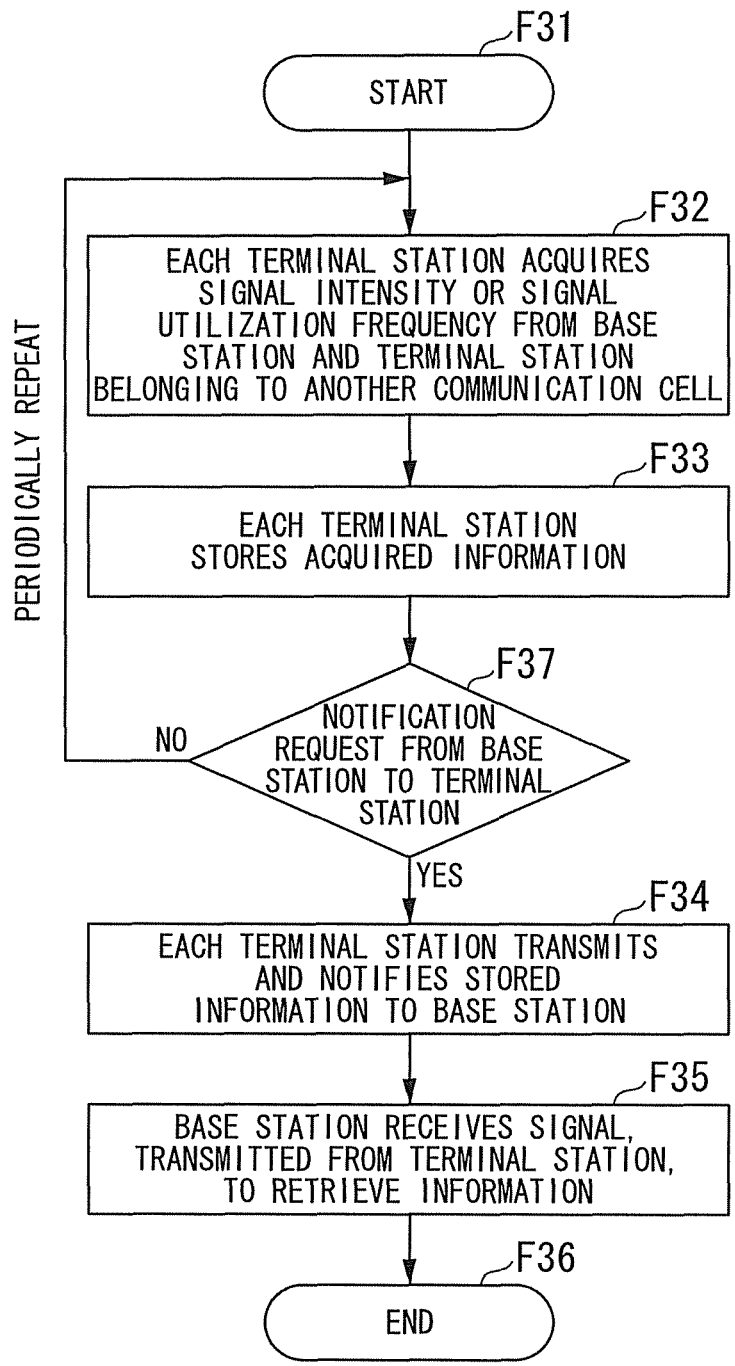
FIG. 14 A flowchart for explaining the operation of a radio communication system according to the fifth embodiment of the present invention.

FIG. 14 is a flowchart showing the operation of the radio terminal station of the fifth embodiment for acquiring information and notifying it to the radio base station. The radio terminal station measures and acquires signal intensities or signal utilization frequencies of radio base stations or radio terminal stations belonging to other cells located in the periphery thereof (step F32). The following description refers to radio terminal stations belonging to the cell 1 as radio base stations or radio terminal stations belonging to other cells located in the periphery of each radio terminal station. The radio terminal station stores the measured or acquired information (step F33). The radio terminal station periodically repeats a series of steps F32 and F33, thus updating its information. When the radio base station sends a notification request of information to a radio terminal station belonging to its own cell, the radio terminal station receiving the notification request of information notifies the radio base station of the stored information (step F34).

The radio base station notified of the information receives a notification signal so as to retrieve the information (step F35). To update information, the radio base station sends a notification request to a radio terminal station, thus updating the information of the radio terminal station belonging to its own cell. According to this processing of the fifth embodiment, the radio terminal station does not periodically perform notification to the radio base station, but the radio terminal station performs notification to the radio base station only when the radio base station sends a notification request to the radio terminal station. The radio base station notified of the information operates similarly to the fourth embodiment so as to improve throughput by utilizing a frequency band with a low signal utilization frequency based on the measurement result of signal intensities and signal utilization frequencies.

Sixth Embodiment

Next, the sixth embodiment of the present invention will be described. The sixth embodiment refers to the fourth and fifth embodiments, allowing each radio terminal station to perform measurement, and further describes that the radio terminal station does not periodically measure signal utilization frequencies or signal intensities of radio signals from radio base stations or radio terminal stations belonging to other cells located in the periphery thereof, but the radio terminal station conducts measurement and notifies it to the radio base station only when the radio base station sends a notification request to the radio terminal station. The constitution of the sixth embodiment is identical to the constitution of the first embodiment shown in FIG. 1.

Figure 15:
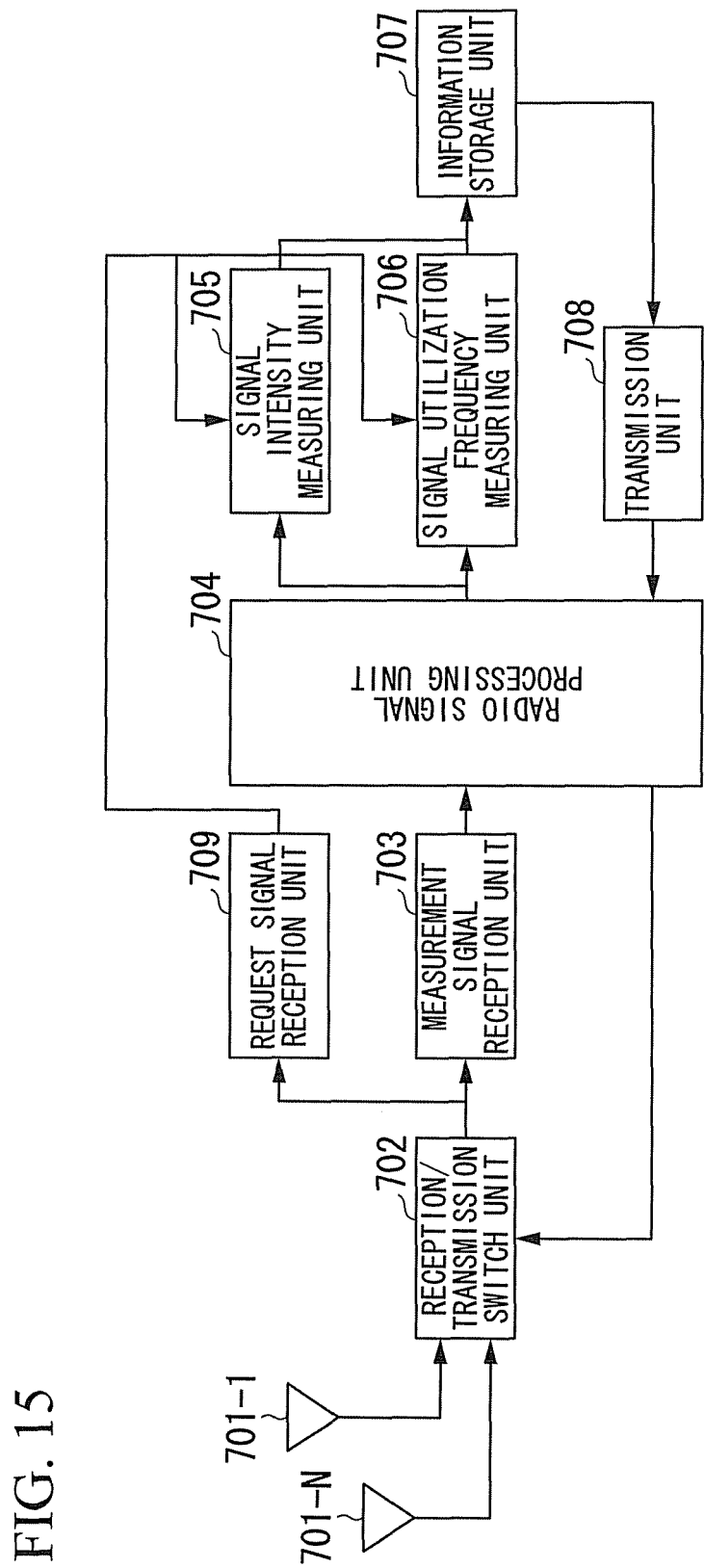
FIG. 15 A block diagram of a constitution of a radio terminal station according to a sixth embodiment of the present invention.

FIG. 15 is a block diagram showing the constitution of a radio terminal station according to the sixth embodiment. Each of the radio terminal stations 111-113, 121-123, 131-133 has the constitution shown in FIG. 15. The radio terminal station includes at least one antenna 701-1 (to 701-N), a reception/transmission switch unit 702, a measurement signal reception unit 703, a radio signal processing unit 704, a signal intensity measuring unit 705, a signal utilization frequency measuring unit 706, an information storage unit 707, a transmission unit 708, and a request signal reception unit 709. Herein, the constituent elements similar to the constituent elements of the radio terminal station of the fifth embodiment are not described. The request signal reception unit 709 receives a request signal transmitted from the radio base station. Upon receiving the request signal, the measurement signal reception unit 703 measures received radio signals.

Figure 16:
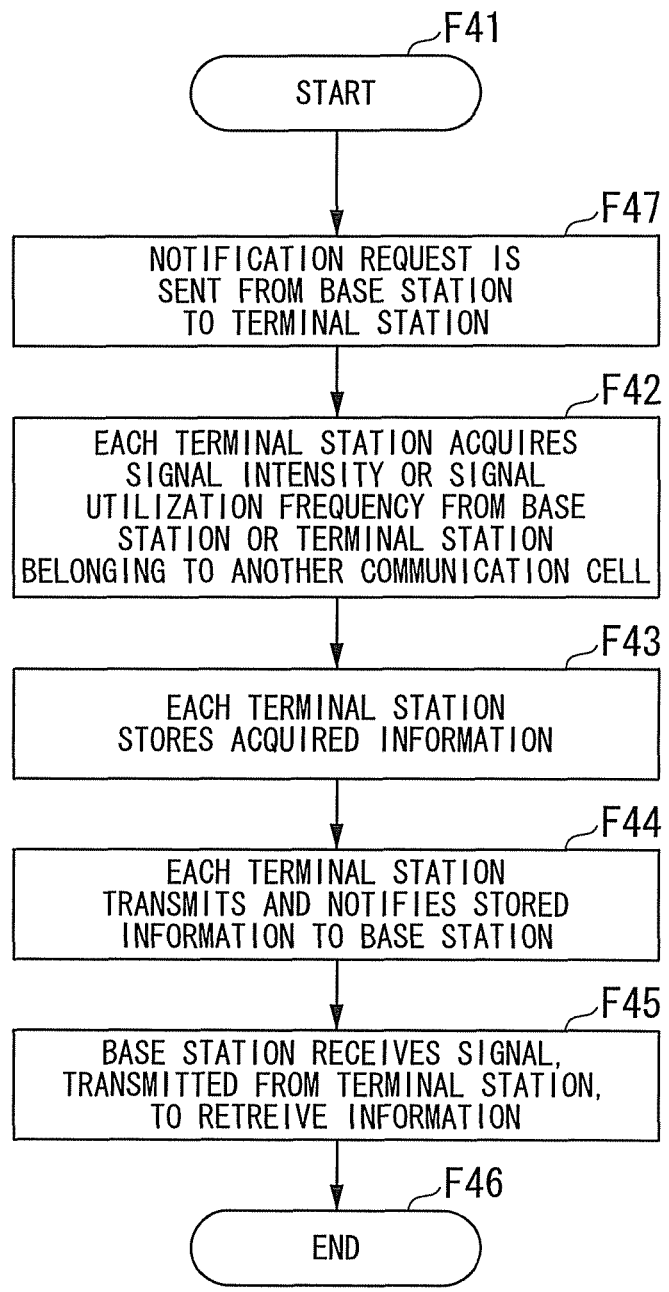
FIG. 16 A flowchart for explaining the operation of a radio communication system according to the sixth embodiment of the present invention.

FIG. 16 is a flowchart showing the operation of the radio base station of the sixth embodiment for sending a notification request to a radio terminal station, receiving radio signals sent from the radio terminal station, and retrieving information. First, the radio base station requests each radio terminal station to provide signal information pertaining to other cells in the periphery of each radio terminal station (step S47). Next, the radio base station measures signal utilization frequencies or signal intensities of radio signals from radio base stations or radio terminal stations belonging to other cells located in the periphery of each radio terminal station (step F42). The following description refers to radio terminal stations belonging to the cell 1 as radio base stations or radio terminal stations belonging to other cells located in the periphery of each radio terminal station. Next, each radio terminal station stores the measured or acquired information (step F43).

The radio terminal station receiving a request notifies the stored information to the radio base station (step F44). The radio base station notified of the information receives a notification signal to retrieve the information (step F45). To update information, the radio base station sends a notification request to a radio terminal station so as to update the information of the radio terminal station belonging to its own cell. According to this processing, the radio terminal station does not periodically perform notification to the radio base station, but the radio terminal station performs notification to the radio base station only when the radio base station sends a notification request to the radio terminal station. The radio base station notified of the information operates similarly to the fourth or fifth embodiment so as to improve throughput by utilizing a frequency band with a low signal utilization frequency based on the measurement result of signal intensities and signal utilization frequencies.

Seventh Embodiment

Next, the seventh embodiment of the present invention will be described. The seventh embodiment determines frequency bands based on the foregoing measurement result in which the radio terminal station, defined in the fourth, fifth, and sixth embodiments, measures signal intensities and signal utilization frequencies by use of a plurality of reception weights. As the method for notifying information of the radio terminal station to the radio base station, it is possible to employ any one of the methods defined in the fourth, fifth, and sixth embodiments. By changing reception weights applied to radio terminal stations, it is possible to notify information extracted from a broad range of radio signals, thus improving throughput.

Eighth Embodiment

Next, the eighth embodiment of the present invention will be described. In the eighth embodiment, the radio base station determines a modulation method and a coding rate maximizing throughput in each radio terminal station belonging to its own cell by use of signal intensities of radio signals from radio base stations or radio terminal stations belonging to other cells located in the periphery of each radio terminal station belonging to its own cell. Considering the fact that interference may decrease by use of a modulation method and a coding rate different from those of radio base stations or radio terminal stations belonging to other cells, it is possible to improve throughput by way of this method similar to the foregoing method using a frequency band with a low signal utilization frequency. For instance, the radio base station stores the content of table shown in FIG. 17 and refers to the stored content of table so as to determine a modulation method and a coding rate based on a reception signal to noise ratio, i.e. a ratio of measured signal intensity to noise, thus increasing the amount of communication.

According to the first to eighth embodiments particularly applied to the radio communication system in which a plurality of radio base stations and a plurality of radio terminal stations operates in an autonomous distributed manner, the radio base station and the radio terminal station measure or acquire signal utilization frequencies and signal intensities of signals from radio base stations or radio terminal stations belonging to other cells, while the radio base station changes a frequency band, maximizing throughput of its own cell, or adjusts multi-valued modulation or a coding rate by use of the acquired information, thus increasing the amount of communication.

The eighth embodiment selects a frequency band by use of signals receivable with the radio base station and the radio terminal station, wherein the radio base station is able to effectively select an optimum frequency band in consideration of interference signals affecting radio terminal stations belonging to its own cell.

Compared with a comparative example which performs adaptive modulation or adaptive coding by use of channel information between radio base stations and radio terminal stations, the eighth embodiment undergoing adaptive modulation or adaptive coding is able to effectively select an optimum modulation method or an optimum coding rate in consideration of interference incoming from other areas.

When using spatial multiplexing, it is possible to preclude interference between radio devices (i.e. radio base stations and radio terminal stations) belonging to other cells by nullifying the directions toward other cells in consideration of interference (i.e. a degradation of communication quality) with radio devices of the current cell under influence of radio devices of other cells.

At this time, in FIG. 1, for example, the radio terminal stations MT113 and MT131 exist in the overlapped area between the cell 1 of the radio base station AP110 and the cell 3 of the radio base station AP130. When both the radio base stations AP110 and AP130 select the same frequency band, for example, the radio base station AP110 nullifies the direction toward the radio terminal station MT131, while the radio base station AP130 nullifies the direction toward the radio terminal station MT113. Similarly, the radio terminal station MT113 nullifies the direction toward the radio base station AP110, while the radio terminal station MT113 nullifies the direction toward the radio base station AP130. Thus, it is possible to reduce inference (a degradation of communication quality) with radio devices of the current cell under influence of radio devices of other cells. This processing will be described later in conjunction with the ninth to twenty-eighth embodiments.

Programs achieving the foregoing processing functionality are recorded on computer-readable recording media, and then programs recorded on recording media are loaded into a computer system and executed so as to conduct the foregoing radio communication. Herein, the "computer system" may encompass hardware such as OS and peripherals. Additionally, the "computer system" may encompass the WWW system furnished with a homepage providing environment (or a display environment). The "computer-readable recording media" refers to portable media such as flexible disks, magneto-optical disks, ROM, and CD-ROM as well as storage devices such as hard disks incorporated into the computer system. Additionally, the "computer-readable recording media" may encompass any devices for retaining programs for a certain period, such as volatile memory (RAM) installed in the computer system serving as a server or a client which operates based on programs transmitted via networks such as the Internet, or via communication lines such as telephone lines.

The foregoing programs may be transmitted from the computer system, whose storage unit stores these programs, to another computer system via transmission media or via waves propagating through transmission media. Herein, the "transmission media" for transmitting programs refers to any media with functionality for transmitting information, e.g. networks (communication networks) such as the Internet, and communication lines such as telephone lines. The foregoing programs may be drafted to implement a part of this functionality. Alternatively, the foregoing programs may be drafted as differential files (or differential programs) which are combined with preinstalled programs of the computer system so as to implement the above functionality.

According to the first to eighth embodiments applied to the radio communication system including a plurality of radio base stations forming their cells and radio terminal stations, each of which belongs to each of cells formed with radio base stations and each of which communicates with the radio base station forming its own cell by radio, the radio base station measures signal intensities of radio signals received/transmitted with radio terminal stations per each of a plurality of frequency bands by use of each of reception weights which are determined to detect radio signals received/transmitted with radio terminal stations, wherein the radio base station determines a frequency band with signal intensity below a certain level among frequency bands based on the measurement result, so that the radio base station receives/transmits radio signals by use of the determined frequency band. Therefore, the radio base station determines the utilized frequency band based on signal intensities of radio signals transmitted from a broad range of radio terminal stations, which become communicable in response to reception weights, in addition to signal intensities of radio signals transmitted from radio terminal stations belonging to its own cell, wherein it is possible to prevent interference of radio communication between cells and determine an optimum communication method considering interference, thus improving throughput of radio communication.

Next, a multiplex radio access control method and the constitution of a multiplex radio access control system preferably applied to a radio packet communication system performing spatial multiplex access will be described, wherein the following description refers to the situation in which a single radio base station, employing the first to eighth embodiments for selecting frequency bands for use in communication, communicates with a plurality of radio terminal stations by way of spatial multiplexing so that interference between different cells is reduced when two radio base stations whose cells overlap with each other select the same frequency band for use in communication with radio terminal stations belonging to their cells within the overlapped area.

Ninth Embodiment

Figure 18:
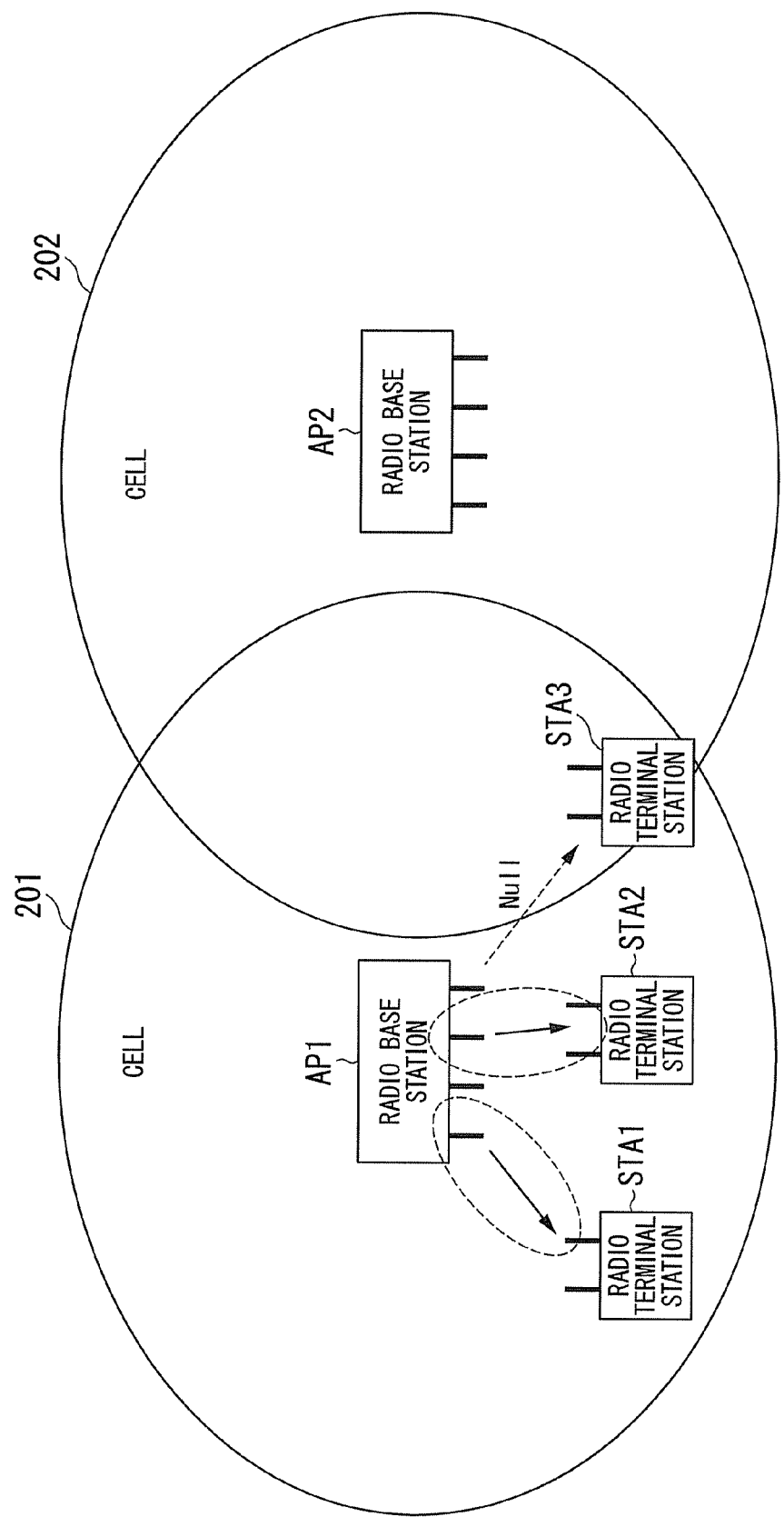
FIG. 18 A radio network configuration diagram according to a ninth embodiment of the present invention.

FIG. 18 is a block diagram showing a radio network configuration according to the ninth embodiment of the present invention. In FIG. 18, two cells (i.e. communication areas covering radio communication, simply called cells; cells in the first to eighth embodiments) 201, 201 share the same frequency channel while they partially overlap with each other. Radio terminal stations STA1, STA2 belong to the cell 201 so as to communicate with a radio base station AP1, whilst a radio terminal station STA3 belongs to the cell 202 so as to communicate with a radio base station AP2. Additionally, the radio terminal station STA3 exists in the overlapped area between the cells 201 and 202 in an environment receiving radio waves propagating from the radio base stations AP1 and AP2 without beam forming.

In the ninth embodiment, the radio base station AP1 includes a plurality of antennas so as to perform radio packet communication, via MU-MIMO spatial multiplexing, with the radio terminal stations STA1, STA2 in the cell 201. That is, the radio base station AP1 combines a plurality of antenna outputs so as to arbitrarily alter its antenna directivity, thus creating a null point. Thus, the radio base station AP1 is able to perform spatial multiplexing communication at the same time with the same frequency by forming a plurality of beams spatially separated from each other.

Additionally, each of the radio terminal stations STA1, STA2 includes a plurality of antennas. Each of the radio terminal stations STA1, STA2 combines a plurality of antenna outputs so as to arbitrarily alter its antenna directivity, thus creating a null point. Thus, the radio terminal stations STA1, STA2 is able to change their antenna directivities relative to the radio base station AP1 connected thereto, thus creating null points.

The radio base station AP1 and the radio terminal stations STA1, STA2 transmit non-spatial multiplexing control signals before transmitting packet signals via spatial multiplexing, wherein the radio base station AP1 and the radio terminal stations STA1, STA2 exchange information, necessary for spatial multiplexing, by use of control signals. Since control signals are transmitted via non-spatial multiplexing without narrowing transmission beams, they can be notified to the radio terminal station STA3 of the cell 202 located in the periphery of the overlapped area.

Figure 19:
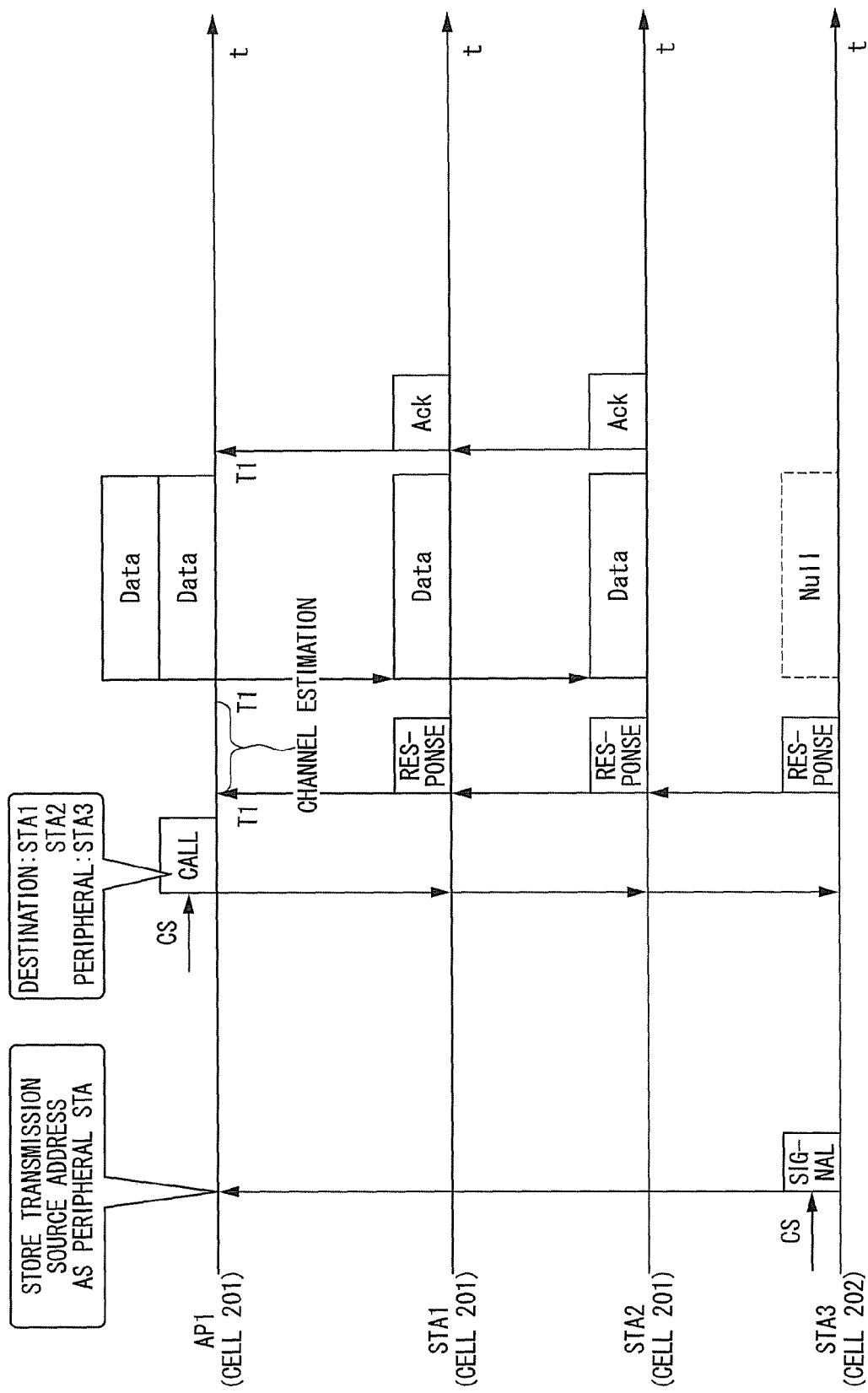
FIG. 19 A time chart for explaining the operation of transmitting packet signals according to the ninth embodiment of the present invention.

FIG. 19 is a time chart illustrating the operation for transmitting packet signals according to the ninth embodiment. In FIG. 19, upon receiving a packet signal from the radio terminal station STA3 located in the peripheral cell, the radio base station AP1 stores a transmission source address included in the packet signal. As shown in FIG. 18, packet signals of the radio base station AP2 do not reach the radio base station AP1, so that the radio base station AP1 does not store the address of the radio base station AP2. In general, a radio LAN sends a packet signal with a header including a destination address and a transmission source address as well as the address of a radio base station forming the cell therefor.

The radio base station AP1 performs carrier sense CS with random time intervals when transmission data is created with respect to one or plural destinations. When no other signals are detected, i.e. in an idling state, the radio base station AP1 transmits a call signal including one or plural destination addresses as well as addresses of radio base stations and radio terminal stations in one or plural peripheral cells. In the illustration, the radio terminal stations STA1, STA2 serve as destination radio terminal stations, while the radio terminal station STA3 serves as a radio terminal station of a peripheral cell.

Each of the radio terminal stations STA1, STA2, STA3 each specified by a call signal sends back a response signal when a predetermined time (T1) has passed after reception of a call signal. When each radio terminal station sends its response signal using orthogonal codes, e.g. spreading codes of CDMA communication, all the radio terminal stations STA1, STA2, STA3 may simultaneously send back their response signals. When orthogonal codes are not used, the radio terminal stations may sequentially send back their response signals in an order of addresses embedded in a call signal with a time interval T1.

Upon receiving response signals, the radio base station AP1 estimates channels with respect to the radio terminal stations STA1, STA2, STA3. When response signals are simultaneously received, the radio base station AP1 may separate response signals by use of orthogonal codes allocated to each radio terminal station. A call signal can be used to allocate orthogonal codes to each radio terminal station. When response signals are sequentially received, the radio base station AP1 may send a call signal to notify each radio terminal station of its response signal transmission time.

Based on the channel estimation result, the radio base station AP1 sends packet signals destined to the radio terminal stations STA1, STA2 via spatial multiplexing while creating a null point directing to the radio terminal station STA3 in the peripheral cell. As a result, the radio base station AP1 is able to transmit packet signals via spatial multiplexing while suppressing interference with the radio terminal station STA3 in the peripheral cell. Upon receiving a call signal, the radio terminal station STA3 of the peripheral cell estimates its channel, wherein the radio terminal station STA3 is able to further suppress interference by the radio base station AP1 by creating a null point directing to the radio base station AP1.

When the radio terminal stations STA1, STA2 decode packet signals without errors, they send back acknowledge signals Ack to the radio base station AP1 when the time T1 has passed after reception of packet signals. At this time, they may transmit acknowledge signals simultaneously. Alternatively, they may sequentially transmit acknowledge signals in an order of addresses embedded in a call signal with the time interval T1.

According to the ninth embodiment, the radio base station AP1 is able to estimate channels upon receiving a response signal from the radio terminal station STA3 in the peripheral cell, so that it is possible to transmit packet signals to the radio terminal stations STA1, STA2 via spatial multiplexing while suppressing interference of communication with the radio terminal station STA3 in the peripheral cell.

Tenth Embodiment

Figure 20:
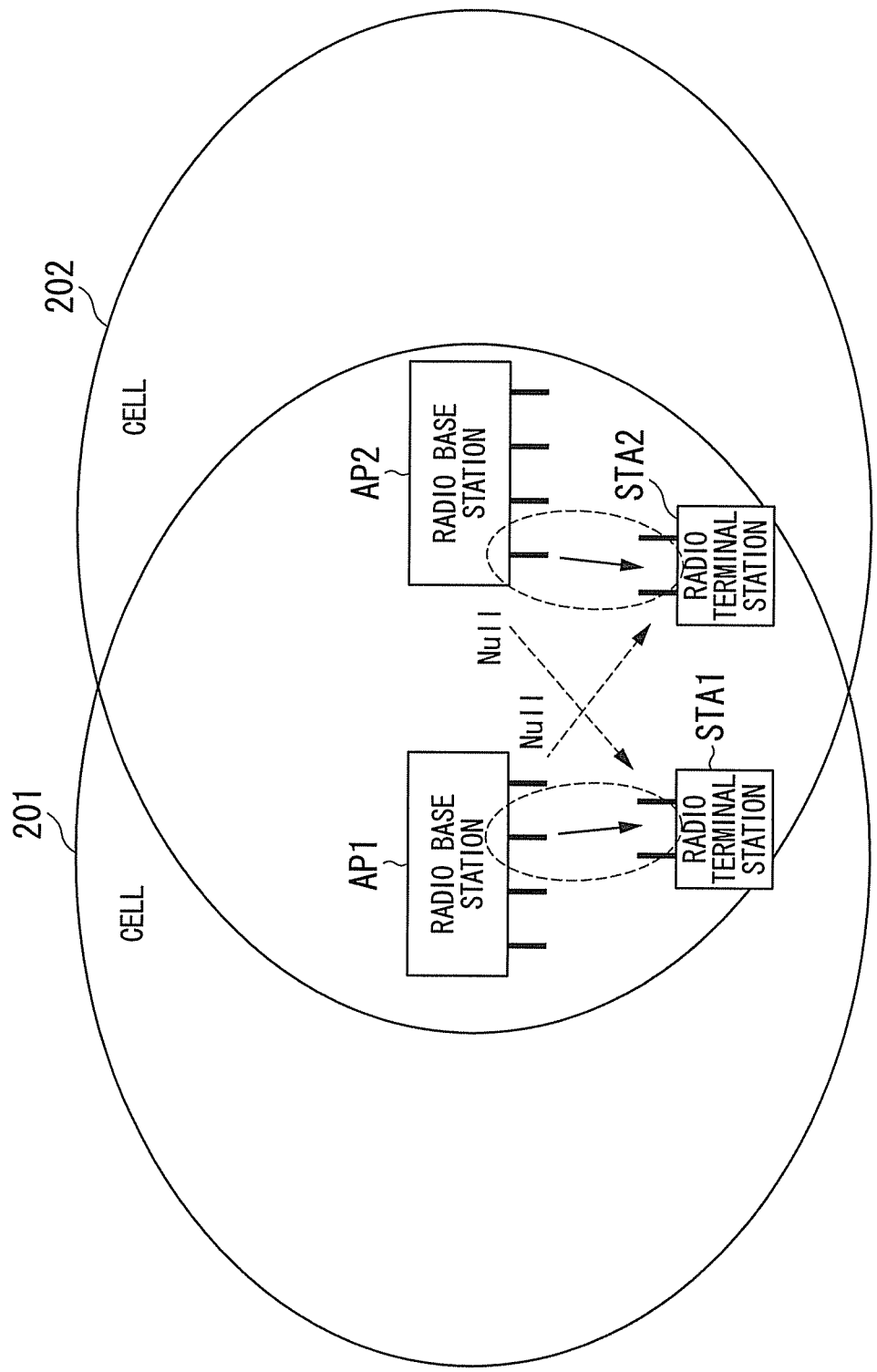
FIG. 20 A radio network configuration diagram according to a tenth embodiment of the present invention.
Figure 21:
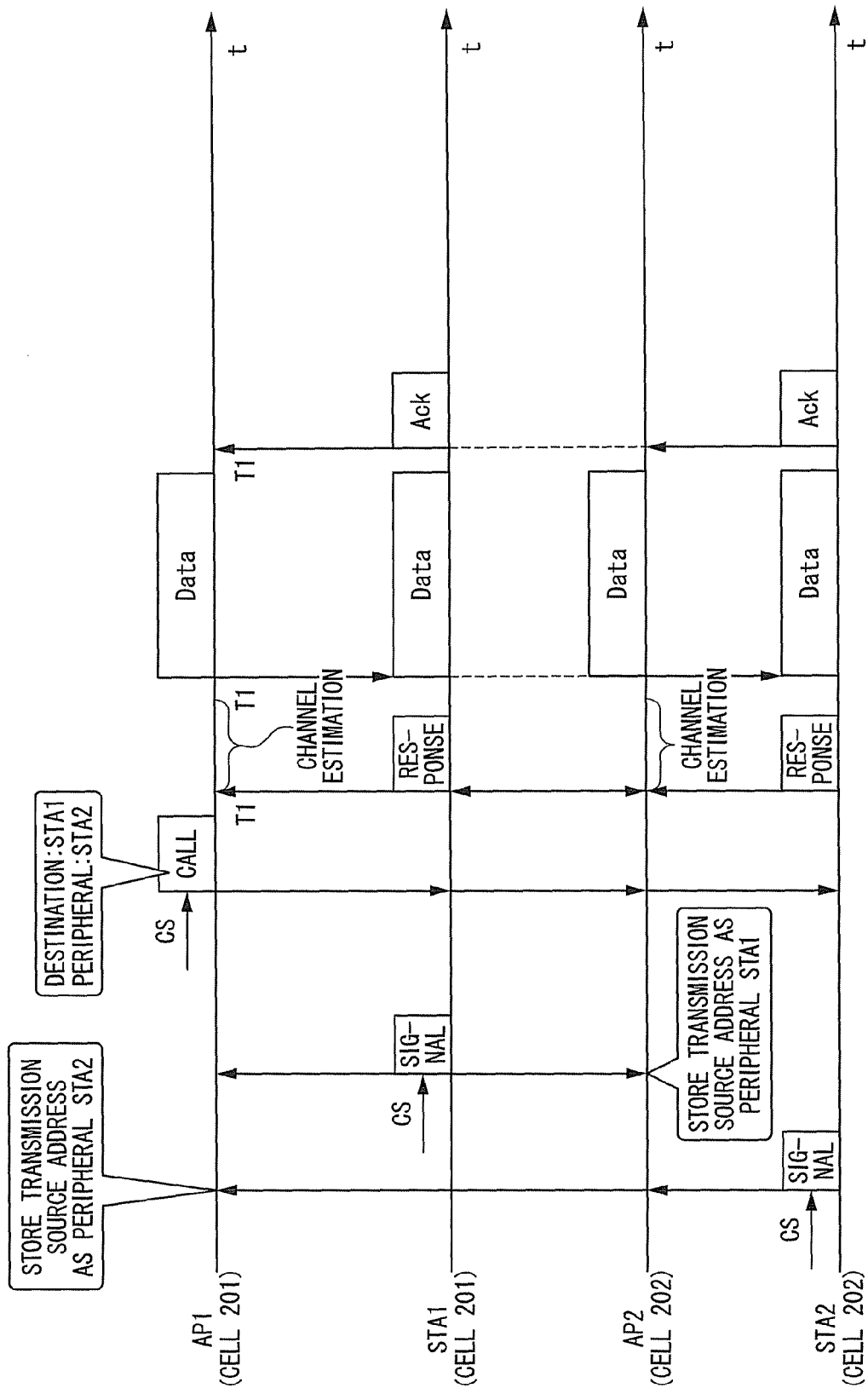
FIG. 21 A time chart for explaining the operation of transmitting packet signals in the system shown in FIG. 20.

Next, the tenth embodiment of the present invention will be described with reference to FIGS. 20 and 21. FIG. 20 shows a radio network configuration according to the tenth embodiment, and FIG. 21 is a time chart explaining the operation for transmitting packet signals by the system of FIG. 20. In FIG. 20, the radio base station AP1 and the radio terminal station STA1 belong to the cell 201, while the radio base station AP2 and the radio terminal station STA2 belong to the cell 202. All the radio base stations AP1, AP2 and the radio terminal stations STA1, STA2 exist in the area in which the cell 201 and its peripheral cell 202 overlap with each other.

In FIG. 21, upon receiving a packet signal from the radio terminal station STA2 of the cell 202, the radio base station AP1 stores a transmission source address included in the packet signal. Upon receiving a packet signal from the radio terminal station STS1 of the cell 201, the radio base station AP2 stores a transmission source address included in the packet signal. In general, radio LANs send packet signals with headers including destination addresses, transmission source addresses, and addresses of radio base stations belonging to their cells. The radio base stations AP1, AP2 performs carrier sense CS at random time intervals when transmission data is created with respect to one or plural destinations, whilst when no other signals are detected, indicating an idling state, they may send call signals each including one or plural destination addresses and addresses of radio terminal stations, belonging to one or plural peripheral cells, stored therein. In the illustration, the radio base station AP1 creates transmission data destined to the radio terminal station STA1, whilst the radio base station AP2 creates transmission data destined to the radio terminal station STA2. Herein, the radio base station AP1 may transmit a call signal due to the relationship of "random time of radio base station AP1"<"random time of radio base station AP2".

The radio terminal stations STA1, STA2, specified by call signals, start transmitting their response signals when the predetermined time T1 has passed after reception of call signals. When response signals employ orthogonal codes, which are orthogonal between radio terminal stations, e.g. spreading codes of CDMA, both the radio terminal stations STA1, STA2 may simultaneously transmit their response signals. When orthogonal codes are not employed, radio terminal stations may sequentially transmit response signals per each time interval T1 in an order of their addresses embedded in call signals.

Upon receiving response signals, the radio base stations AP1, AP2 estimate channels with respect to the radio terminal stations STA1, STA2. Upon receiving response signals simultaneously, radio base stations may separate response signals by use of orthogonal codes allocated to each radio terminal station. Orthogonal codes can be allocated to radio terminal stations by use of call signals. Upon sequentially receiving response signals, radio base stations may notify radio terminal stations of response signal transmission times by use of call signals.

Based on the channel estimation result, the radio base station AP1 transmits packet signals destined to the radio terminal station STA1 while creating a null point directing to the radio base station STA2 in the cell 202. Based on the channel estimation result, the radio base station AP2 transmits packet signals destined to the radio terminal station STA2 while creating a null point directing the radio terminal station STA1 in the cell 201. As a result, the radio base stations AP1, AP2 are able to simultaneously transmit packet signals via spatial multiplexing.

Upon decoding packet signals without errors, the radio terminal station STA1 of the cell 201 transmits an acknowledge signal Ack to the radio base station AP1 when the time T1 has passed after reception of packet signals. Similarly, upon decoding packet signals without errors, the radio terminal station STA2 transmits an acknowledge signal Ack to the radio base station AP2 when the time T1 has passed after reception of packet signals. At this time, these acknowledge signals can be simultaneously transmitted via spatial multiplexing. Alternatively, acknowledge signals can be sequentially transmitted at the time interval T1 in an order of their addresses embedded in call signals.

In the tenth embodiment, the radio base station AP1 is able to estimate channels upon receiving a response signal from the radio terminal station STA2 of the cell 202 serving as its peripheral cell; hence, it is possible to transmit packet signals to one or plural radio terminal stations belonging to its own cell via spatial multiplexing while suppressing interference with the radio terminal station STA2 of the cell 202. In the condition that the radio base station AP2 of the peripheral cell holds packet signals destined to the radio terminal station STA2 belonging its own cell (i.e. the cell 202), when the radio base station AP2, invoked by a call signal from the radio base station AP1, receives response signals, transmitted from the radio terminal station STA1 of the cell 201 and the radio terminal station STA2 of its own cell (i.e. the cell 202), so as to estimate their channels, thus transmitting packet signals destined to the radio terminal station STA2 via spatial multiplexing with the radio base station AP1 of the cell 201. This makes it possible to share and effectively utilize radio resources between cells in the overlap cell environment.

Eleventh Embodiment

Figure 22:
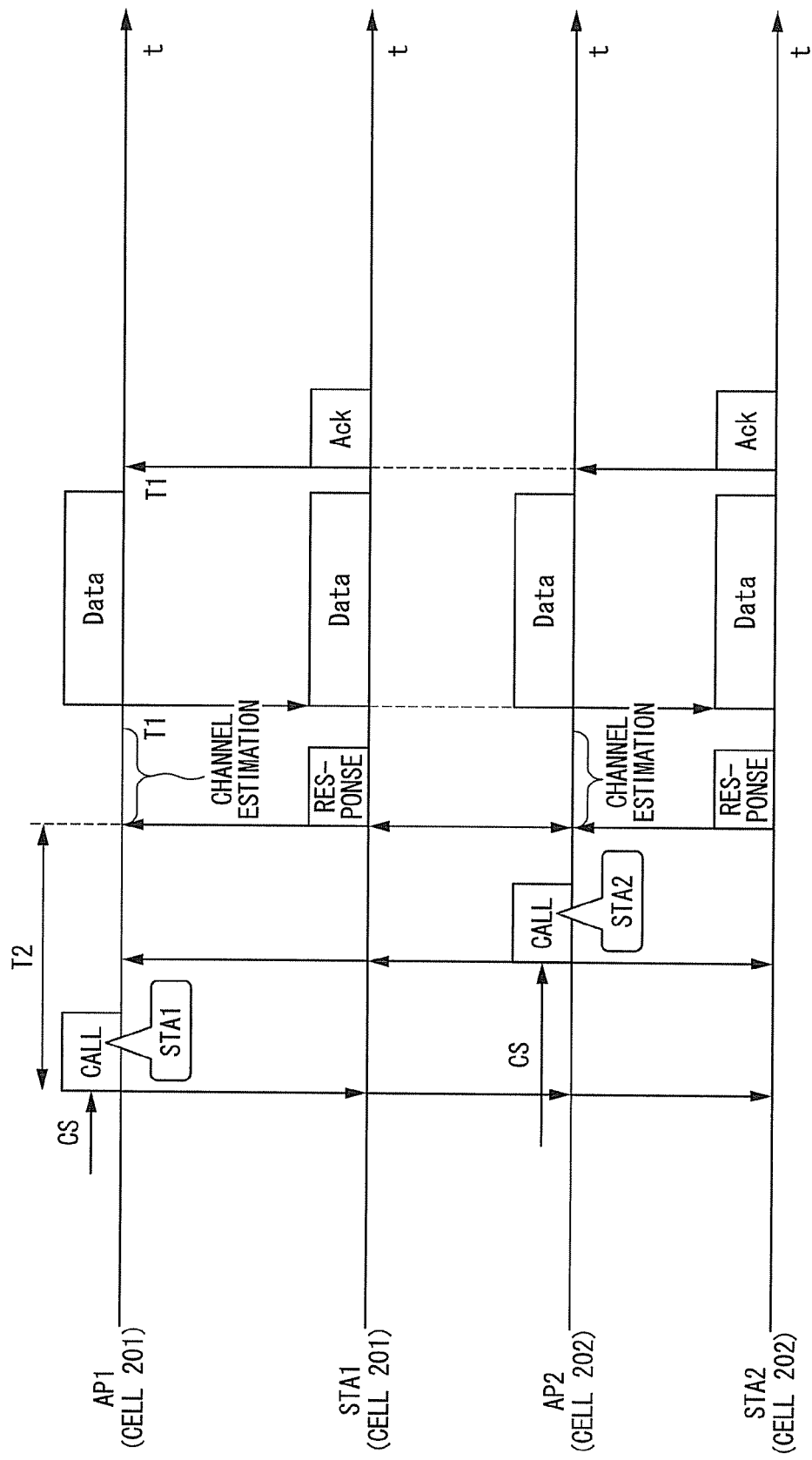
FIG. 22 A time chart for explaining the operation of transmitting packet signals according to an eleventh embodiment of the present invention.

Next, the eleventh embodiment of the present invention will be described with reference to FIG. 22. The eleventh embodiment adopts the same radio network configuration as the radio network configuration shown in FIG. 20. FIG. 22 is a time chart showing the operation for transmitting packet signals according to the eleventh embodiment of the present invention. In FIG. 22, when a radio base station AP (AP1 or AP2) creates transmission data destined to one or plural destinations, it performs carrier sense CS at random time intervals, whilst when no other signals are detected, indicating an idling state, the radio base station AP transmits a call signal including one or plural destination addresses. In the illustration, the radio base station AP1 creates transmission data destined to the radio terminal station STA1, whilst the radio base station AP2 creates transmission data destined to the radio terminal station STA2. First, the radio base station AP1 transmits its call signal due to the relationship of "random time of radio base station AP1"<"random time of radio base station AP2".

Upon receiving a call signal, the radio base station AP2 continues carrier sense CS further for a time T2. In the illustration, the radio base station AP2 transmits a call signal in accordance with the relationship of "random time of radio base station AP2"<"time T2". In this connection, the time T2 may include a remaining time of the time T2.

The radio terminal stations STA1, STA2, specified by call signals respectively, starts to transmit their response signals after a lapse of the time T2. When response signals employ orthogonal codes, which are orthogonal per each radio terminal station, e.g. spreading codes of CDMA communication, a plurality of radio terminal stations STA (STA1, STA2) may simultaneously transmit their response signals simultaneously. The radio terminal stations STA may sequentially transmit their response signals at time intervals T1 in the order of call signals when response signals do not employ orthogonal codes or in the order of addresses when call signals each include a plurality of addresses.

Upon receiving response signals, the radio base stations AP1, AP2 estimate channels of radio terminal stations STA. When response signals are simultaneously received, they separate response signals by use of orthogonal codes allocated to each of radio terminal stations. Orthogonal codes may be allocated to each of radio terminal stations by way of call signals. When response signals are sequentially received, it is possible to notify radio terminal stations of their response signal transmission times by way of call signals.

Based on the channel estimation result, the radio base station AP1 transmits packet signals destined to the radio terminal stations STA1 while creating a null point directing the radio terminal station STA2 conducting communication in the cell 202. Based on the channel estimation result, the radio base station AP2 transmits packet signals destined to the radio terminal station STA2 while creating a null point directing to the radio terminal station STA1 conducting communication in the cell 201. As a result, the radio base stations AP1, AP2 are able to simultaneously transmit packet signals via spatial multiplexing.

Upon decoding packet signals without errors, the radio terminal stations transmit acknowledge signals Ack to the radio base stations AP when the time T1 has elapsed after reception of packet signals. At this time, acknowledge signals can be transmitted via spatial multiplexing. Alternatively, acknowledge signals may be sequentially transmitted at time intervals T1 in the order of transmitting call signals or in the order of addresses when call signals each include a plurality of addresses.

In the eleventh embodiment, the radio base station AP2 located in the peripheral cell of the radio base station AP1, which is invoked by a call signal of the radio base station AP1 destined to the radio terminal station STA1, is able to transmit a call signal destined to the radio terminal station STA2 in its own cell, so that the radio base stations AP1, AP2 are able to estimate channels upon receiving response signals from their counterpart radio terminal stations. For this reason, the radio base station AP1 of the cell 201 and the radio base station AP2 of the cell 202 are able to simultaneously transmit packet signals via spatial multiplexing. This makes it possible to share and effectively utilize radio resources between cells in the overlap cell environment.

Twelfth Embodiment

Figure 23:
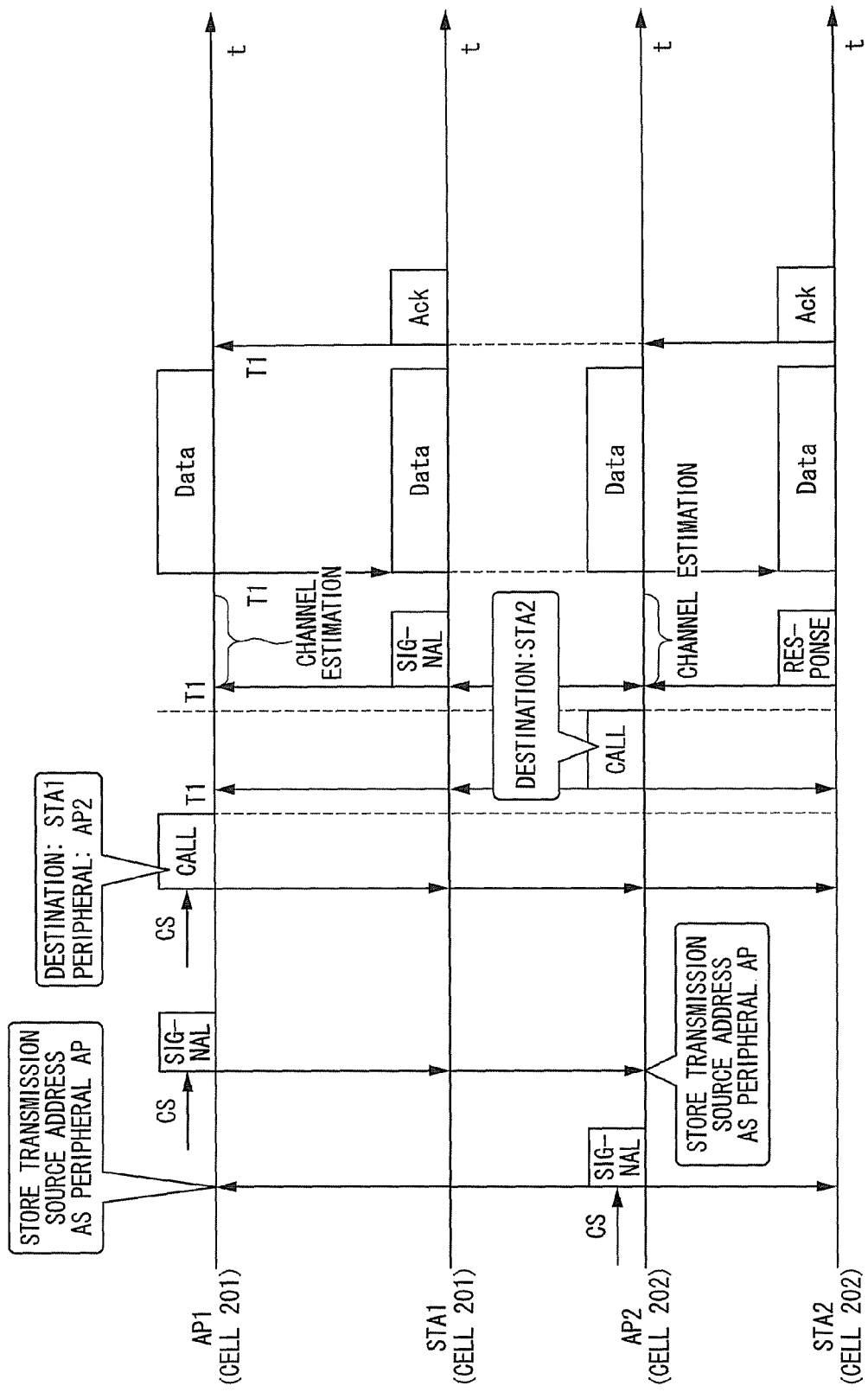
FIG. 23 A time chart for explaining the operation of transmitting packet signals according to a twelfth embodiment.

Next, the twelfth embodiment of the present invention will be described with reference to FIG. 23. The twelfth embodiment involves the same radio network configuration as the radio network configuration shown in FIG. 20. FIG. 23 is a time chart showing the operation of the twelfth embodiment for transmitting packet signals. In FIG. 23, upon receiving a packet signal from the radio base station AP2 of the cell 202, the radio base station AP1 stores a transmission source address included in the packet signal. Upon receiving a packet signal from the radio base station AP1 of the cell 201, the radio base station AP2 stores a transmission source address included in the packet signal. In general, radio LANs send packet signals with headers including destination addresses and transmission source addresses as well as the addresses of radio base stations belonging to cells.

Upon creating transmission data destined to one or plural destinations, the radio base station AP1 performs carrier sense CS at random time intervals, whilst when no other signals are detected, indicating an idling state, the radio base station AP1 sends a call signal including one or plural destination addresses and one or plural addresses of peripheral radio base stations stored therein. In the illustration, the radio base station AP1 creates transmission data destined to the radio terminal station STA1 whilst the radio base station AP2 creates transmission data destined to the radio terminal station STA2. First, the radio base station AP1 sends a call signal due to the relationship of "random time of radio base station AP1"<"random time of radio base station AP2".

Upon receiving a call signal, the radio base station Ap2 transmits its call signal including one or plural destination addresses after a lapse of the time T1. In an aspect of the invention as defined in claim 5, call signals are transmitted at time intervals T1 in the order of addresses when a first call signal includes a plurality of addresses of radio base stations.

Figure 24:
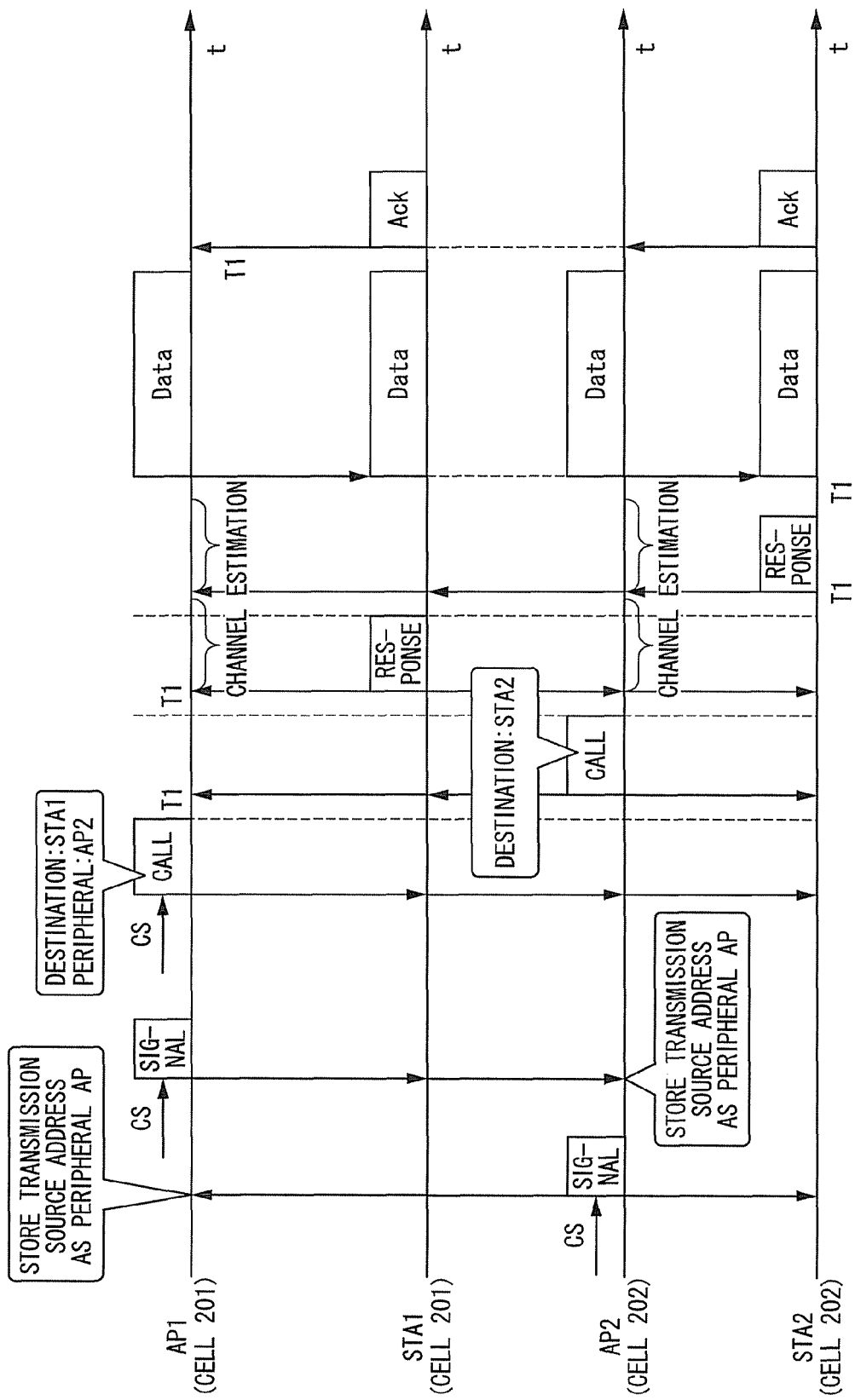
FIG. 24 A time chart for explaining the operation of sequentially transmitting response signals.

When the time T1 has elapsed after reception of the last call signal, the radio terminal stations STA1, STA2, specified by their call signals, start to transmit response signals. When response signals employ orthogonal codes, which are orthogonal per each radio terminal station, e.g. spreading codes of CDMA communication, a plurality of radio terminal stations STA is able to simultaneously transmit their response signals. Alternatively, the radio terminal stations may sequentially transmit their response signals at time intervals T1 in the order of transmitting call signals when response signals do not employ orthogonal codes or in the order of addresses when each call signal includes a plurality of addresses. FIG. 24 is a time chart showing the operation of sequentially transmitting response signals. Herein, the radio terminal station STA1, specified by the first call signal, transmits its response signal, and then after a lapse of the time T1, the radio terminal station STA2, specified by the next call signal, transmits its response signal.

Upon receiving response signals, the radio base stations AP1, AP2 estimate channels with regard to the radio terminal stations STA1 to STA3. Upon simultaneously receiving response signals, they separate their response signals by use of orthogonal codes allocated to radio terminal stations. Orthogonal codes may be allocated to radio terminal stations by use of call signals. Upon sequentially receiving response signals, the radio base stations may notify the counterpart radio terminal stations of their response time transmission times by way of call signals.

Based on the channel estimation result, the radio base station AP1 transmits packet signals destined to the radio terminal station STA1 while creating a null point directing to the radio terminal station STA2 conducting communication in the cell 202. Based on the channel estimation result, the radio base station AP2 transmits packet signals destined to the radio terminal station STA2 while creating a null point directing to the radio terminal station STA1 conducting communication in the cell 201. As a result, the radio base stations AP1, AP2 are able to simultaneously transmit packet signals via spatial multiplexing.

Upon decoding packet signals without errors, the radio terminal station STA1 transmits an acknowledge signal Ack to the radio base station AP1 after a lapse of the time T1. At this time, it is possible to simultaneously transmit acknowledge signals via spatial multiplexing. Alternatively, it is possible to sequentially transmit acknowledge signals at time intervals T1 in the order of transmitting call signals or in the order of addresses when call signals each include a plurality of addresses.

In the twelfth embodiment, the radio base station AP2 belonging to the peripheral cell of the radio base station AP1, invoked by a first call signal of the radio base station AP1, is able to transmit a call signal destined to the radio terminal stations STA2 belonging to its own cell, so that the radio base stations AP1, AP2 are able to estimate channels upon receiving response signals from their counterpart radio terminal stations. For this reason, the radio base station AP1 of the cell 201 and the radio base station AP2 of the cell 202 are able to simultaneously transmit packet signals via spatial multiplexing. This makes it possible to share and effectively utilize radio resources in the overlap cell environment. Compared to the eleventh embodiment, the twelfth embodiment is able to reduce the overhead of carrier sense CS because it can sequentially transmit call signals at time intervals T1.

Thirteenth Embodiment

Figure 25:
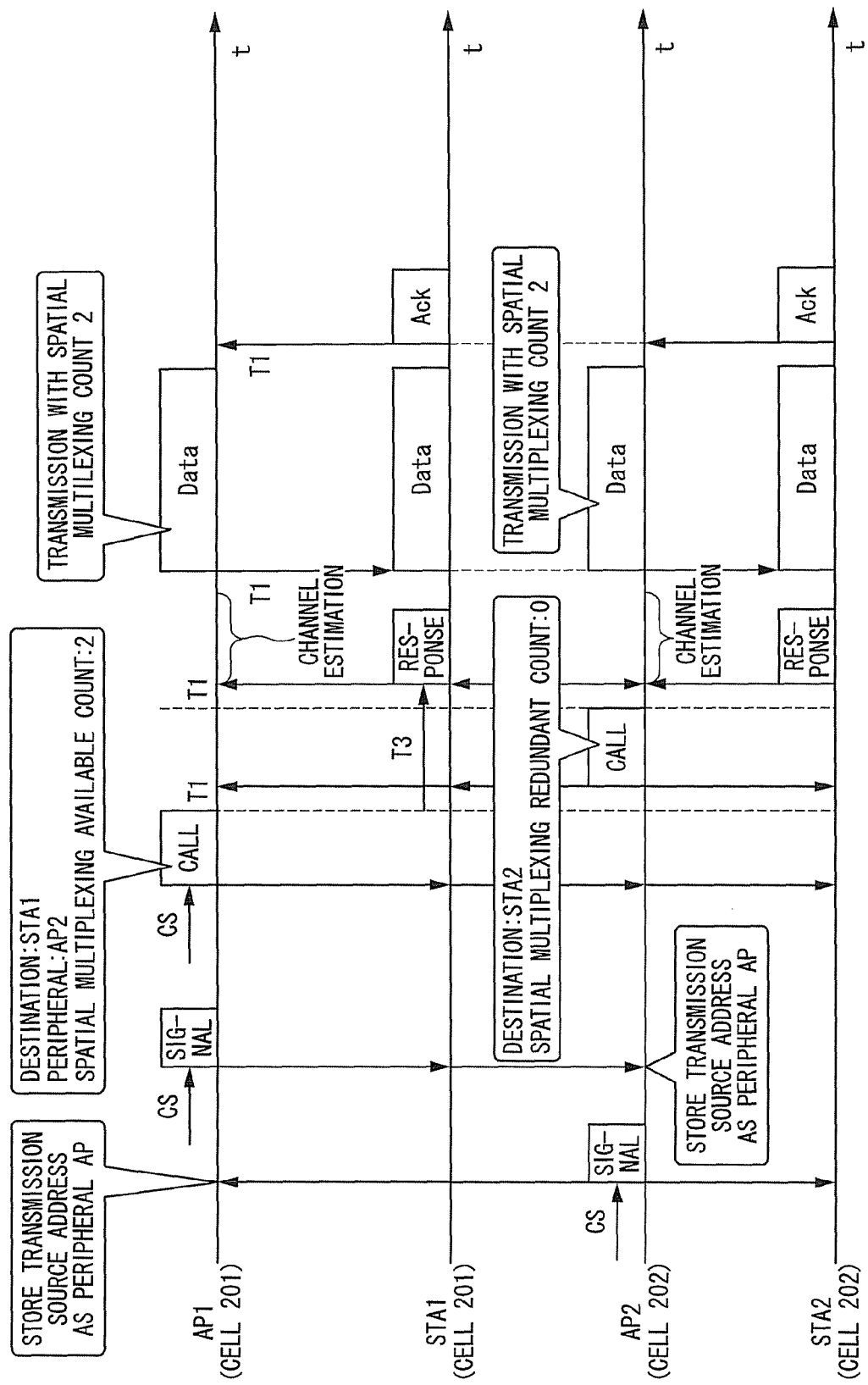
FIG. 25 A time chart for explaining the operation of a thirteenth embodiment to be carried out when a call signal includes a spatial multiplexing redundant count of a radio base station serving as a transmission source.

Next, the thirteenth embodiment of the present invention will be described with reference to FIG. 25. The thirteenth embodiment has the same radio network configuration as the radio network configuration shown in FIG. 20. FIG. 25 is a time chart showing the operation to be carried out when a radio base station serving as a transmission source sends a call signal including a spatial multiplexing redundant count. Herein, the radio base stations AP1, AP2 are each furnished with four antennas. Upon receiving a call signal from the radio base station AP1, the radio base station AP2 recognizes that the spatial multiplexing redundant count of the radio base station AP1 is two. The radio base station AP2 allocates two residual spatial multiplexes for use in communication with the radio terminal station STA2 and then transmits a call signal indicating that the spatial multiplexing redundant count is zero. Thus, it is possible to prevent occurrence of interference between cells due to transmission of packet signals over the spatial multiplexing redundant count.

Fourteenth Embodiment

Figure 26:
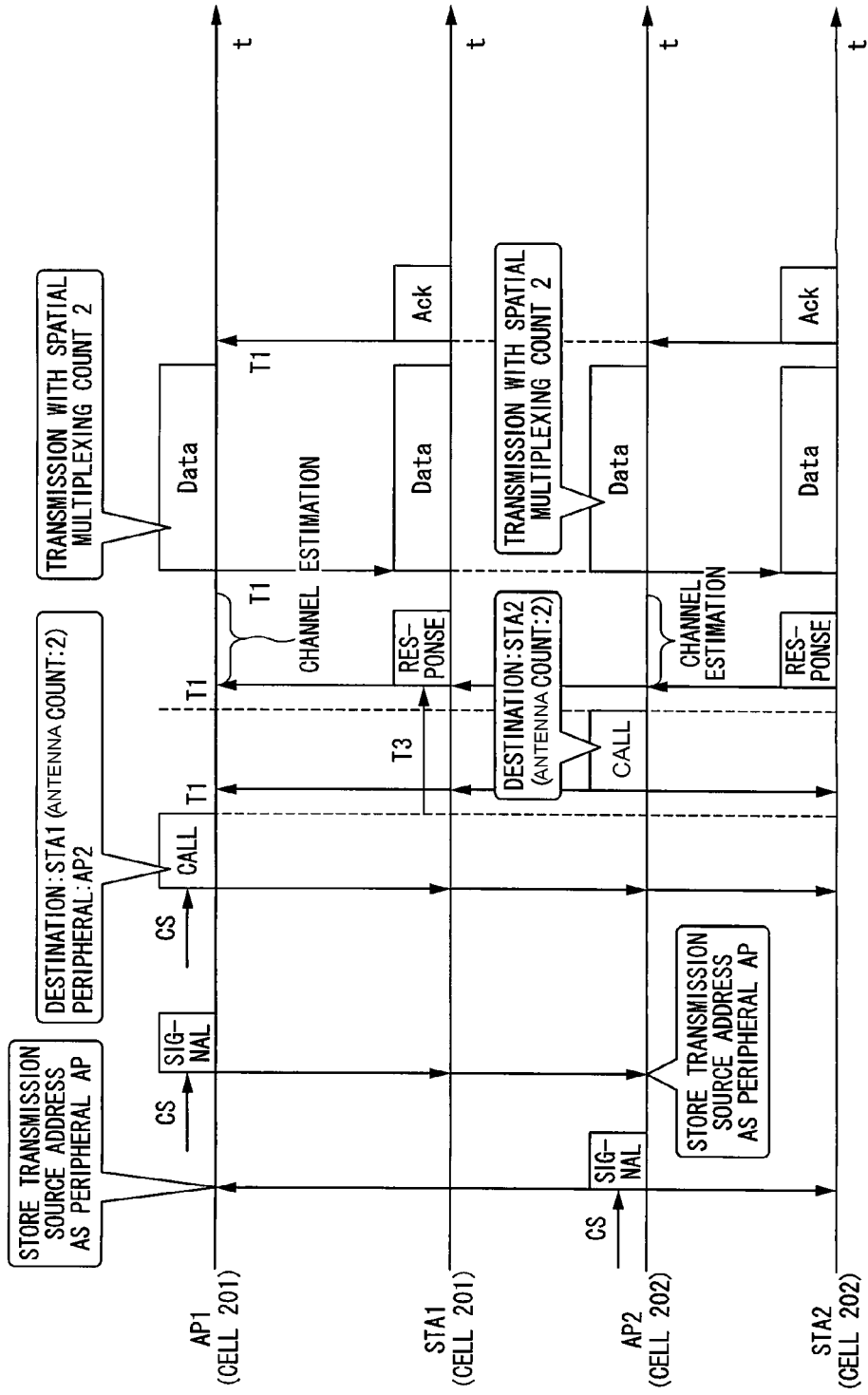
FIG. 26 A time chart for explaining the operation of a fourteenth embodiment to be carried out when a call signal includes an antenna count of a radio terminal station serving as a destination.

Next, the fourteenth embodiment will be described with reference to FIG. 26. The fourteenth embodiment has the same radio network configuration as the radio network configuration shown in FIG. 20. FIG. 26 is a time chart showing the operation to be carried out when a call signal includes the number of antennas installed in a radio terminal station serving as a destination. In general, the maximum count of spatial multiplexing matches with the antenna count, whereas it matches with a smaller antenna count when the antenna count of a transmission station differs from the antenna count of a reception station. Herein, the radio base stations AP1, AP2 are each equipped with four antennas. Upon receiving a call signal from the radio base station AP1, the radio base station AP2 recognizes that the antenna count of a radio terminal station, serving as a destination for the radio base station AP1, is two while the spatial multiplexing redundant count is two. The radio base station AP2 allocates two residual spatial multiplexes for use in communication with the radio terminal station STA2. Thus, it is possible to prevent occurrence of interference between cells due to transmission of packet signals over the spatial multiplexing redundant count.

Fifteenth Embodiment

Figure 27:
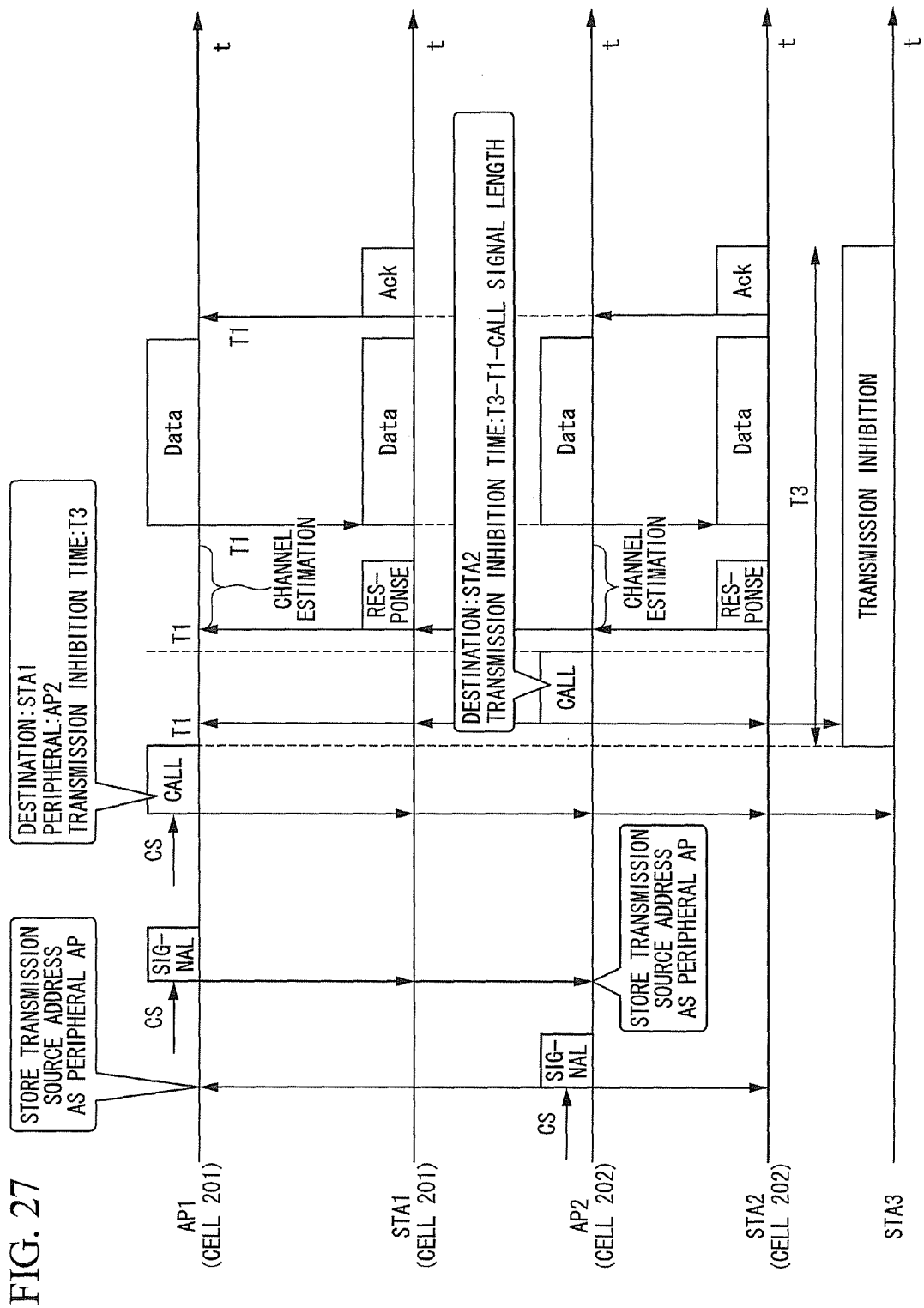
FIG. 27 A time chart for explaining the operation of a fifteenth embodiment to be carried out when a call signal includes a time interval for inhibiting transmission except for transmission made by a radio terminal station and a radio base station specified by the call signal.

Next, the fifteenth embodiment will be described with reference to FIG. 27. The fifteenth embodiment has the same radio network configuration as the radio network configuration shown in FIG. 20. FIG. 27 is a time chart showing the operation to be carried out when a call signal includes a transmission inhibition time for inhibiting transmission with radio stations except for radio base stations and radio terminal stations specified by the call signal. Herein, the transmission inhibition time is a time period between the transmission timing of a call signal and the reception timing of an acknowledge signal ACK. This makes it possible to prevent interference caused by other radio stations.

Sixteenth Embodiment

Figure 28:
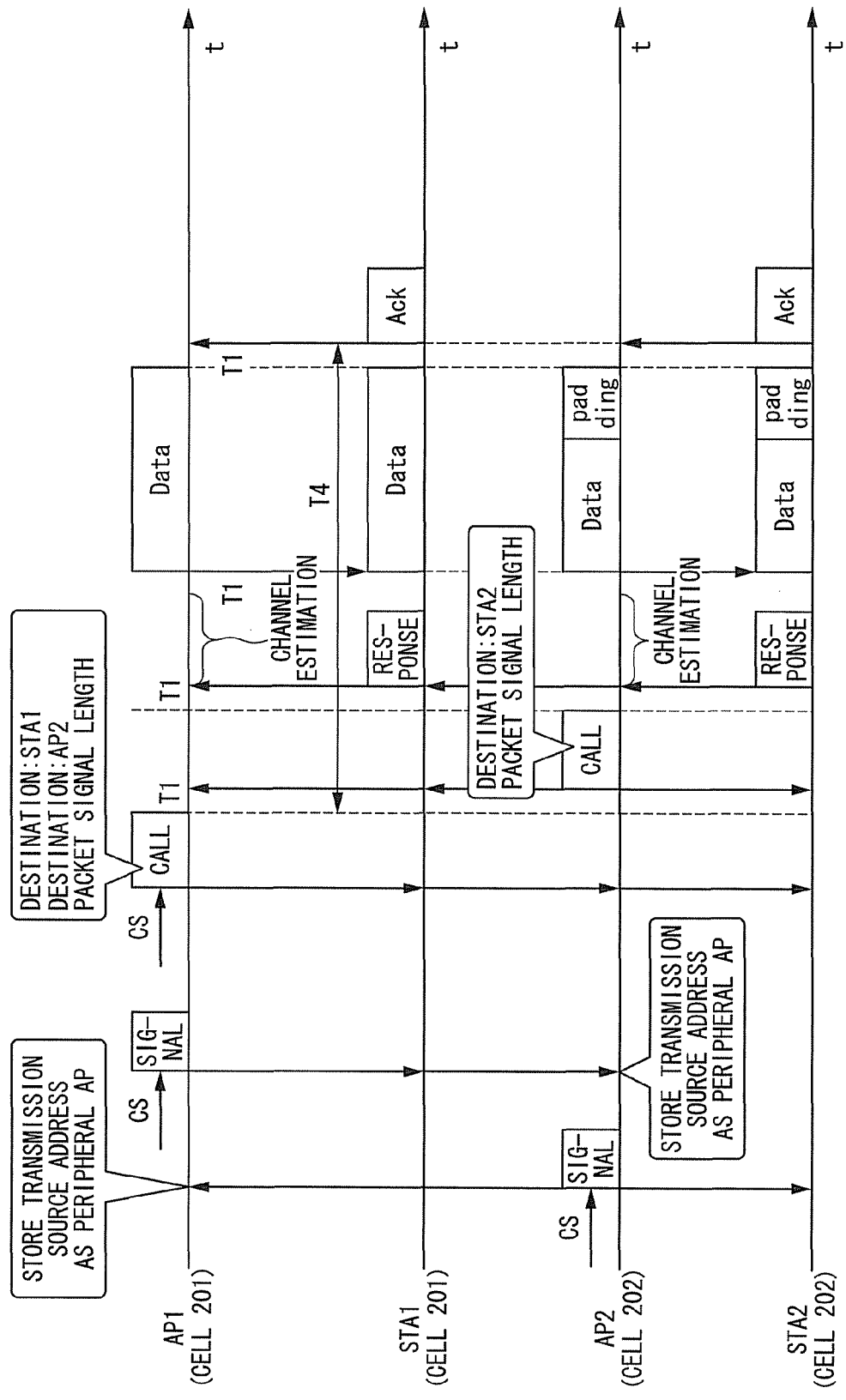
FIG. 28 A time chart for explaining the operation of a sixteenth embodiment to be carried out when a call signal includes the length of a packet signal.

Next, the sixteenth embodiment will be described with reference to FIG. 28. The sixteenth embodiment has the same radio network configuration as the radio network configuration shown in FIG. 20. FIG. 28 is a time chart showing the operation to be carried out when a call signal includes the length of a packet signal. The radio base station AP1 transmits a call signal including a packet signal length. The radio base station AP2 generates and transmits a packet signal with the same length of the notified packet signal length. For instance, packet signals with a short length are subjected to padding, whilst packet signals with a long length are divided and transmitted. Thus, it is possible to prevent an event in which the radio terminal station of the cell 202 sends an acknowledge signal ACK so as to cause interference.

Seventeenth Embodiment

Figure 29:
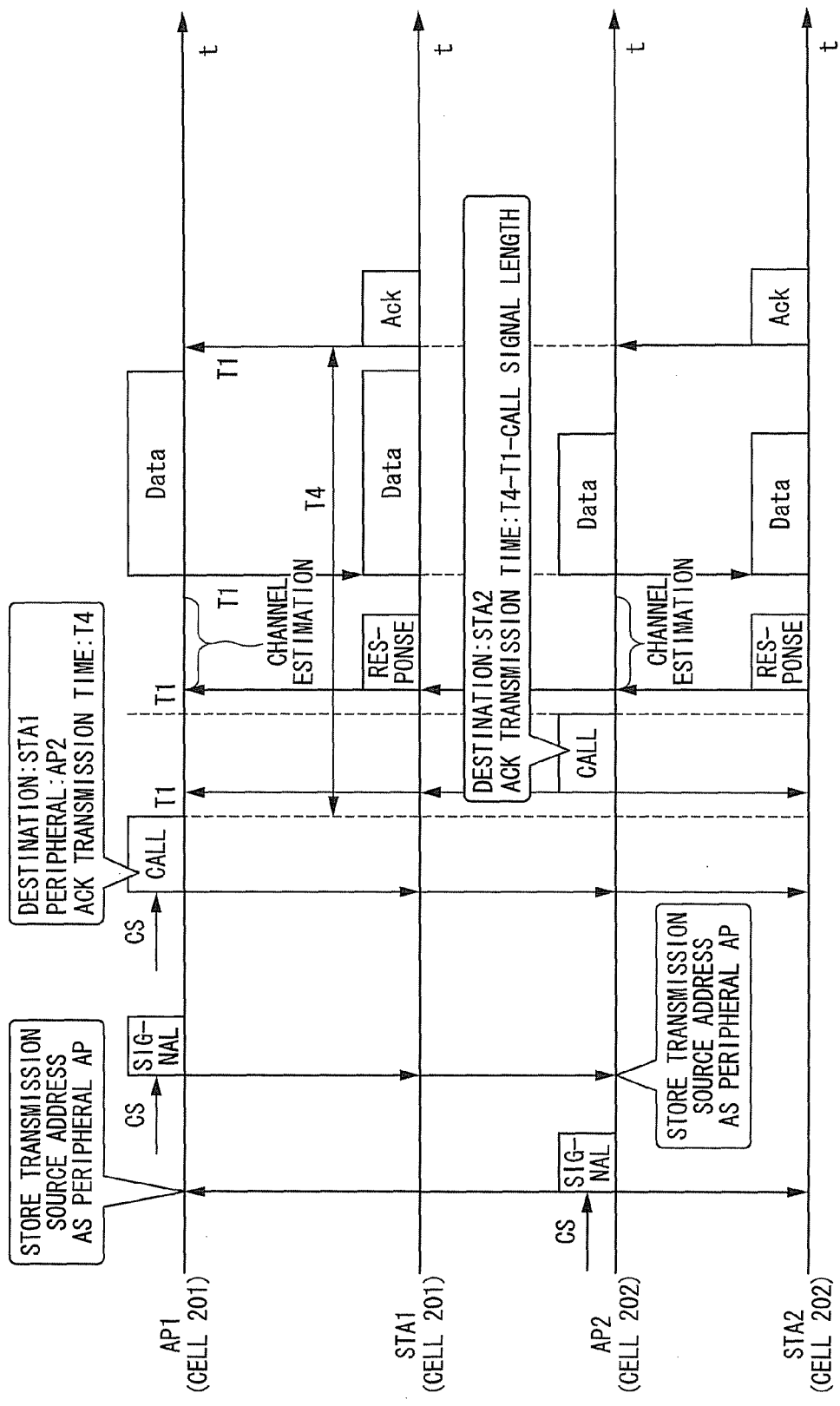
FIG. 29 A time chart for explaining the operation of a seventeenth embodiment to be carried out when a call signal includes a time for transmitting an acknowledge signal ACK.

Next, the seventeenth embodiment will be described with reference to FIG. 29. The seventeenth embodiment has the same radio network configuration as the radio network configuration shown in FIG. 20. FIG. 29 is a time chart showing the operation to be carried out when a call signal includes a transmission time for transmitting an acknowledge signal ACK. Herein, the transmission time of an acknowledge signal ACK is set after transmission of a packet signal. Thus, even when the length of a packet signal transmitted by the radio base station STA2 is shorter than the length of a packet signal transmitted by the radio base station AP1, the radio terminal station STA2 transmits an acknowledge signal ACK during transmission of a packet signal from the radio base station AP1, thus preventing an event in which the acknowledge signal ACK causes interference with the radio terminal station STA1.

Eighteenth Embodiment

Figure 30:
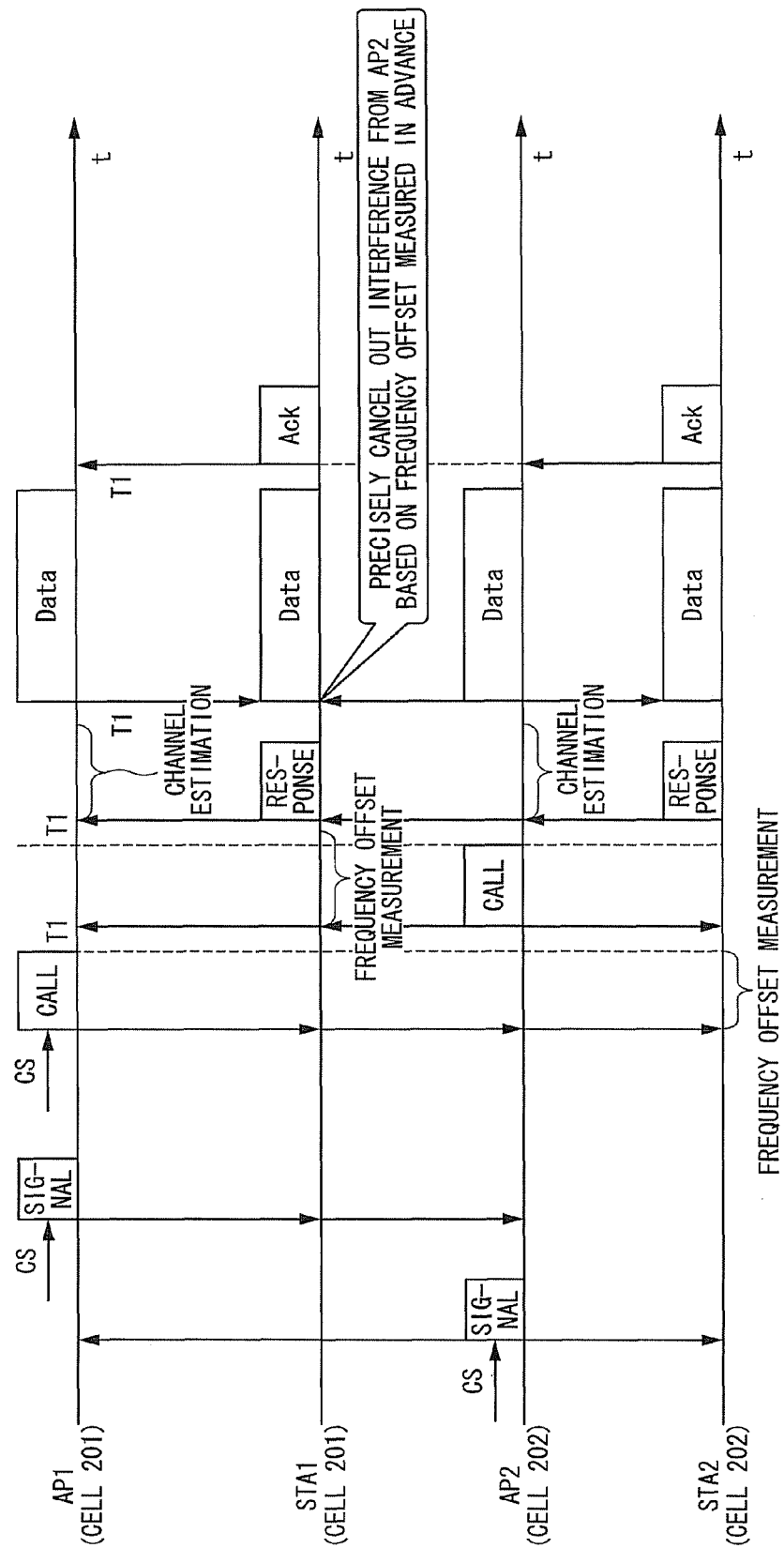
FIG. 30 A time chart for explaining the operation of a radio terminal station measuring a frequency offset upon receiving a call signal according to an eighteenth embodiment.

Next, the eighteenth embodiment will be described with reference to FIG. 30. The eighteenth embodiment has the same radio network configuration as the radio network configuration shown in FIG. 20. FIG. 30 is a time chart showing the operation to be carried out when a radio terminal station receiving a call signal measures a frequency offset. Radio stations transmit packet signals at a predetermined frequency, which in turn causes an error or a frequency offset. Since the radio terminal station receiving a call signal is able to measure the frequency offset in advance, it is possible to precisely cancel out interference cause by a certain radio base station in the peripheral cell when receiving packet signals.

Nineteenth Embodiment

Figure 31:
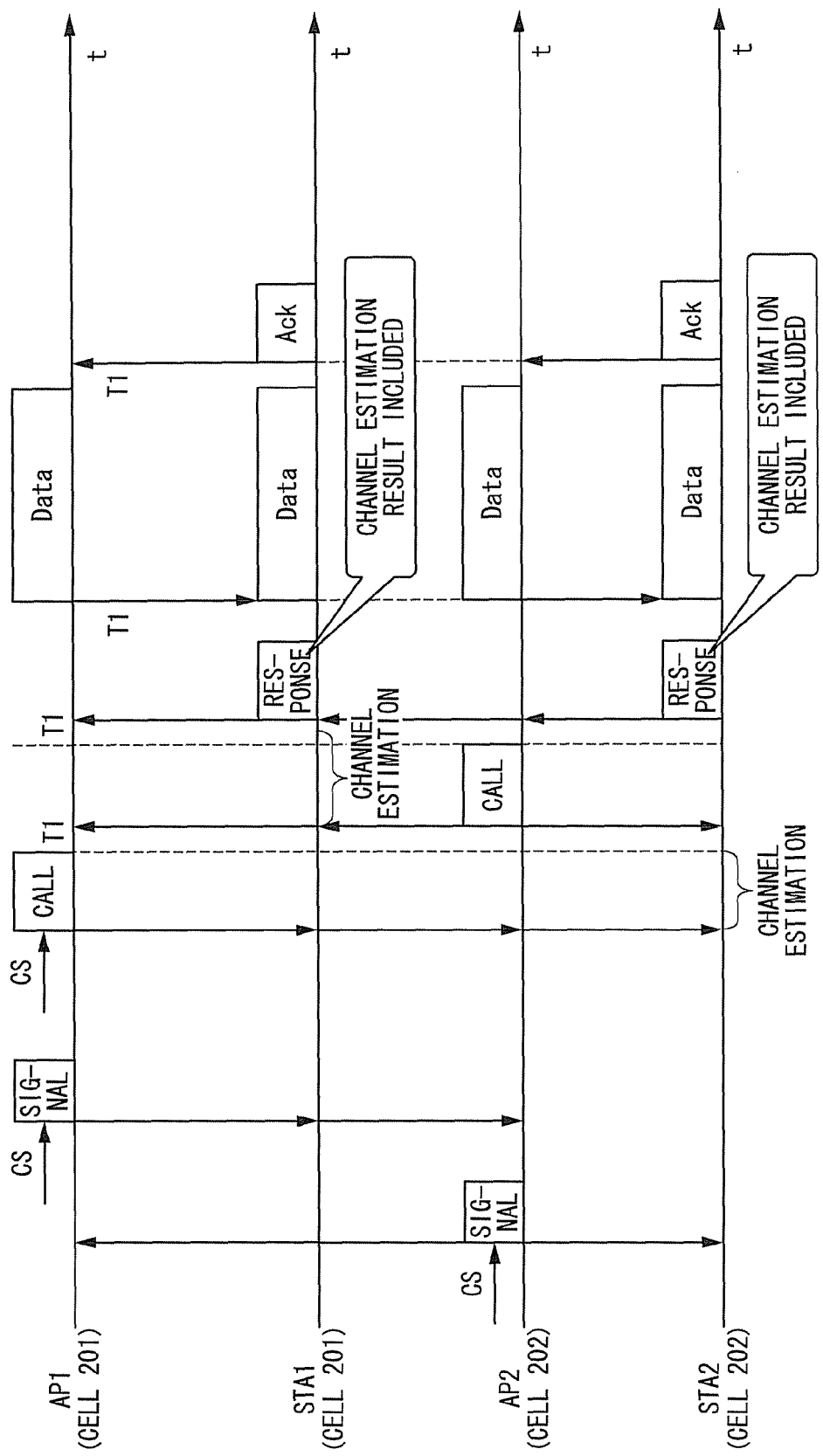
FIG. 31 A time chart for explaining the operation of a nineteenth embodiment to be carried out when a call signal includes the result of channel estimation produced by a radio terminal station upon receiving the call signal.

Next, the nineteenth embodiment will be described with reference to FIG. 31. The nineteenth embodiment has the same radio network configuration as the radio network configuration shown in FIG. 20. FIG. 31 is a time chart showing the operation to be carried out when a radio terminal station receives a call signal including the channel estimation result. Thus, it is possible to reduce a load in estimating channels by each radio base station, thus promptly transmitting packet signals.

Twentieth Embodiment

Figure 32:
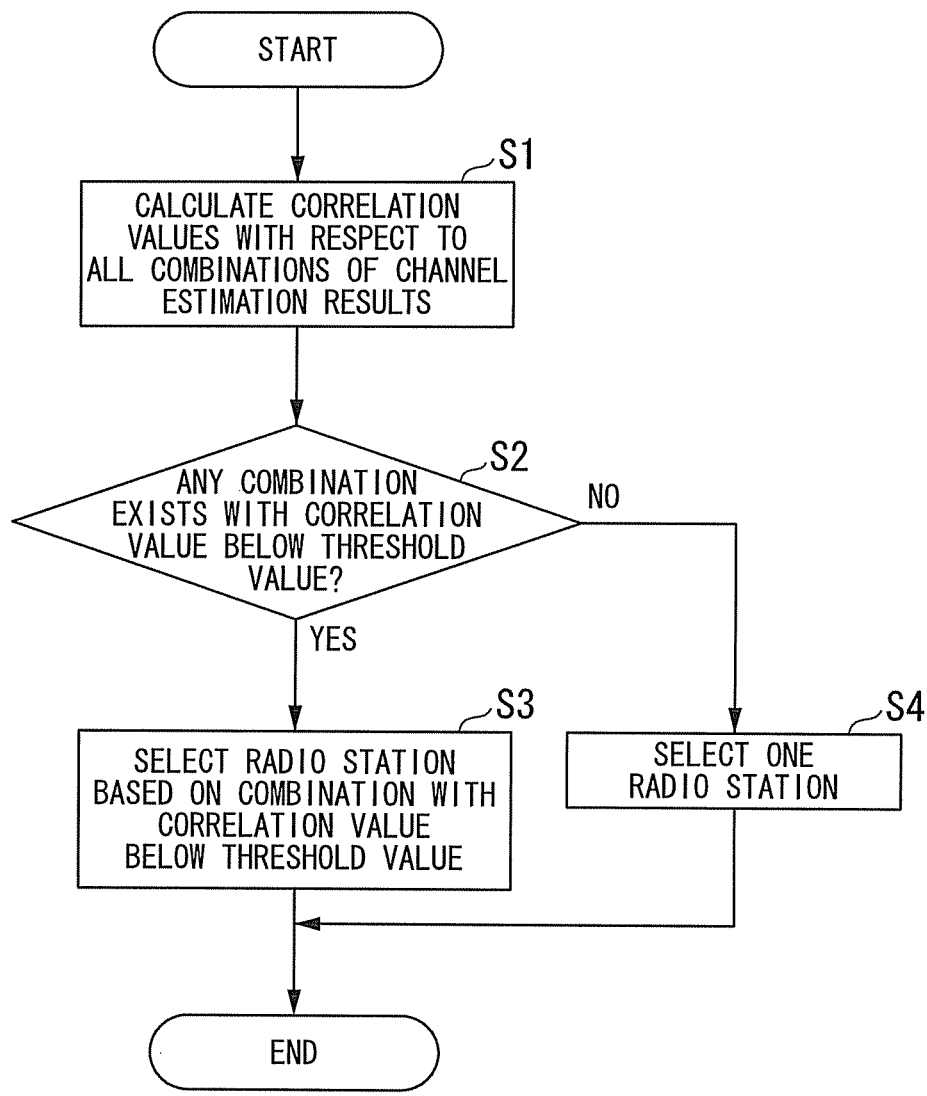
FIG. 32 A flowchart for explaining the operation of a radio base station selecting a radio terminal station according to a twentieth embodiment.

Next, the twentieth embodiment will be described with reference to FIG. 32. In the twentieth embodiment, each radio base station calculates correlation values with respect to all combinations of channel estimation results, thus selecting combinations with correlation values below a predetermined threshold value. If no combination with its correlation value below the threshold value exists, each radio base station does not perform spatial multiplexing communication but selects one radio terminal station. FIG. 32 is a flowchart showing the operation in which a radio base station according to the twentieth embodiment selects one radio terminal station. In FIG. 32, the radio base station calculates correlation values with respect to all combinations of channel estimation results (step S1), and makes a decision as to whether or not any combinations with correlation values below the predetermined threshold value exist (step S2). When a combination with correlation values below the threshold value exists, the radio base station selects radio terminal stations corresponding to the combination with correlation values below the threshold value (step S3). When no combination with its correlation value below the threshold value exists, the radio base station selects one radio base station (step S4).

Since the twentieth embodiment does not select radio base stations with correlation values above the predetermined threshold value, the radio base station is able to perform spatial multiplexing transmission on a plurality of radio terminal stations by way of appropriate transmission beam forming, thus improving a probability of a radio terminal station correctly decoding packet signals.

Twenty-First Embodiment

Figure 33:
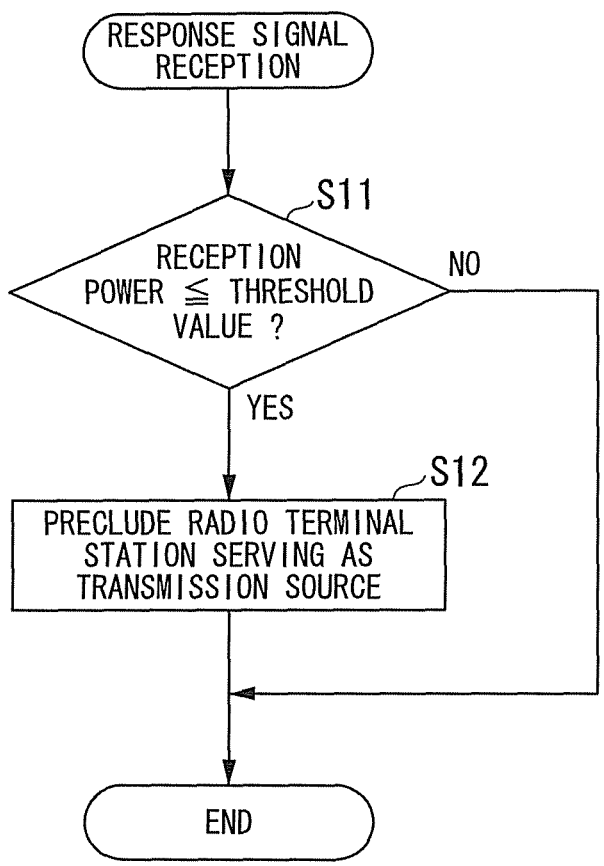
FIG. 33 A flowchart for explaining the operation of a radio base station upon receiving a response signal according to a twenty-first embodiment.

Next, the twenty-first embodiment will be described with reference to FIG. 33. In the twenty-first embodiment, each radio base station receiving a response signal whose reception power is below a threshold value precludes a radio terminal station transmitting such a response signal from the selection of radio terminal stations subjected to spatial multiplexing. FIG. 33 is a flowchart showing the operation of a radio base station receiving a response signal according to the twenty-first embodiment. In FIG. 33, the radio base station receiving a response signal makes a decision as to whether or not its reception power is below a threshold value (step S11). Upon making a decision that the reception power is below the threshold value, the radio base station precludes a radio terminal station transmitting such a response signal from the selection of radio terminal stations (step S12). Since the radio base station of the twenty-first embodiment does not select radio terminal stations transmitting response signals with reception power below the threshold value, it is possible o improve quality of spatial multiplexing communication.

Twenty-Second Embodiment

Figure 34:
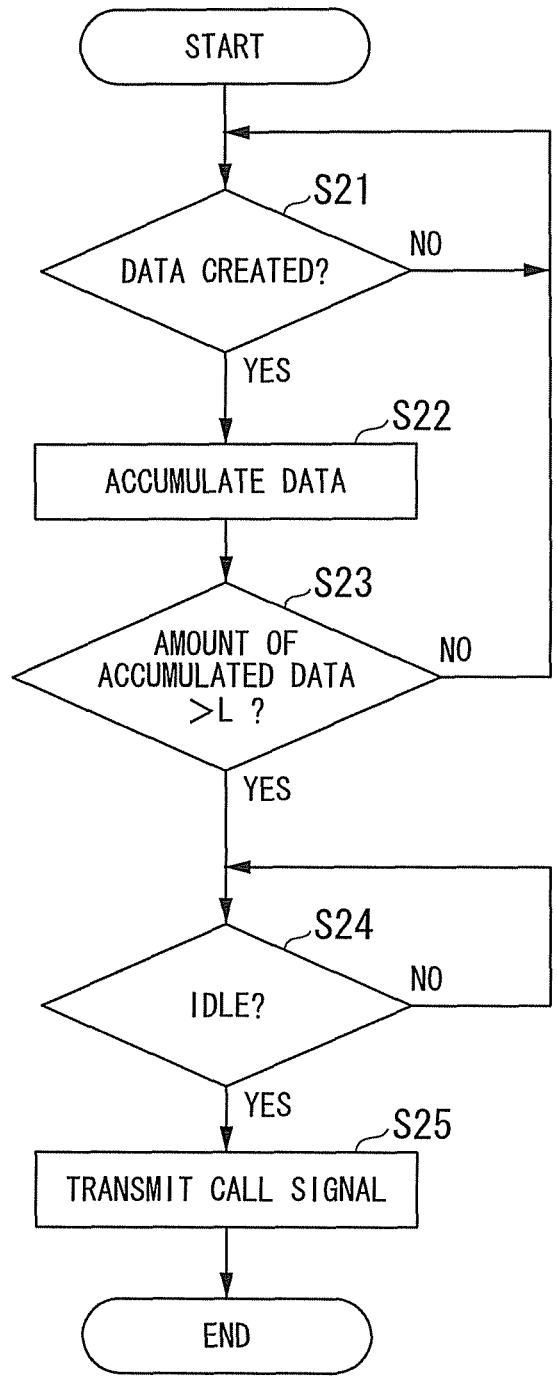
FIG. 34 A flowchart for explaining the operation of a radio base station transmitting a call signal according to a twenty-second embodiment.

Next, the twenty-second embodiment will be described with reference to FIG. 34. In the twenty-second embodiment, each radio base station accumulates its transmission data and then transmits a call signal when the amount of data exceeds a threshold value L in an idling state. FIG. 34 is a flowchart showing the operation of a radio base station for transmitting a call signal according to the twenty-second embodiment. In FIG. 34, when the radio base station creates transmission data (step S21), it accumulates data (step S22), and then makes a decision as to whether or not the amount of data exceeds the predetermined threshold value L (step S23). When the radio base station determines that the amount of data does not exceed the threshold value L, the flow returns to step S21. On the other hand, when the radio base station determines that the amount of data exceeds the threshold value L, the radio base station makes a decision as to whether or not the present time belongs to an idling time (step S24), and then transmits a call signal upon making a decision that the present time belongs to the idling time (step S25). As described above, the twenty-second embodiment delays transmission timing of a call signal so as to increase a probability of the radio base station accumulating packet signals, thus increasing the spatial multiplexing count.

Twenty-Third Embodiment

Figure 35:
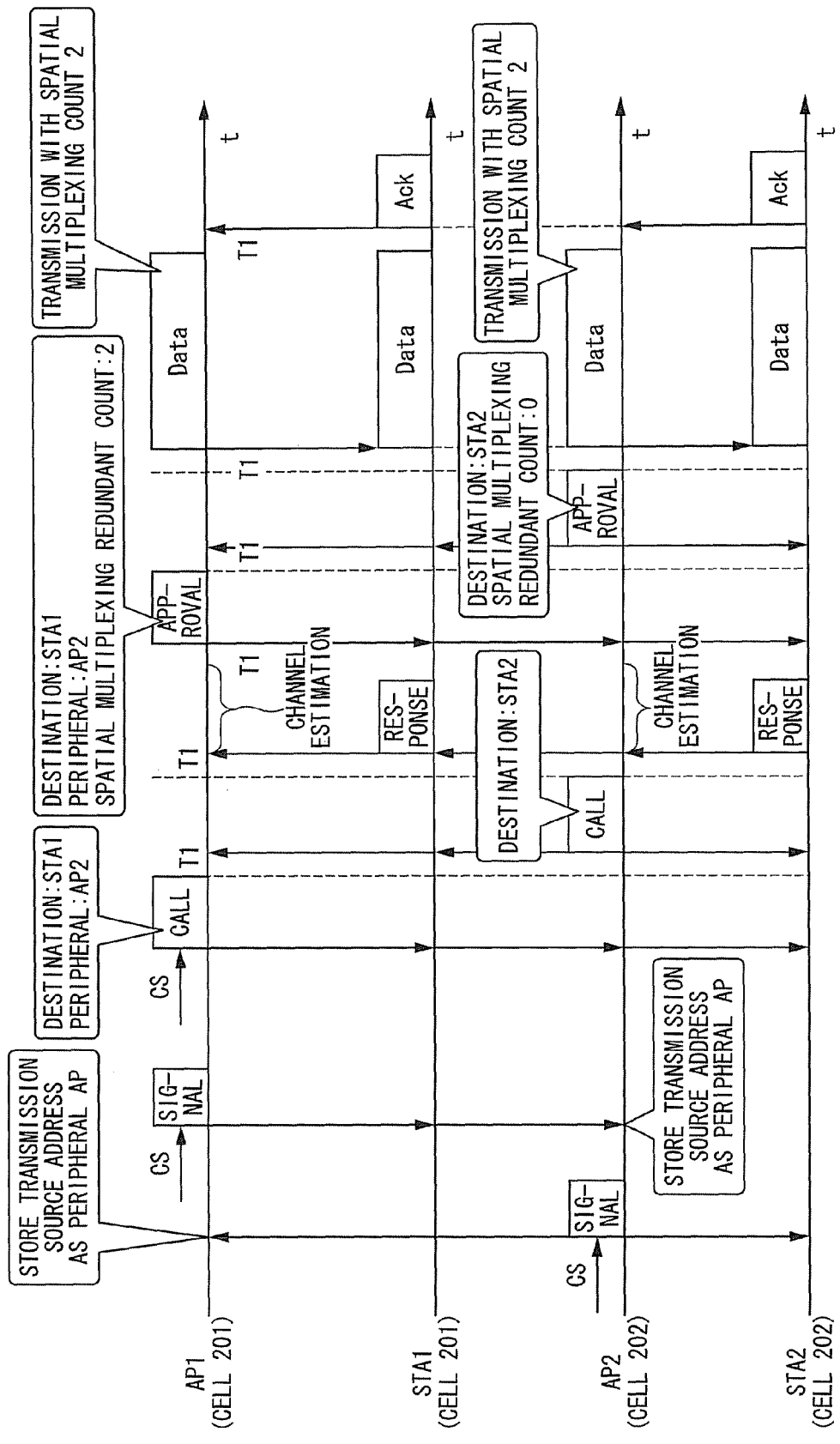
FIG. 35 A time chart for explaining the operation of a radio base station performing spatial multiplexing transmission with a radio terminal station serving as a destination of packet signals according to a twenty-third embodiment.

Next, the twenty-third embodiment will be described with reference to FIG. 35. The twenty-third embodiment has the same radio network configuration as the radio network configuration shown in FIG. 20. FIG. 35 is a time chart showing the operation of a radio base station which transmits an approval signal including a spatial multiplexing redundant count and a destination address of transmission packets determined based on the channel estimation result, creating a null point with an antenna directivity in a direction toward a radio terminal station in the cell 202, and then transmits packet signals destined to a specific radio terminal station via spatial multiplexing. Similar to call signals, approval signals are sequentially transmitted at time intervals T1. The radio base station may reduce the spatial multiplexing count, which has been determined when transmitting a call signal, in response to the channel estimation result. By transmitting an approval signal after channel estimation, it is possible to notify the spatial multiplexing redundant count determined based on the channel estimation result. Herein, the radio base stations AP1, AP2 are each equipped with four antennas. Upon receiving an approval signal from the radio base station AP1, the radio base station AP2 recognizes that the spatial multiplexing redundant count of the radio base station AP1 is two. The radio base station AP2 allocates two residual spatial multiplexes for use in communication with the radio terminal station STA2 and transmits a call signal indicating that the spatial multiplexing count is zero. Thus, it is possible to prevent occurrence of interference between cells due to transmission of packet signals over the spatial multiplexing redundant count. Additionally, it is possible to effectively utilize the spatial multiplexing redundant count, determined based on the channel estimation result, between cells.

Twenty-Fourth Embodiment

Figure 36:
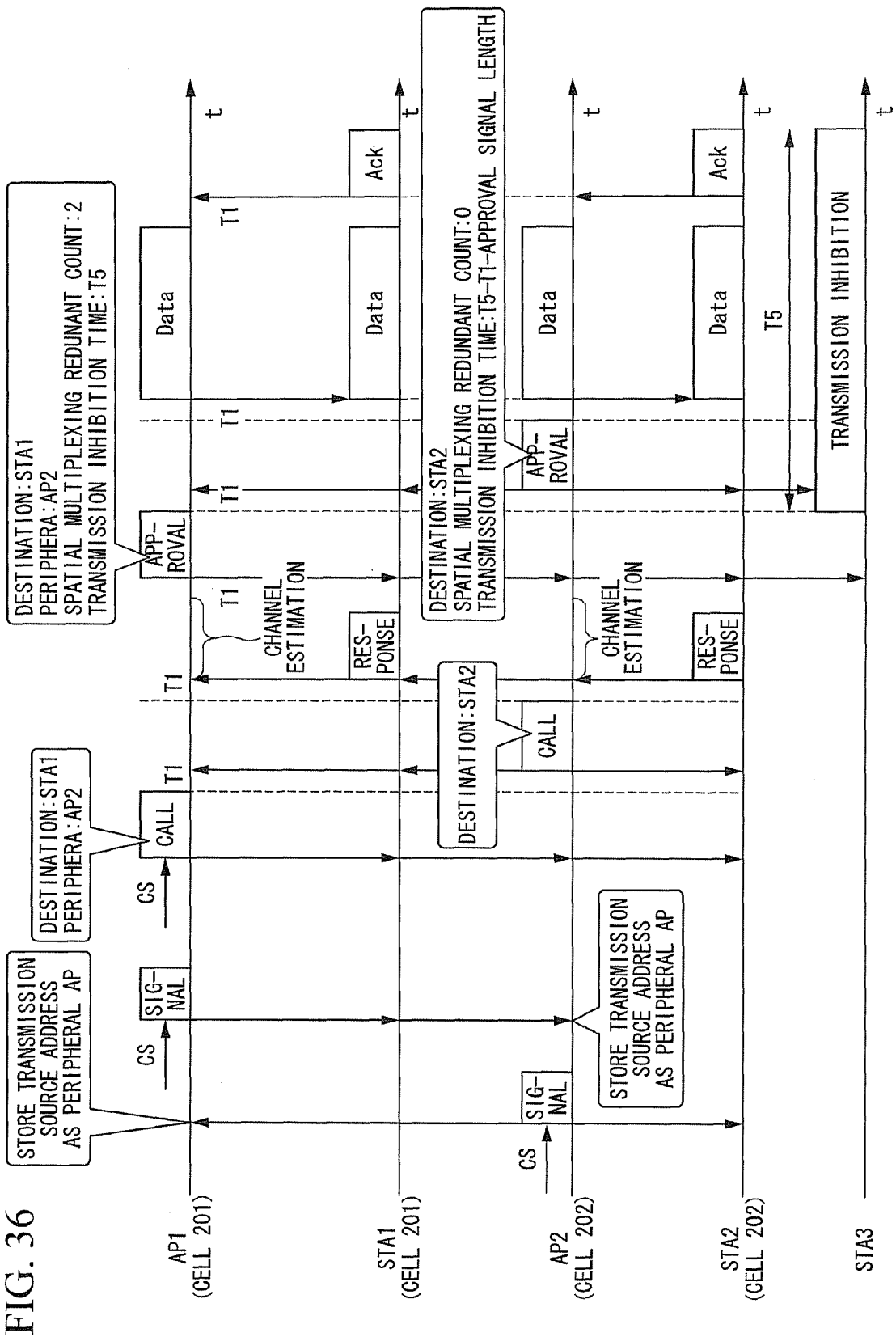
FIG. 36 A time chart for explaining the operation of a twenty-fourth embodiment to be carried out when an approval signal includes a time interval for inhibiting transmission except for transmission made by a radio terminal station and a radio base station specified by the acknowledge signal.

Next, the twenty-fourth embodiment will be described with reference to FIG. 36. The twenty-fourth embodiment has the same radio network configuration as the radio network configuration shown in FIG. 20. FIG. 36 is a time chart showing the operation to be carried out when an approval signal includes a transmission inhibition time for inhibiting transmission by radio terminals except for radio base stations and radio terminal stations specified by the approval signal. The radio base station may change the length of a packet signal, which has been estimated when transmitting a call signal, based on the channel estimation result. Herein, the transmission inhibition time is a time period defined between the transmission timing of an approval signal and the reception timing of an acknowledge signal. Thus, it is possible to prevent interference caused by other radio stations. Additionally, it is possible to set a transmission inhibition time by use of the packet signal length determined based on the channel estimation result.

Twenty-Fifth Embodiment

Figure 37:
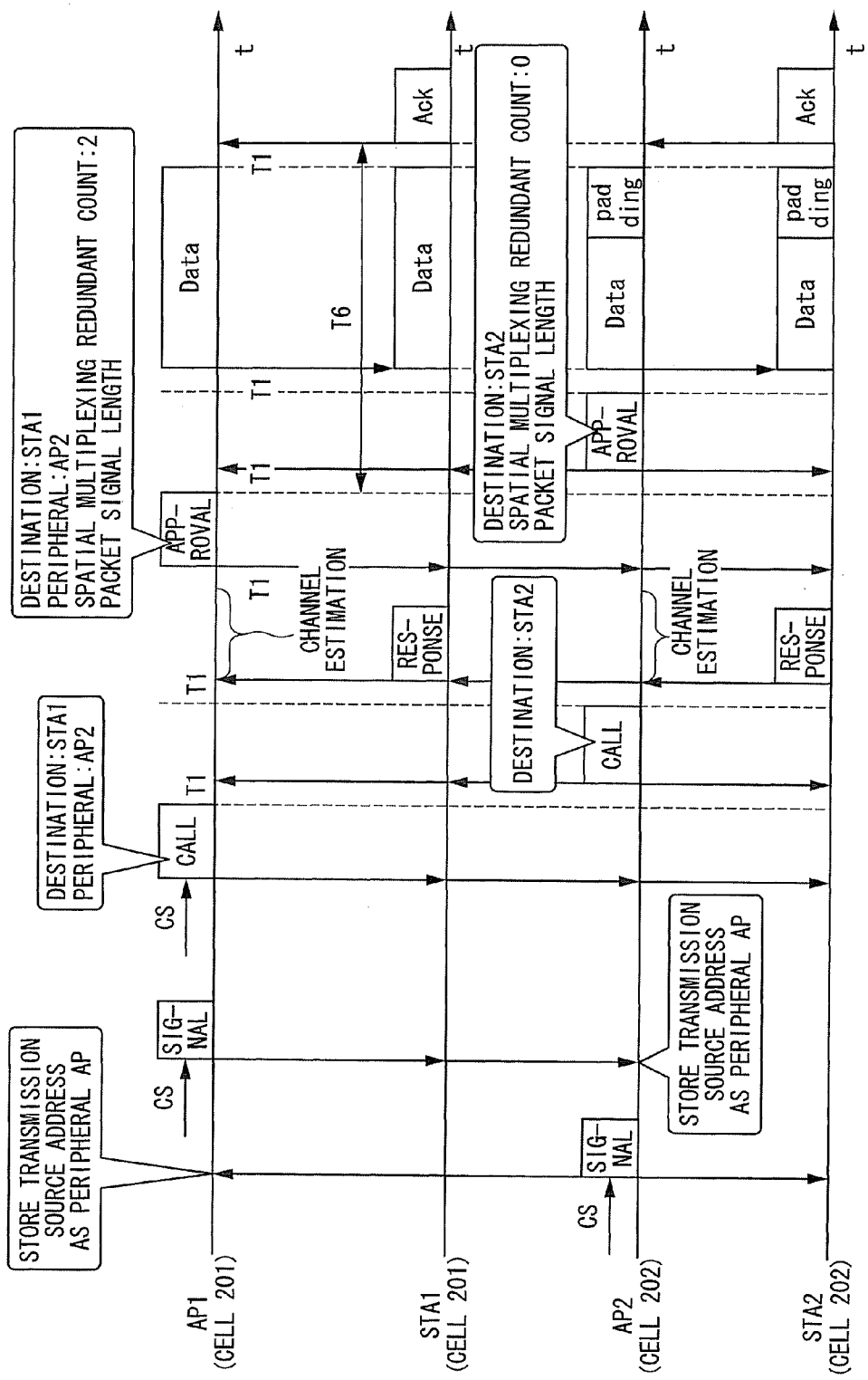
FIG. 37 A time chart for explaining the operation of a twenty-fifth embodiment to be carried out when an approval signal includes the length of a packet signal.

Next, the twenty-fifth embodiment will be described with reference to FIG. 37. The twenty-fifth embodiment has the same radio network configuration as the radio network configuration shown in FIG. 20. FIG. 37 is a time chart showing the operation to be carried out when an approval signal includes the length of a packet signal. The radio base station AP1 transmits a call signal including the length of a packet signal. The radio base station AP2 generates and transmits a packet signal whose length is identical to the notified packet signal length. For instance, packet signals with a short length are subjected to padding, whilst packet signals with a long length are divided and transmitted. Thus, it is possible to prevent an event in which the radio terminal station STA2 of the cell 202 transmits an acknowledge signal ACK so as to cause interference during reception of packet signals.

Twenty-Sixth Embodiment

Figure 38:
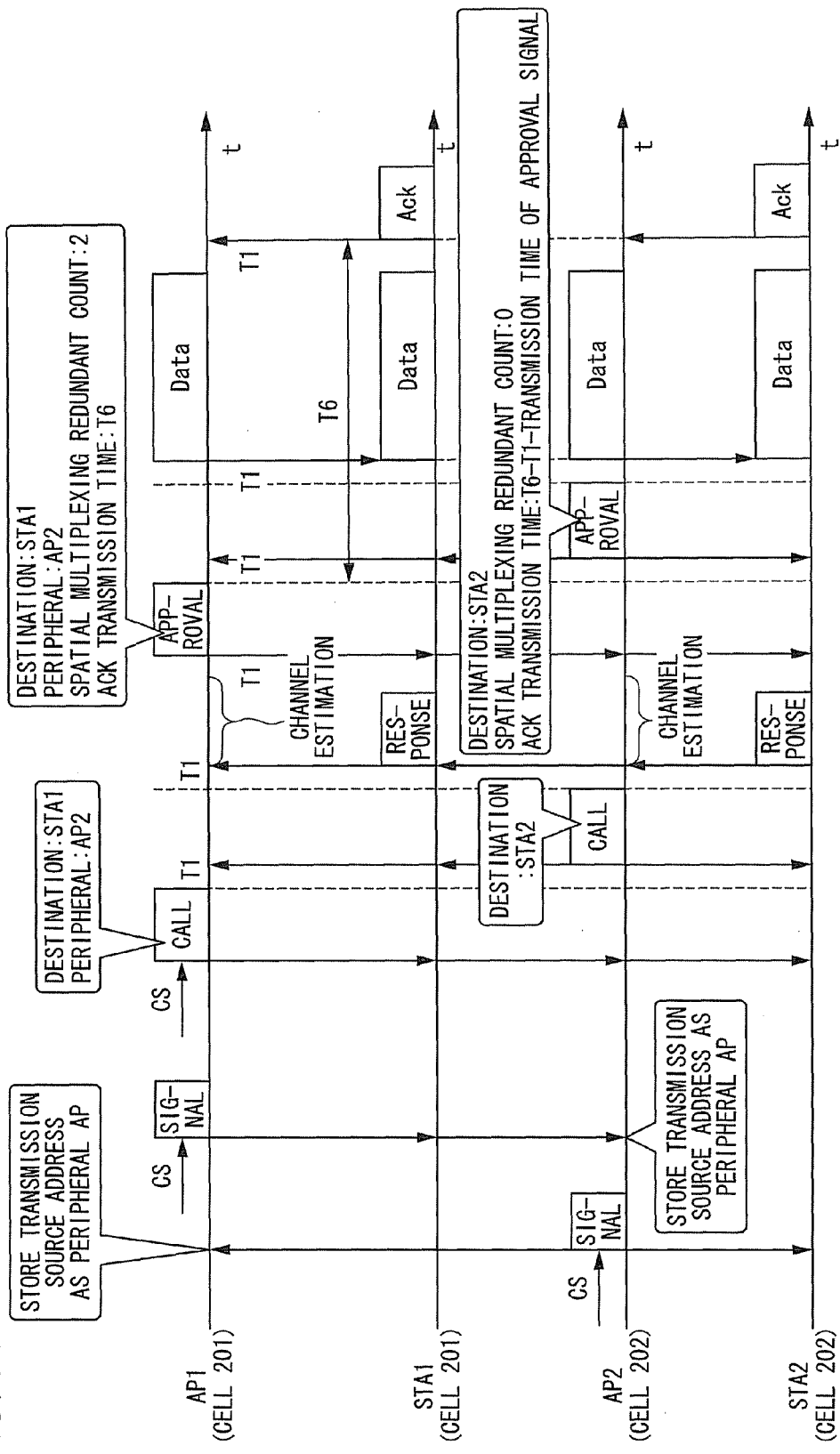
FIG. 38 A time chart for explaining the operation of a twenty-sixth embodiment to be carried out when an approval signal includes a time for transmitting an acknowledge signal ACK.

Next, the twenty-sixth embodiment will be described with reference to FIG. 38. The twenty-sixth embodiment has the same radio network configuration as the radio network configuration shown in FIG. 20. FIG. 38 is a time chart showing the operation to be carried out when an approval signal includes a transmission time of an acknowledge signal ACK. Herein, the transmission time of an acknowledge signal ACK is set after transmission of a packet signal by the radio base station AP1. Thus, even when the length of a packet signal transmitted from the radio base station AP2 is shorter than the length of a packet signal transmitted from the radio base station AP1, it is possible to prevent an event in which the radio terminal station STA2 transmits an acknowledge signal ACK so as to interfere with the radio terminal station STA1 during transmission of packet signals by the radio base station AP1. Additionally, it is possible to set the transmission time of an acknowledge signal ACK by use of the packet signal length determined based on the channel estimation result.

Twenty-Seventh Embodiment

Figure 39:
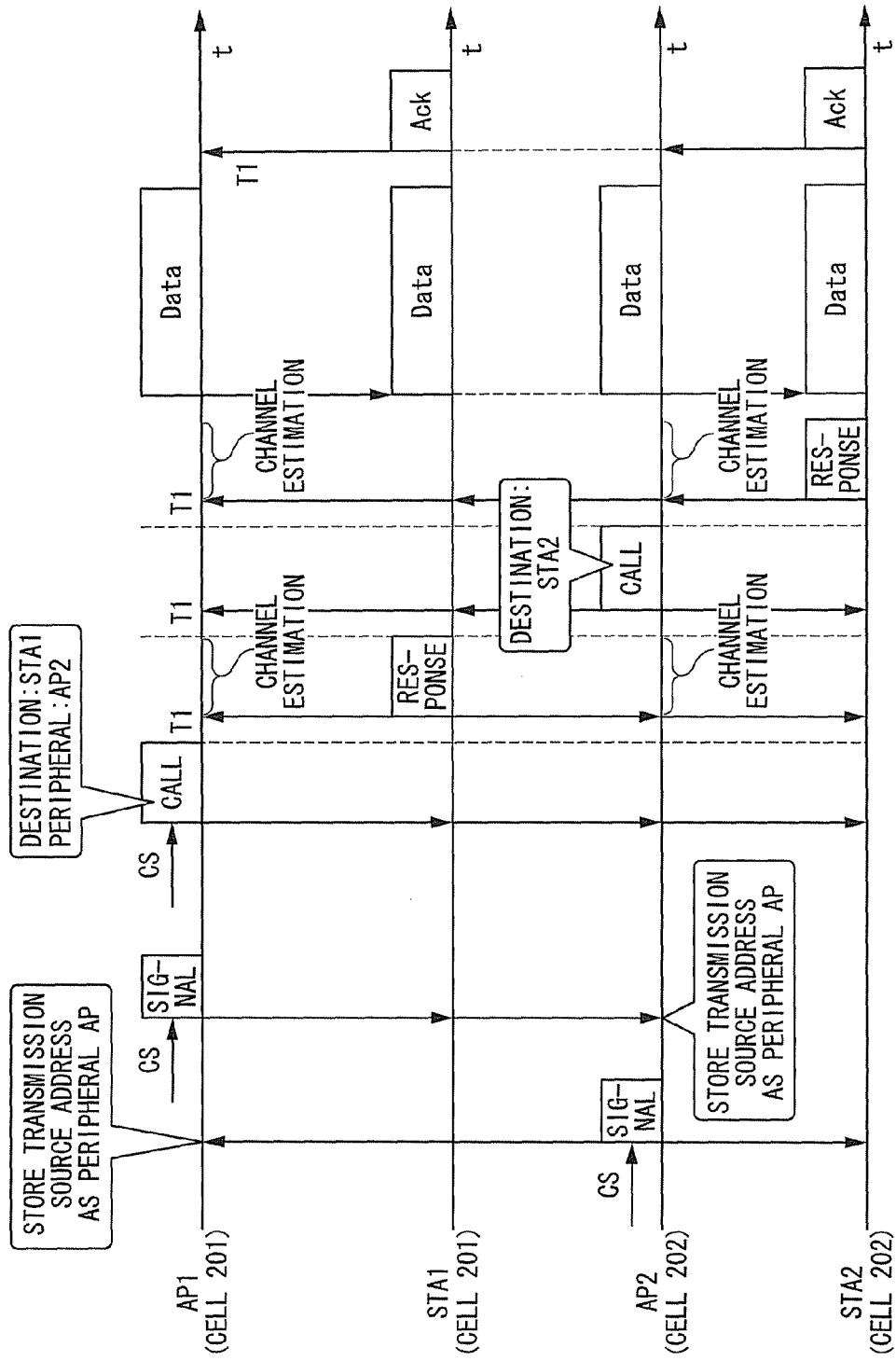
FIG. 39 A time chart for explaining the operation of transmitting packet signals according to a twenty-seventh embodiment.

Next, the twenty-seventh embodiment will be described with reference to FIG. 39. The twenty-seventh embodiment has the same radio network configuration as the radio network configuration shown in FIG. 20. FIG. 39 is a time chart showing the operation for transmitting packet signals. In FIG. 39, upon receiving a packet signal from the radio base station AP2 in the peripheral cell, the radio base station AP1 stores a transmission source address included in the packet signal. Additionally, upon receiving a packet signal from the radio base station AP1 of the cell 201, the radio base station AP2 stores a transmission source address included in the packet signal. In general, radio LANs send packet signals with headers including destination addresses and transmission source addresses as well as addresses of radio base stations belonging to cells.

Upon creating transmission data for one or plural destinations, the radio base station AP1 performs carrier sense CS at random time intervals, wherein when no other signals are detected, indicating an idling time, the radio base station AP1 transmits a call signal including one or plural destination addresses and one or plural addresses of radio base stations, in its periphery, stored therein. In the illustration, the radio base station AP1 creates transmission data destined to the radio terminal station STA1, whilst the radio base station AP2 creates transmission data destined to the radio terminal station STA2. First, the radio base station AP1 transmits a call signal due to the relationship of "random time of radio base station AP1"<"random time of radio base station AP2".

Upon receiving a call signal, the radio terminal station STA1 transmits a response signal after a lapse of the predetermined time T1. When the call signal include a plurality of addresses of radio terminal stations, it is possible to sequentially transmit response signals in the order of addresses at time intervals T1. After receiving all response signals from radio terminal stations specified by a call signal and after a lapse of the time T1, the radio base station AP2 receiving the call signal transmits another call signal including one or plural destination addresses.

The radio base station STA2 receiving a call signal transmits its response signal after a lapse of the time T1. When the call signal includes a plurality of addresses of radio terminal stations, it is possible to sequentially transmit response signals at time intervals T1. When a first call signal includes a plurality of addresses of radio base stations, radio terminal stations, specified by the call signal, may transmit their response signals at time intervals T1 in the order of addresses.

The radio base stations AP1, AP2 estimate channels with radio terminal stations based on received response signals. Based on the channel estimation result, the radio base station AP1 transmits packet signals destined to the radio terminal stations STA1 while creating a null point directing to the radio terminal station STA2 conducting communication in the peripheral cell. Based on the channel estimation result, the radio base station AP2 transmits packet signals destined to the radio terminal station STA2 while creating a null point directing to the radio terminal station STA1 conducting communication in the peripheral cell. As a result, the radio base stations AP1, AP2 are able to simultaneously transmit packet signals via spatial multiplexing.

Upon decoding packet signals without errors, each radio terminal station transmits an acknowledge signal Ack to its counterpart radio base station when the time T1 elapses after receiving packet signals. At this time, radio terminal stations may simultaneously transmit acknowledge signals via spatial multiplexing. Alternatively, radio terminal stations may sequentially transmit acknowledge signals at time intervals T1 in the order of call signals or in the order of addresses when each call signal includes plural addresses.

According to the twenty-seventh embodiment, the radio base station AP2, located in the peripheral cell of the radio base station AP1 and invoked by a first call signal of the radio base station AP1, is able to transmit a call signal to the radio terminal station STA2 belonging to its own cell, so that the radio base stations AP1, AP2 are able to estimate channels upon receiving response signals from radio terminal stations. For this reason, the radio base station AP1 of the cell 201 and the radio base station AP2 of the cell 202 are able to simultaneously transmit packet signals via spatial multiplexing. Thus, it is possible to share and effectively utilize radio resources between cells. Unlike the twelfth embodiment, the twenty-seventh embodiment allows radio terminal stations to transmit response signals at time intervals T1 after receiving call signals, wherein by sufficiently shortening T1, it is possible to prevent an event in which other radio terminal stations, located in the periphery of the current radio terminal station, transmit radio signals in an idling state, which is detected due to their carrier sensing, thus interfering with response signals.

Twenty-Eighth Embodiment

Figure 40:
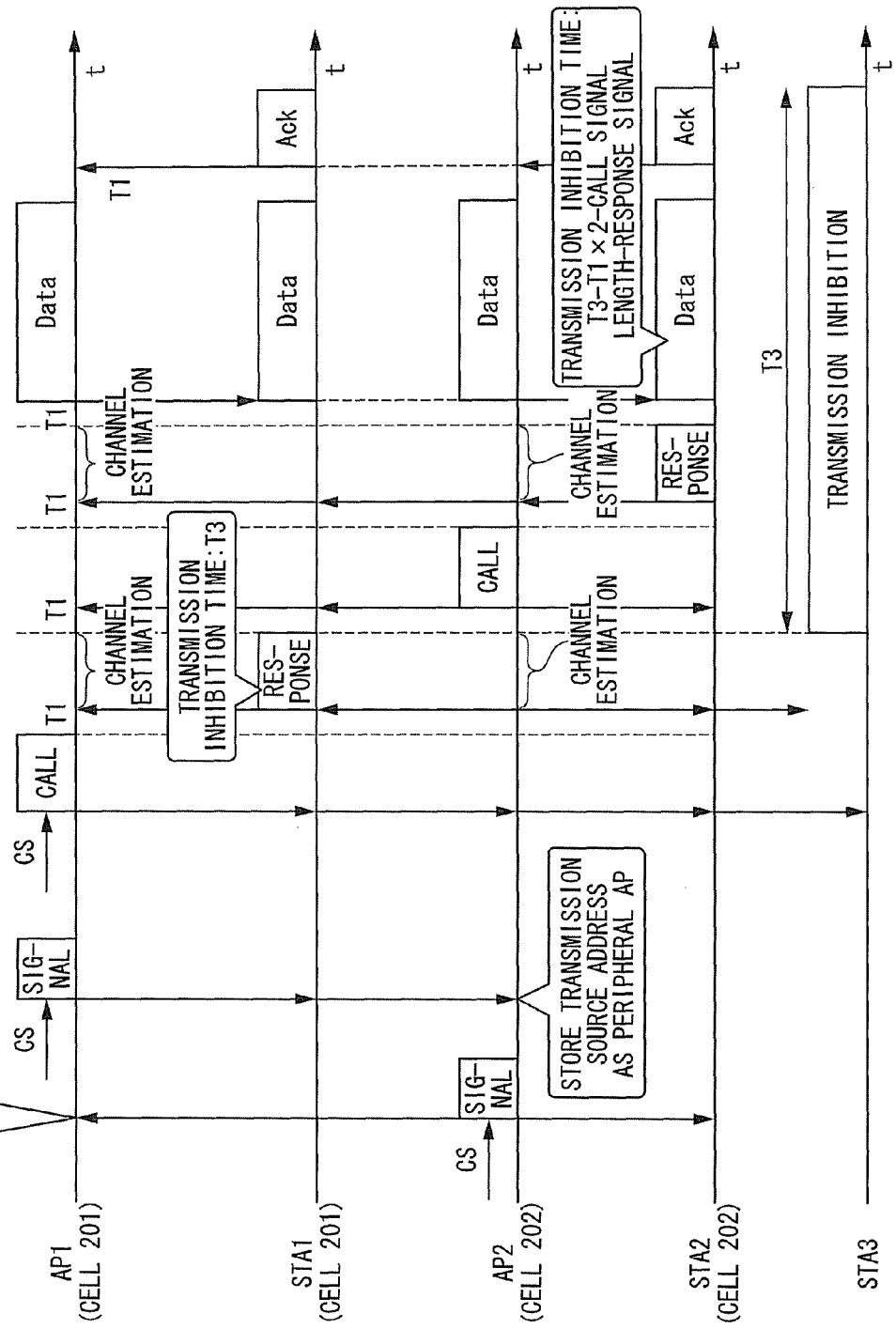
FIG. 40 A time chart for explaining the operation of a twenty-eighth embodiment to be carried out when a response signal includes a time interval for inhibiting transmission of radio stations except for transmission made by a radio base station serving as a transmission source of a call signal, a radio terminal station specified by the call signal, and its peripheral radio base station.
Figure 41:
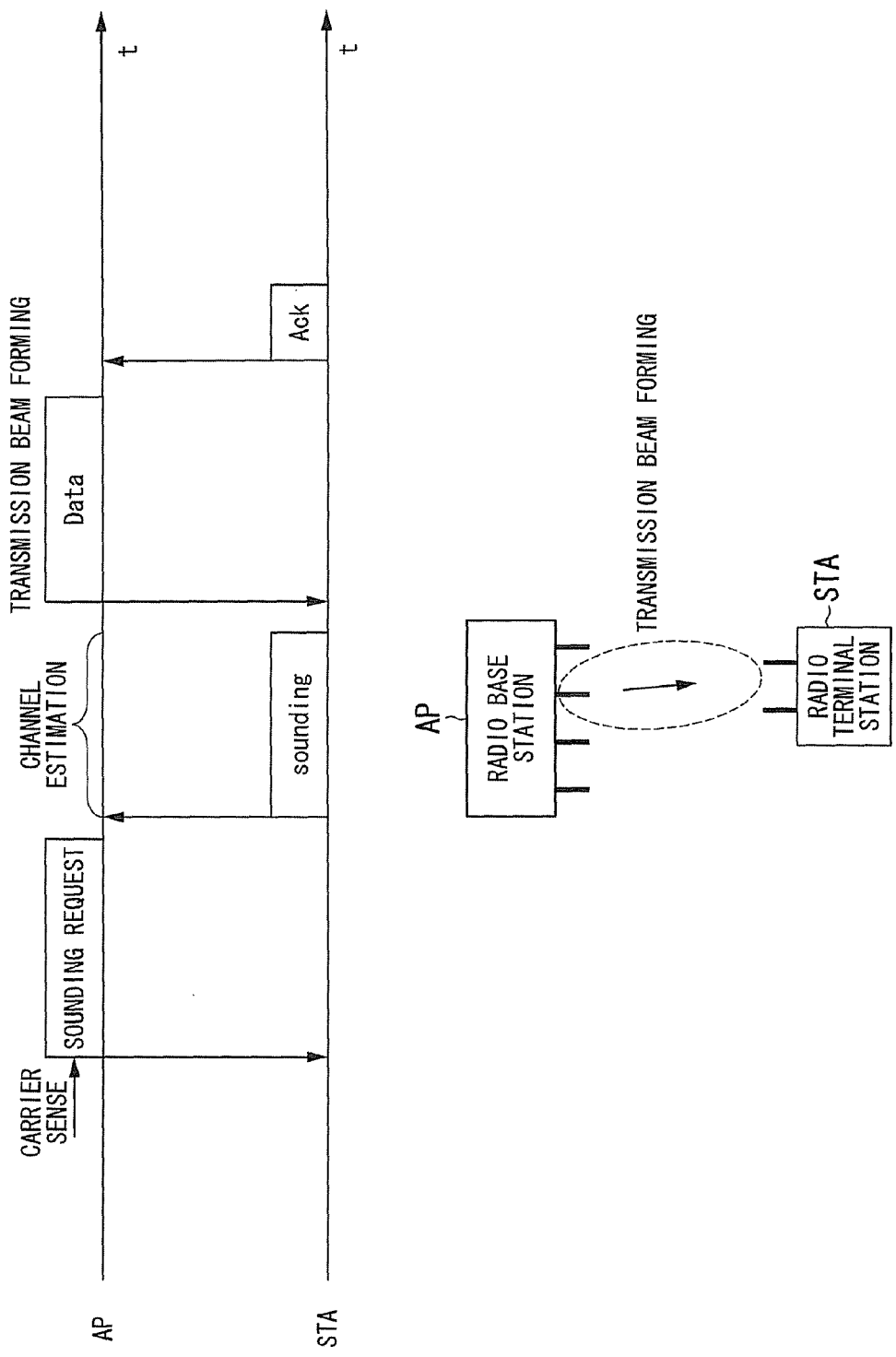
FIG. 41 A time chart for explaining the operation of transmitting packet signals by way of transmission beam forming.
Figure 42:
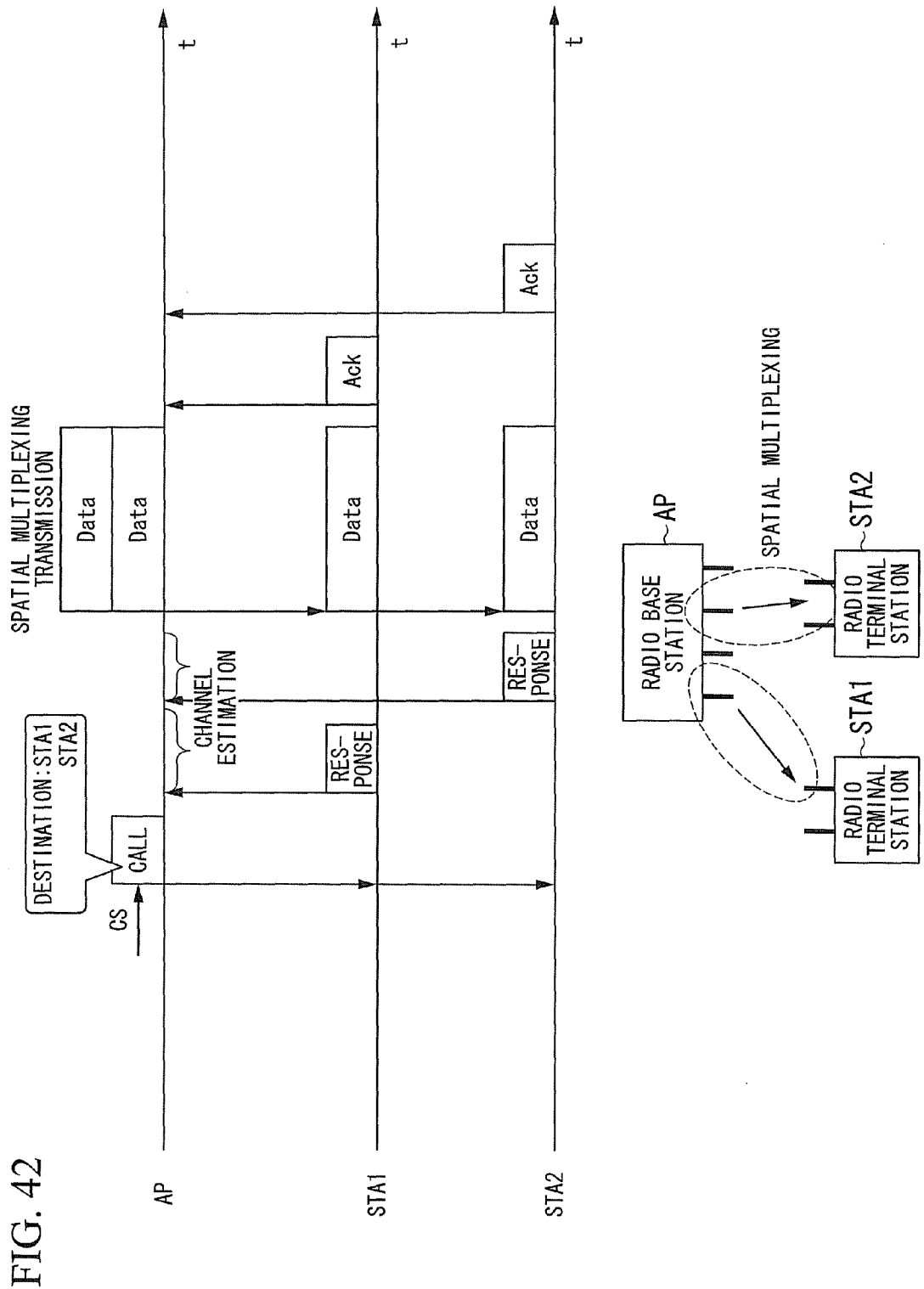
FIG. 42 A time chart for explaining the operation of the MU-MIMO technology.

Next, the twenty-eighth embodiment will be described with reference to FIG. 40. The twenty-eighth embodiment has the same radio network configuration as the radio network configuration shown in FIG. 20. FIG. 40 is a time chart showing the operation to be carried out when a response signal includes a transmission inhibition time for inhibiting transmission of radio stations except for a radio base station serving as a transmission source of a call signal, radio terminal stations specified by the call signal, and their peripheral radio base stations. Herein, the transmission inhibition time is a time period between the transmission timing of a response signal and the reception timing of an acknowledge signal. Thus, it is possible to prevent interference caused by packet signals transmitted from radio stations located in the periphery of each radio terminal station during the time period between the transmission timing of a response signal and the reception timing of an acknowledge signal ACK.

Twenty-Ninth Embodiment

Next, the twenty-ninth embodiment will be described. The twenty-ninth embodiment has the same radio network configuration as the radio network configuration shown in FIG. 20. The twenty-ninth embodiment involves the processing for setting frequency bands with which radio base stations communicate with radio terminal stations belonging to their own cells. It is possible to employ the foregoing processing described in the first to third embodiments as the processing for setting frequency bands with which radio base stations communicate with radio terminal stations. Additionally, it is possible to employ the foregoing operations described in the ninth to twenty-eighth embodiments as the processing for creating null points directing to radio terminal stations in other cells when each radio base stations communicates with radio terminal stations belonging to its own cell. In FIG. 20, for example, the radio base stations AP1, AP2 determine frequency bands for use in communication with the radio terminal stations STA1, STA2 belonging thereto in accordance with the foregoing processing of the first to third embodiments.

Upon receiving a packet signal from the radio base station AP2 which communicates with the radio terminal station STA2 of the cell 202 located in the periphery of the cell 201, the radio base station AP1 stores a transmission source address included in the received packet signal.

In the processing illustrated by the time chart of FIG. 23 which is described in the twelfth embodiment, for example, the radio base station AP1 estimates channels for use in communication with the radio terminal stations STA1, STA2. To transmit packets to the radio terminal station STA1 belonging to its cell, the radio base station AP1 transmits packet signals to the radio terminal station STA1 while creating a null point directing to the radio terminal station STA2 based on the stored address of the radio terminal station STA2 and the channel estimation result.

On the other hand, the radio base station AP2 operates similarly to the radio base station AP1 to estimate channels for use in communication with the radio terminal stations STA1, STA2. To transmit packets to the radio terminal station STA2, the radio base station AP2 transmits packet signals to the radio terminal station STA2 while creating a null point directing to the radio terminal station STA1 based on the stored address of the radio terminal station STA2 and the channel estimation result.

Thirtieth Embodiment

Next, the thirtieth embodiment will be described. The thirtieth embodiment has the same radio network configuration as the radio network configuration shown in FIG. 20. The thirtieth embodiment involves the processing for setting frequency bands with which each radio base station communicates with radio terminal stations belonging to its own cell. It is possible to employ the foregoing processing illustrated by the fourth to eighth embodiments as the processing for setting frequency bands with which each radio base station communicates with radio terminal stations. Additionally, it is possible to employ the foregoing operations described in the ninth to twenty-eighth embodiments as the processing for creating null points directing to radio terminal stations when each radio base station communicates with radio terminal stations belonging to its own cell. In FIG. 20, for example, the radio base stations AP1, AP2 determine frequency bands for use in the radio terminal stations STA1, STA2 belonging thereto based on signal utilization frequencies and radio signal intensities which the radio terminal stations STA1, STA2 measure in communication with their counterpart radio base stations and which are provided from the radio terminal stations STA1, STA2 in accordance with the foregoing processing described in the fourth to eighth embodiments.

It is possible to employ the processing described in the twenty-ninth embodiment as the method by which the radio base stations AP1, AP2 create null points directing to radio terminal stations not belonging to their own cells.

According to the twenty-ninth to thirtieth embodiments, when frequency bands, which are set by radio base stations for use in communication with radio terminal stations belonging to their cells in accordance with the foregoing processing described in the first to eighth embodiments, overlap with each other in a plurality of cells, each radio base station creates null points directing to other radio terminal stations belonging to the overlapped cells in order to communicate with radio terminal stations in its own cell. For this reason, even when each radio base station selects the same frequency band as the frequency band set to other radio base stations in the overlapped cells, it is possible to conduct communication while reducing interference between different cells.

As described above, when cells, i.e. units of configurations each including one radio base station and a plurality of radio terminal stations communicating therewith, approach each other (in the overlap cell environment), it is necessary to prevent this situation causing interference between cells. The conventional MU-MIMO technology does not consider the case for sharing the same frequency channel with a plurality of cells, i.e. the overlap cell environment, resulting in no structure being established to conduct communication between plural cells via spatial multiplexing. On the other hand, the MU-MIMO technology, serving as a radio communication system using a plurality of antennas, makes it possible to provide radio waves with directivities; hence, it is possible to direct radio waves in a specific direction (beam forming), or it is possible not to direct radio waves (or it is possible to create null points). According to the present embodiment, when a null point is created between a radio base station and a radio terminal station belonging to different cells in the MU-MIMO overlap cell environment, a first set of a "call signal" and a "response signal" (which may reach the radio base station and the radio terminal station belonging to difference cells since no beam forming is established) is used to perform mutual detection between the radio base station and the radio terminal station belonging to different cells; then, the null point is created so as not to cause interference of radio waves between the radio base station and the radio terminal station belonging to different cells. At this time, the addresses of the radio base station and the radio terminal station are used to discriminate whether the radio base station and the radio terminal station belong to the same cell or different cells. Thus, it is possible to prevent interference between cells in the MU-MIMO (multiuser MIMO) overlap cell environment.

In this connection, programs implementing the foregoing functions of the radio base stations AP1, AP2 and the radio terminal stations STA1, STA2, STA2 shown in FIGS. 18 and 20 are recorded on computer-readable recording media, so that programs recorded on the recording media are loaded into and executed by a computer system, thus performing the radio multiple access control processing. Herein, the "computer system" may encompass OS and hardware such as peripherals. The "computer-readable recording media" may refer to flexible disks, magneto-optical disks, ROM, portable media such as CD-ROM, and storage devices such as hard disks installed in the computer system. Additionally, the "computer-readable recording media" may refer to devices for retaining programs for a certain period, such as volatile memory (RAM) installed in the computer system serving as a server or a client when programs are transmitted via networks such as the Internet or via communication lines such as telephone lines.

The foregoing programs may be transmitted from the computer system whose storage unit stores those programs to another computer system via transmission media or via transmission waves propagating through transmission media. Herein, the "transmission media" for transmitting programs may refer to any media having an information transmitting functionality, e.g. networks (or communication networks) such as the Internet, and communication lines such as telephone lines. The foregoing programs may be drafted to implement a part of the foregoing functions. Alternatively, the foregoing programs may be drafted as differential files (or differential programs) which are combined with preinstalled programs of the computer system so as to implement the foregoing functions.

INDUSTRIAL APPLICABILITY

The present invention is applicable to inter-cell radio multiple access controls which enable spatial multiplexing communication between cells by exchanging information, necessary for spatial multiplexing, between cells in the overlap cell environment.

DESCRIPTION OF THE REFERENCE NUMERALS 1, 2, 3 cell
101-1 to 101-N antenna
102 measurement signal reception unit
103 radio signal processing unit
104 signal intensity measuring unit
105 signal utilization frequency measuring unit
106 information storage unit
107 reception weight determination unit
108 frequency band determination unit
110 radio base station
111 radio terminal station
112 radio terminal station
113 radio terminal station
120 radio base station
121 radio terminal station
122 radio terminal station
123 radio terminal station
130 radio base station
131 radio terminal station
132 radio terminal station
133 radio terminal station
301-1 to 301-N antenna
302 reception signal switch unit 303 notification signal reception unit
304 data signal reception unit
305 radio signal processing unit
401-1 to 401-N antenna
402 reception/transmission switch unit
403 measurement signal reception unit
404 radio signal processing unit
405 signal intensity measuring unit
406 signal utilization frequency measuring unit
407 acquisition instruction unit
408 information storage unit
409 transmission unit
501-1 to 501-N antenna
502 reception signal switch unit
503 notification signal reception unit
504 data signal reception unit
505 radio signal processing unit
506 reception/transmission switch unit
507 notification request unit
508 transmission unit
601-1 to 601-N antenna
602 reception/transmission switch unit
603 measurement signal reception unit
604 radio signal processing unit
605 signal intensity measuring unit
606 signal utilization frequency measuring unit
607 acquisition instruction unit
608 information storage unit
609 transmission unit
610 request signal reception unit
701-1 to 701-N antenna
702 reception/transmission switch unit
703 measurement signal reception unit
704 radio signal processing unit
705 signal intensity measuring unit
706 signal utilization frequency measuring unit
707 acquisition instruction unit
708 transmission unit
709 request signal reception unit
AP1, AP2 radio base station
STA1, STA2, STA3 radio terminal station
201, 202 cell

The invention claimed is:

1. A radio communication method implemented in radio networks having a plurality of cells which connect radio base stations and radio terminal stations in receiving and transmitting packet signals, in which each of the radio base stations uses a plurality of antennas to simultaneously receive and transmit packet signals with each of the radio terminal stations via spatial multiplexing, said radio communication method comprising:

when a radio base station of a first cell receives a packet signal transmitted from a radio base station of a second cell located in a periphery of the first cell, the radio base station of the first cell stores an address included in the received packet signal;

when the radio base station of the first cell transmits a packet signal, the radio base station of the first cell transmits a call signal, serving as a control signal, which includes a destination address of the packet signal as well as an address of a radio terminal station of the second cell or an address of the radio base station of the second cell, wherein a radio terminal station of the first cell specified by the call signal as well as the radio terminal station or the radio base station of the second cell specified by the call signal transmit a response signal;

upon receiving the response signal, the radio base station of the first cell performs channel estimation on the radio terminal station of the first cell as well as the radio terminal station or the radio base station of the second cell, wherein, based on an estimation result, the radio base station of the first cell performs spatial multiplexing transmission towards the radio terminal station of the first cell, which is a destination of the packet signal, while creating a null point, relative to an antenna directivity, in a direction towards the radio terminal station or the radio base station of the second cell.

2. The radio communication method according to claim 1 further comprising the steps in which:

when the radio base station, belonging to a first cell, receives a packet signal transmitted from a radio base station of a second cell located in the periphery of the first cell or a radio terminal station of the second cell, the radio base station stores a transmission source address included in the packet signal;

when the radio base station of the first cell transmits a packet signal, the radio base station of the first cell performs carrier sense at random time intervals with radio base stations, wherein the radio base station, involved in an idling state not receiving radio signals, transmits a call signal, including a destination address of the transmitted packet signal as well as an address of the radio base station of the second cell and an address of the radio terminal station of the second cell, as its control signal;

the radio terminal station of the first cell, the radio base station of the second cell, and the radio terminal station of the second cell, which are specified by the call signal, send back their response signals; and upon receiving response signals, the radio base station of the first cell estimates channels with respect to the radio terminal station of the first cell, the radio base station of the second cell, and the radio terminal station of the second cell, wherein based on the channel estimation result, the radio base station of the first cell performs spatial multiplexing transmission with the radio terminal station of the first cell, serving as the destination of the packet signal, while creating null points, relative to the directivity of antennas, directing to the radio base station of the second cell and the radio terminal station of the second cell.

3. The radio communication method according to claim 1, provided that the radio base station transmits packet signals to radio terminal stations in its own cell in conjunction with a plurality of cells, further comprising the steps in which:

upon receiving a packet signal transmitted from a second cell located in the periphery of a first cell applied to the radio base station, the radio base station stores a transmission source address included in the packet signal;

when the radio base station of the first cell transmits a packet signal, the radio base station of the first cell performs carrier sense at random time intervals with radio base stations, so that the radio base station, involved in an idling state not receiving radio signals, transmits a call signal, including a destination address of the transmitted packet signal and an address of the radio terminal station of the second cell, as its control signal;

upon receiving the call signal transmitted from the radio base station of the first cell, the radio terminal station of the first cell and the radio terminal station of the second cell send back their response signals;

upon receiving response signals, the radio base station of the first cell and the radio base station of the second cell estimate channels with respect to the radio terminal stations, wherein based on the channel estimation result, the radio base station of the first cell performs spatial multiplexing transmission with the radio terminal station of the first cell, serving as the destination of the transmitted packet signal, while creating a null point, relative to the directivity of the antennas, directing to the radio terminal station of the second cell; and the radio base station of the second cell performs spatial multiplexing transmission with the radio terminal station of the second cell while creating a null point, relative to the directivity of antennas, directing to the radio terminal station of the first cell.

4. The radio communication method according to claim 1, provided that the radio base station transmits packet signals to radio terminal stations in its own cell in conjunction with a plurality of cells, further comprising the steps in which:

the radio base station of a first cell, which is first to transmit a call signal, performs carrier sense at random time intervals with radio base stations, so that the radio base station, involved in an idling state not receiving radio signals, transmits the call signal, including a destination address of the packet signal transmitted to the radio terminal station of the first cell, as its control signal;

upon receiving the call signal, a radio base station of a peripheral cell, different from the first cell, performs carrier sense at random time intervals during a first period counted from the reception timing of the call signal, so that the radio base station, involved in an idling state not receiving radio signals, transmits a call signal including a destination address of a packet signal to be transmitted to a radio terminal station of the peripheral cell;

the radio terminal station, belonging to a specific cell, which is specified by the call signal of the radio base station of the specific cell sends back a response signal over a lapse of the first period; and upon receiving response signals transmitted from radio terminal stations, belonging to the specific cell and its peripheral cell, the radio base station of the specific cell estimates channels with respect to the radio terminal stations belonging to the specific cell and its peripheral cell, wherein based on the channel estimation result, the radio base station of the specific cell transmits a packet signal via spatial multiplexing to the radio terminal station of the specific cell, which is the destination of the transmitted packet signal, while creating a null point, relative to the directivity of antennas, directing to the radio terminal station of the peripheral cell.

5. The radio communication method according to claim 1, provided that the radio base station transmits packet signals to radio terminal stations in its own cell in conjunction with a plurality of cells, further comprising the steps in which:

when the radio base station of a first cell receives a packet signal transmitted from the radio base station of a second cell located in the periphery of the first cell, the radio base station of the first cell stores a transmission source address included in the packet signal;

the radio base station of the first cell, which is about to transmit a first call signal, performs carrier sense at random time intervals with radio base stations, so that the radio base station, involved in an idling state not receiving radio signals, transmits the first call signal, including a destination address of the packet signal to be transmitted to the radio terminal station of the first cell and an address of the radio base station of the peripheral cell, as its control signal;

upon receiving the first call signal, the radio base station belonging to a peripheral cell different from the first cell transmits its call signal, including a destination address of a packet signal to be transmitted to the radio terminal station of the peripheral cell, as its control signal over a lapse of a second period after reception of the first call signal;

upon receiving the call signal transmitted from the radio base station of the peripheral cell, the radio base station of a secondary peripheral cell different from the first cell transmits a call signal, including a destination address of a packet signal to be transmitted to the radio terminal station of the secondary peripheral cell, as its control signal over a lapse of the second period after reception of the call signal;

the radio terminal station belonging to a specific cell, which is specified by the call signal transmitted from the radio base station of the specific cell, transmits its response signal over a lapse of the second period; and when the radio base station of the specific cell receives response signals from the radio terminal stations of the specific cell and its peripheral cell, the radio base station estimates channels with respect to the radio terminal stations of the specific cell and its peripheral cell, wherein based on the channel estimation result, the radio base station of the specific cell transmits a packet signal via spatial multiplexing to the radio terminal station of the specific cell while creating a null point, relative to the directivity of antennas, to the radio terminal station of its peripheral cell.

6. The radio communication method according to claim 1, provided that the radio base station transmits packet signals to radio terminal stations in its own cell in conjunction with a plurality of cells, further comprising the steps in which:

when the radio base station of a first cell receives a packet signal transmitted from the radio base station of a second cell located in the periphery of the first cell, the radio base station of the first cell stores a transmission source address included in the packet signal;

the radio base station of the first cell, which is about to transmit a first call signal, performs carrier sense at random time intervals with radio base stations, so that the radio base station, involved in an idling state not receiving radio signals, transmits the first call signal, including a destination address of a packet signal to be transmitted to the radio terminal station of the first cell and an address of the radio base station of a peripheral cell, as its control signal;

upon receiving the first call signal, the radio terminal station sends back a response signal over a lapse of a second period after reception of the first call signal;

upon receiving the response signal transmitted from the radio terminal station, the radio base station of a specific cell estimates a channel with the radio terminal station;

upon receiving the response signal, the radio base station of a peripheral cell different from the first cell transmits a call signal, including a destination address of a packet signal to be transmitted to the radio terminal station of the specific cell, as its control signal over a lapse of the second period after reception of the response signal;

upon receiving the call signal, the radio terminal station of the peripheral cell different from the first cell sends back a response signal over a lapse of the second period after reception of the call signal;

upon receiving the response signal transmitted from the radio terminal station, the radio base station of the specific cell estimates a channel with respect to the radio terminal station;

upon receiving the response signal, the radio base station of a secondary peripheral cell different from the first cell transmits a call signal, including a destination address of a packet signal to be transmitted to the radio terminal station of the specific cell, as its control signal over a lapse of the second period after reception of the response signal;

upon receiving the call signal, the radio terminal station of the secondary peripheral cell different from the first cell sends back a response signal over a lapse of the second period after reception of the call signal;

upon receiving the response signal transmitted from the radio terminal station, the radio base station of the specific cell estimates a channel with the radio terminal station; and based on the channel estimation result pertaining to the radio terminal stations belonging to the specific cell and its peripheral cell, the radio base station of the specific cell transmits a packet signal via spatial multiplexing to the radio terminal station of the specific cell, serving as a destination of the transmitted packet signal, while creating a null point, relative to the directivity of antennas, directing to the radio terminal station of its peripheral cell.

7. The radio communication method according to claim 5, wherein the radio base station sequentially transmits call signals in the order of addresses included in the first call signal.

8. A radio communication system comprising a plurality of cells configured of radio networks which connect radio base stations and radio terminal stations in receiving and transmitting packet signals, in which each of the radio base stations uses a plurality of antennas to simultaneously receive and transmit packet signals with each of the radio terminal stations via spatial multiplexing, the radio base stations and radio terminal stations being configured such that:

when a radio base station of a first cell receives a packet signal transmitted from a radio base station of a second cell located in a periphery of the first cell, the radio base station of the first cell stores an address included in the received packet signal;

when the radio base station of the first cell transmits a packet signal, the radio base station of the first cell transmits a call signal, serving as a control signal, which includes a destination address of the packet signal as well as an address of a radio terminal station of the second cell or an address of the radio base station of the second cell, wherein a radio terminal station of the first cell specified by the call signal as well as the radio terminal station or the radio base station of the second cell specified by the call signal transmit a response signal;

upon receiving the response signal, the radio base station of the first cell performs channel estimation on the radio terminal station of the first cell as well as the radio terminal station or the radio base station of the second cell, wherein, based on an estimation result, the radio base station of the first cell performs spatial multiplexing transmission towards the radio terminal station of the first cell, which is a destination of the packet signal, while creating a null point, relative to an antenna directivity, in a direction towards the radio terminal station or the radio base station of the second cell.

9. The radio communication system according to claim 8, wherein:

when the radio base station, belonging to a first cell, receives a packet signal transmitted from a radio base station of a second cell located in the periphery of the first cell or a radio terminal station of the second cell, the radio base station stores a transmission source address included in the packet signal;

when the radio base station of the first cell transmits a packet signal, the radio base station of the first cell performs carrier sense at random time intervals with radio base stations, wherein the radio base station, involved in an idling state not receiving radio signals, transmits a call signal, including a destination address of the transmitted packet signal as well as an address of the radio base station of the second cell and an address of the radio terminal station of the second cell, as its control signal;

the radio terminal station of the first cell, the radio base station of the second cell, and the radio terminal station of the second cell, which are specified by the call signal, send back their response signals; and upon receiving response signals, the radio base station of the first cell estimates channels with respect to the radio terminal station of the first cell, the radio base station of the second cell, and the radio terminal station of the second cell, wherein based on the channel estimation result, the radio base station of the first cell performs spatial multiplexing transmission with the radio terminal station of the first cell, serving as the destination of the packet signal, while creating null points, relative to the directivity of antennas, directing to the radio base station of the second cell and the radio terminal station of the second cell.

10. The radio communication system according to claim 8, provided that the radio base station transmits packet signals to radio terminal stations in its own cell in conjunction with a plurality of cells, wherein upon receiving a packet signal transmitted from a second cell located in the periphery of a first cell applied to the radio base station, the radio base station stores a transmission source address included in the packet signal;

when the radio base station of the first cell transmits a packet signal, the radio base station of the first cell performs carrier sense at random time intervals with radio base stations, so that the radio base station, involved in an idling state not receiving radio signals, transmits a call signal, including a destination address of the transmitted packet signal and an address of the radio terminal station of the second cell, as its control signal;

upon receiving the call signal transmitted from the radio base station of the first cell, the radio terminal station of the first cell and the radio terminal station of the second cell send back their response signals;

upon receiving response signals, the radio base station of the first cell and the radio base station of the second cell estimate channels with respect to the radio terminal stations, wherein based on the channel estimation result, the radio base station of the first cell performs spatial multiplexing transmission with the radio terminal station of the first cell, serving as the destination of the transmitted packet signal, while creating a null point, relative to the directivity of the antennas, directing to the radio terminal station of the second cell; and the radio base station of the second cell performs spatial multiplexing transmission with the radio terminal station of the second cell while creating a null point, relative to the directivity of antennas, directing to the radio terminal station of the first cell.

11. The radio communication system according to claim 8, provided that the radio base station transmits packet signals to radio terminal stations in its own cell in conjunction with a plurality of cells, wherein the radio base station of a first cell, which is first to transmit a call signal, performs carrier sense at random time intervals with radio base stations, so that the radio base station, involved in an idling state not receiving radio signals, transmits the call signal, including a destination address of the packet signal transmitted to the radio terminal station of the first cell, as its control signal;

upon receiving the call signal, a radio base station of a peripheral cell, different from the first cell, performs carrier sense at random time intervals during a first period counted from the reception timing of the call signal, so that the radio base station, involved in an idling state not receiving radio signals, transmits a call signal including a destination address of a packet signal to be transmitted to a radio terminal station of the peripheral cell;

the radio terminal station, belonging to a specific cell, which is specified by the call signal of the radio base station of the specific cell sends back a response signal over a lapse of the first period; and upon receiving response signals transmitted from radio terminal stations, belonging to the specific cell and its peripheral cell, the radio base station of the specific cell estimates channels with respect to the radio terminal stations belonging to the specific cell and its peripheral cell, wherein based on the channel estimation result, the radio base station of the specific cell transmits a packet signal via spatial multiplexing to the radio terminal station of the specific cell, which is the destination of the transmitted packet signal, while creating a null point, relative to the directivity of antennas, directing to the radio terminal station of the peripheral cell.

12. The radio communication system according to claim 8, provided that the radio base station transmits packet signals to radio terminal stations in its own cell in conjunction with a plurality of cells, wherein when the radio base station of a first cell receives a packet signal transmitted from the radio base station of a second cell located in the periphery of the first cell, the radio base station of the first cell stores a transmission source address included in the packet signal;

the radio base station of the first cell, which is about to transmit a first call signal, performs carrier sense at random time intervals with radio base stations, so that the radio base station, involved in an idling state not receiving radio signals, transmits the first call signal, including a destination address of the packet signal to be transmitted to the radio terminal station of the first cell and an address of the radio base station of the peripheral cell, as its control signal;

upon receiving the first call signal, the radio base station belonging to a peripheral cell different from the first cell transmits its call signal, including a destination address of a packet signal to be transmitted to the radio terminal station of the peripheral cell, as its control signal over a lapse of a second period after reception of the first call signal;

upon receiving the call signal transmitted from the radio base station of the peripheral cell, the radio base station of a secondary peripheral cell different from the first cell transmits a call signal, including a destination address of a packet signal to be transmitted to the radio terminal station of the secondary peripheral cell, as its control signal over a lapse of the second period after reception of the call signal;

the radio terminal station belonging to a specific cell, which is specified by the call signal transmitted from the radio base station of the specific cell, transmits its response signal over a lapse of the second period; and when the radio base station of the specific cell receives response signals from the radio terminal stations of the specific cell and its peripheral cell, the radio base station estimates channels with respect to the radio terminal stations of the specific cell and its peripheral cell, wherein based on the channel estimation result, the radio base station of the specific cell transmits a packet signal via spatial multiplexing to the radio terminal station of the specific cell while creating a null point, relative to the directivity of antennas, to the radio terminal station of its peripheral cell.

13. The radio communication system according to claim 8, provided that the radio base station transmits packet signals to radio terminal stations in its own cell in conjunction with a plurality of cells, wherein when the radio base station of a first cell receives a packet signal transmitted from the radio base station of a second cell located in the periphery of the first cell, the radio base station of the first cell stores a transmission source address included in the packet signal;

the radio base station of the first cell, which is about to transmit a first call signal, performs carrier sense at random time intervals with radio base stations, so that the radio base station, involved in an idling state not receiving radio signals, transmits the first call signal, including a destination address of a packet signal to be transmitted to the radio terminal station of the first cell and an address of the radio base station of a peripheral cell, as its control signal;

upon receiving the first call signal, the radio terminal station sends back a response signal over a lapse of a second period after reception of the first call signal;

upon receiving the response signal transmitted from the radio terminal station, the radio base station of a specific cell estimates a channel with the radio terminal station;

upon receiving the response signal, the radio base station of a peripheral cell different from the first cell transmits a call signal, including a destination address of a packet signal to be transmitted to the radio terminal station of the specific cell, as its control signal over a lapse of the second period after reception of the response signal;

upon receiving the call signal, the radio terminal station of the peripheral cell different from the first cell sends back a response signal over a lapse of the second period after reception of the call signal;

upon receiving the response signal transmitted from the radio terminal station, the radio base station of the specific cell estimates a channel with respect to the radio terminal station;

upon receiving the response signal, the radio base station of a secondary peripheral cell different from the first cell transmits a call signal, including a destination address of a packet signal to be transmitted to the radio terminal station of the specific cell, as its control signal over a lapse of the second period after reception of the response signal;

upon receiving the call signal, the radio terminal station of the secondary peripheral cell different from the first cell sends back a response signal over a lapse of the second period after reception of the call signal;

upon receiving the response signal transmitted from the radio terminal station, the radio base station of the specific cell estimates a channel with the radio terminal station; and based on the channel estimation result pertaining to the radio terminal stations belonging to the specific cell and its peripheral cell, the radio base station of the specific cell transmits a packet signal via spatial multiplexing to the radio terminal station of the specific cell, serving as a destination of the transmitted packet signal, while creating a null point, relative to the directivity of antennas, directing to the radio terminal station of its peripheral cell.

14. The radio communication system according to claim 12, wherein the radio base station sequentially transmits call signals in the order of addresses included in the first call signal.

* * * * *